(12) United States Patent
Huang

(10) Patent No.: US 10,394,002 B2
(45) Date of Patent: Aug. 27, 2019

(54) PHOTOGRAPHING OPTICAL LENS ASSEMBLY, IMAGE CAPTURING UNIT AND ELECTRONIC DEVICE

(71) Applicant: LARGAN Precision Co, Ltd., Taichung (TW)

(72) Inventor: Hsin-Hsuan Huang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 34 days.

(21) Appl. No.: 15/703,650

(22) Filed: Sep. 13, 2017

(65) Prior Publication Data

US 2018/0003926 A1    Jan. 4, 2018

Related U.S. Application Data

(63) Continuation of application No. 15/153,529, filed on May 12, 2016, now Pat. No. 9,798,112, which is a (Continued)

(30) Foreign Application Priority Data

Aug. 1, 2014  (TW) .............................. 103126480 A

(51) Int. Cl.
G02B 9/00       (2006.01)
G02B 13/00      (2006.01)
(Continued)

(52) U.S. Cl.
CPC ........... *G02B 13/0045* (2013.01); *G02B 9/00* (2013.01); *G02B 9/64* (2013.01); *G02B 13/002* (2013.01);
(Continued)

(58) Field of Classification Search
CPC .. G02B 13/00; G02B 13/002; G02B 13/0045; G02B 13/0015; G02B 9/00; G02B 9/64; G02B 27/0025; H04N 5/2254
(Continued)

(56) References Cited

U.S. PATENT DOCUMENTS

| | | | |
|---|---|---|---|
| 4,596,447 A | 6/1986 | Yamada et al. | |
| 4,948,238 A | 8/1990 | Araki | |

(Continued)

FOREIGN PATENT DOCUMENTS

| | | |
|---|---|---|
| CN | 203595858 U | 5/2014 |
| CN | 203606556 U | 5/2014 |

(Continued)

OTHER PUBLICATIONS

United States Patent and Trademark Office, "Notice of Allowance," issued in connection with U.S. Appl. No. 15/153,529, dated Jun. 20, 2017, 23 pages.

(Continued)

*Primary Examiner* — William R Alexander
(74) *Attorney, Agent, or Firm* — Hanley, Flight & Zimmerman, LLC

(57) ABSTRACT

A photographing optical lens assembly includes, in order from object side to image side, a first lens element, a second lens element, a third lens element, a fourth lens element, a fifth lens element, a sixth lens element and a seventh lens element. The first lens element has positive refractive power. The second, third, fourth and fifth lens elements have refractive power. The sixth lens element with refractive power has an image-side surface being concave in a paraxial region, wherein an object-side surface and the image-side surface of the sixth lens element are both aspheric, and the image-side surface has at least one inflection point. The seventh lens element with refractive power has an image- (Continued)

side surface being concave in a paraxial region, wherein an object-side surface and the image-side surface of the seventh lens element are both aspheric, and the image-side surface has at least one inflection point.

34 Claims, 29 Drawing Sheets

Related U.S. Application Data continuation of application No. 14/488,106, filed on Sep. 16, 2014, now Pat. No. 9,366,845.

(51) Int. Cl.
  *G02B 9/64* (2006.01)
  *G02B 27/00* (2006.01)
  *H04N 5/225* (2006.01)
(52) U.S. Cl.
  CPC ..... *G02B 13/0015* (2013.01); *G02B 27/0025* (2013.01); *H04N 5/2254* (2013.01)
(58) Field of Classification Search
  USPC .......................................................... 359/708
  See application file for complete search history.

(56) References Cited

U.S. PATENT DOCUMENTS

| | | | |
|---|---|---|---|
| 6,069,743 A | 5/2000 | Nagata et al. | |
| 6,191,896 B1 | 2/2001 | Itoh | |
| 6,233,099 B1 | 5/2001 | Itoh | |
| 8,599,495 B1 | 12/2013 | Tsai et al. | |
| 8,736,979 B2 | 5/2014 | Tsai et al. | |
| 8,780,464 B2 | 7/2014 | Huang | |
| 9,042,036 B2* | 5/2015 | Tsai | G02B 3/04 |
| | | | 359/714 |
| 9,110,271 B2 | 8/2015 | Sekine | |
| 9,366,845 B2 | 6/2016 | Huang | |
| 9,507,125 B2 | 11/2016 | Hashimoto | |
| 9,547,159 B2* | 1/2017 | Sekine | G02B 3/04 |
| 9,632,287 B2* | 4/2017 | Chae | G02B 9/64 |
| 2012/0212842 A1 | 8/2012 | Hosoi et al. | |
| 2014/0139719 A1 | 5/2014 | Fukaya | |
| 2014/0160580 A1 | 6/2014 | Nishihata et al. | |
| 2014/0211324 A1 | 7/2014 | Ishizaka | |
| 2014/0376105 A1 | 12/2014 | Sekine | |
| 2015/0009578 A1 | 1/2015 | Shinohara et al. | |
| 2015/0043091 A1 | 2/2015 | Bone et al. | |
| 2015/0070783 A1 | 3/2015 | Hashimoto | |
| 2015/0103414 A1 | 4/2015 | Baik | |
| 2015/0185441 A1 | 7/2015 | Liao | |
| 2015/0198787 A1 | 7/2015 | Kubota et al. | |
| 2015/0198791 A1 | 7/2015 | Kubota et al. | |
| 2015/0211228 A1 | 7/2015 | Shinohara et al. | |
| 2015/0277083 A1 | 10/2015 | Chae | |
| 2015/0378131 A1 | 12/2015 | Tang et al. | |
| 2016/0025953 A1 | 1/2016 | Jung | |
| 2016/0033742 A1 | 2/2016 | Huang | |
| 2016/0085058 A1 | 3/2016 | Chae | |
| 2016/0259152 A1 | 9/2016 | Huang | |

FOREIGN PATENT DOCUMENTS

| | | |
|---|---|---|
| CN | 203673137 U | 6/2014 |
| CN | 203941337 U | 11/2014 |
| CN | 203965708 U | 11/2014 |
| CN | 204188865 U | 3/2015 |
| CN | 204188870 U | 3/2015 |
| JP | 11326762 A | 11/1999 |
| JP | 2012155223 | 8/2012 |
| JP | 2012173299 A | 9/2012 |
| JP | 2013182090 | 9/2013 |
| JP | 2013195587 | 9/2013 |
| JP | 2013195588 A | 9/2013 |
| JP | 2013195637 | 9/2013 |
| TW | M490015 U | 11/2014 |
| WO | 2014192567 A1 | 2/2017 |

OTHER PUBLICATIONS

United States Patent and Trademark Office, "Non-Final Office Action," issued in connection with U.S. Appl. No. 14/488,106, dated Oct. 22, 2015, 35 pages.

United States Patent and Trademark Office, "Notice of Allowance," issued in connection with U.S. Appl. No. 14/488,106, dated Feb. 16, 2016, 17 pages.

\* cited by examiner

PHOTOGRAPHING OPTICAL LENS ASSEMBLY, IMAGE CAPTURING UNIT AND ELECTRONIC DEVICE

RELATED APPLICATIONS

This application is a continuation patent application of U.S. application Ser. No. 15/153,529, filed on May 12, 2016, which is a continuation patent application of U.S. application Ser. No. 14/488,106, filed on Sep. 16, 2014, the entire contents of which are hereby incorporated by reference herein in their entirety for which priority is claimed under 35 U.S.C. § 120. The U.S. application Ser. No. 14/488,106, filed on Sep. 16, 2014, is a non-provisional application claiming priority under 35 U.S.C. § 119 to Taiwan Application Serial Number 103126480, filed on Aug. 1, 2014, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a lens structure with fewer lens elements, such as four or five lens elements. Due to the popularity of electronic devices with high-end specifications, such as smart phones and wearable apparatus, the requirements for high resolution and image quality of present compact optical systems increase significantly. However, the conventional optical systems cannot satisfy these requirements of the compact optical systems.

Other conventional compact optical systems with six-element lens structure are developed. However, the curvatures and the refractive powers of the lens elements are improperly arranged. Thus, it is difficult to reduce the back focal length of the optical systems whereby it is hard to keep the optical systems compact. Furthermore, the refractive power of the lens elements adjacent to the object side is unbalanced so that the aberration is severe and the illumination is insufficient in the peripheral region of the image.

SUMMARY

According to one aspect of the present disclosure, a photographing optical lens assembly includes, in order from an object side to an image side, a first lens element, a second lens element, a third lens element, a fourth lens element, a fifth lens element, a sixth lens element and a seventh lens element. The first lens element has positive refractive power. The second lens element has refractive power. The third lens element has refractive power. The fourth lens element has refractive power. The fifth lens element has refractive power. The sixth lens element with refractive power has an image-side surface being concave in a paraxial region thereof, wherein an object-side surface and the image-side surface of the sixth lens element are both aspheric, and the image-side surface of the sixth lens element has at least one inflection point. The seventh lens element with refractive power has an image-side surface being concave in a paraxial region thereof, wherein an object-side surface and the image-side surface of the seventh lens element are both aspheric, and the image-side surface of the seventh lens element has at least one inflection point. When a focal length of the photographing optical lens assembly is f, a vertical distance between a non-axial critical point on the image-side surface of the seventh lens element and an optical axis is Yc72, a focal length of the first lens element is f1, a focal length of the seventh lens element is f7, and the following conditions are satisfied:

$0.1 < Yc72/f < 0.9$; and $|f1/f7| < 3.0$.

According to another aspect of the present disclosure, a photographing optical lens assembly includes, in order from an object side to an image side, a first lens element, a second lens element, a third lens element, a fourth lens element, a fifth lens element, a sixth lens element and a seventh lens element. The first lens element has positive refractive power. The second lens element has refractive power. The third lens element has refractive power. The fourth lens element has refractive power. The fifth lens element has refractive power. The sixth lens element with refractive power has an image-side surface being concave in a paraxial region thereof, wherein both of an object-side surface and the image-side surface of the sixth lens element are aspheric, and the image-side surface of the sixth lens element has at least one inflection point. The seventh lens element with refractive power has an image-side surface being concave in a paraxial region thereof, wherein both of an object-side surface and the image-side surface of the seventh lens element are aspheric, and the image-side surface of the seventh lens element has at least one inflection point. When a focal length of the photographing optical lens assembly is f, a vertical distance between a non-axial critical point on the image-side surface of the seventh lens element and an optical axis is Yc72, a focal length of the first lens element is f1, a focal length of the second lens element is f2, an axial distance between an object-side surface of the first lens element and an image surface is TL, a maximum image height of the photographing optical lens assembly is ImgH, and the following conditions are satisfied:

$0.1 < Yc72/f < 0.9$;

$|f1/f2| < 2.0$; and $TL/ImgH < 2.20$.

According to still another aspect of the present disclosure, an image capturing unit includes the photographing optical lens assembly according to the aforementioned aspect and an image sensor, wherein the image sensor is disposed on the image side of the optical imaging lens assembly.

According to yet another aspect of the present disclosure, an electronic device includes the image capturing unit according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
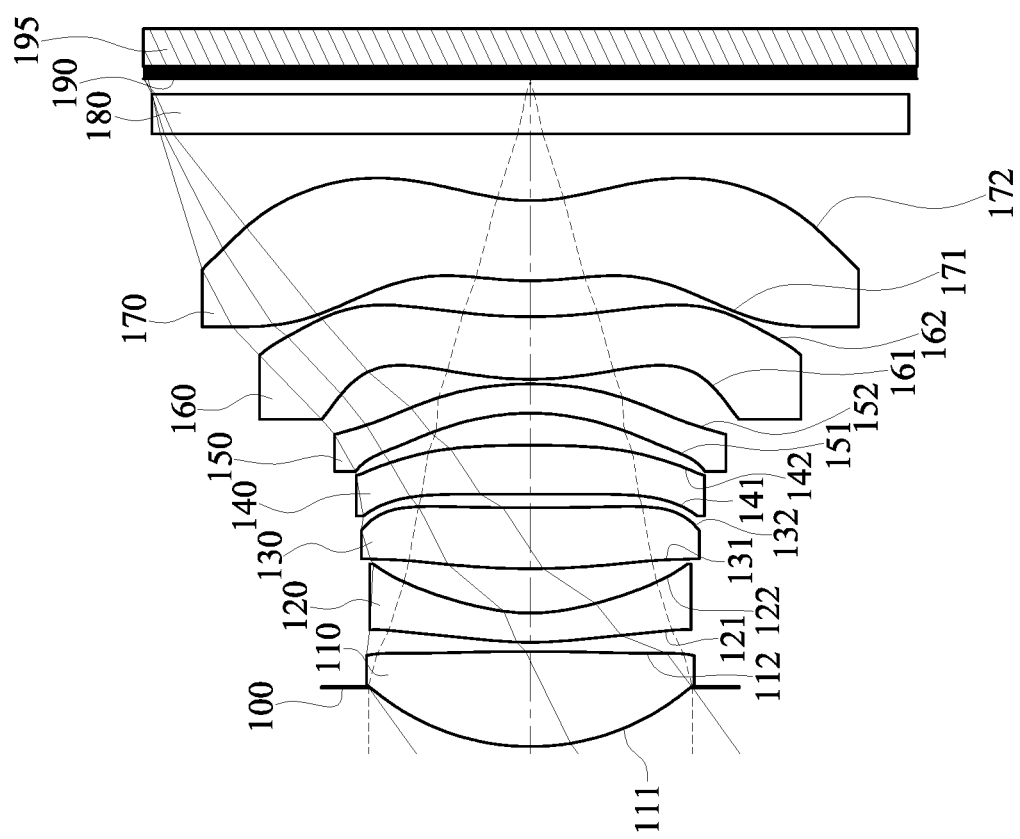
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element, a sixth lens element and a seventh lens element. The photographing optical lens assembly has a total of seven single non-cemented lens elements with refractive power.

The first lens element with positive refractive power can have an object-side surface being convex in a paraxial region thereof. Therefore, it is favorable for providing proper positive refractive power so as to effectively reduce a total track length of the photographing optical lens assembly.

The second lens element can have negative refractive power. The second lens element can have an image-side surface being concave in a paraxial region thereof. Therefore, it is favorable for correcting the aberration from the first lens element and improving the image quality.

The third lens element can have positive refractive power. The third lens element can have an object-side surface being convex in a paraxial region thereof. Therefore, it is favorable for effectively reducing the sensitivity of the photographing optical lens assembly so as to increase the yield rate.

The fourth lens element can have positive refractive power. Therefore, it is favorable for reducing the sensitivity with the first lens element having positive refractive power so as to further increase the yield rate.

The fifth lens element can have negative refractive power. The fifth lens element can have an object-side surface being concave in a paraxial region thereof and an image-side surface being convex in a paraxial region thereof. Therefore, it is favorable for correcting the astigmatism of the photographing optical lens assembly so as to improve the image quality.

The sixth lens element can have positive refractive power. The sixth lens element can have an object-side surface being convex in a paraxial region thereof and an image-side surface being concave in a paraxial region thereof. The image-side surface of the sixth lens element has at least one inflection point. Therefore, it is favorable for further correcting the astigmatism of the photographing optical lens assembly. Furthermore, it is favorable for balancing the arrangement of the refractive powers so as to avoid excessive aberration and improve the image quality.

The seventh lens element can have negative refractive power. The seventh lens element can have an object-side surface being convex in a paraxial region thereof and an image-side surface being concave in a paraxial region thereof. The image-side surface of the seventh lens element has at least one inflection point. Both of the object-side surface and the image-side surface of the seventh lens element are aspheric. Therefore, it is favorable for reducing a back focal length of the photographing optical lens assembly so as to keep a compact size. Furthermore, it is favorable for correcting the aberration of the off-axis so as to improve the image quality.

When a focal length of the photographing optical lens assembly is f, a vertical distance between a non-axial critical point on the image-side surface of the seventh lens element and an optical axis is Yc72, the following condition is satisfied: $0.1<Yc72/f<0.9$. Therefore, it is favorable for controlling the incident angle of the light projecting onto the image sensor so as to keep sufficient illumination in the peripheral region of the image. Furthermore, it is favorable for correcting the aberration of the off-axis so as to enhance the resolution of the photographing optical lens assembly.

When a focal length of the first lens element is f1, a focal length of the seventh lens element is f7, the following condition is satisfied: $|f1/f7|<3.0$. Therefore, it is favorable for properly distributing the refractive power of the photographing optical lens assembly adjacent to the object side so as to avoid excessive aberration.

When the focal length of the first lens element is f1, a focal length of the second lens element is f2, the following condition is satisfied: $|f1/f2|<2.0$. Therefore, it is favorable for reducing the total track length of the photographing optical lens assembly and correcting the aberration of the photographing optical lens assembly.

When an axial distance between the object-side surface of the first lens element and an image surface is TL, a maximum image height of the photographing optical lens assembly (half of a diagonal length of an effective photosensitive area of an image sensor) is ImgH, the following condition is satisfied: $TL/ImgH<2.20$. Therefore, it is favorable for miniaturizing the photographing optical lens assembly so as to be equipped in an electronic device.

The photographing optical lens assembly includes at least three lens elements having positive refractive power among the first lens element, the second lens element, the third lens element, the fourth lens element, the fifth lens element, the sixth lens element and the seventh lens element. Therefore, it is favorable for balancing the arrangement of the refractive powers of the photographing optical lens assembly so as to reduce the sensitivity of the photographing optical lens assembly.

When the focal length of the photographing optical lens assembly is f, a curvature radius of the image-side surface of the seventh lens element is R14, the following condition is satisfied: $0<R14/f<0.7$. Therefore, it is favorable for reducing the back focal length of the photographing optical lens assembly so as to keep a compact size.

When the focal length of the photographing optical lens assembly is f, a curvature radius of the image-side surface of the sixth lens element is R12, the following condition is satisfied: $0<f/R12<5.0$. Therefore, it is favorable for balancing the arrangement of the refractive powers of the photographing optical lens assembly so as to correct the aberration and improve the image quality. Preferably, the following condition is satisfied: $0<f/R12<3.0$.

When a curvature radius of the object-side surface of the seventh lens element is R13, the curvature radius of the image-side surface of the seventh lens element is R14, the following condition is satisfied: $0<(R13-R14)/(R13+R14)$ $<1.5$. Therefore, it is favorable for correcting the astigmatism of the photographing optical lens assembly and keeping a compact size.

When a sum of axial distances between any two lens elements adjacent to each other is ΣAT (a sum of an axial distance between the first lens element and the second lens element T12, an axial distance between the second lens element and the third lens element T23, an axial distance between the third lens element and the fourth lens element T34, an axial distance between the fourth lens element and the fifth lens element T45, an axial distance between the fifth lens element and the sixth lens element T56, and an axial distance between the sixth lens element and the seventh lens element T67. That is, ΣAT=T12+T23+T34+T45+T56+T67), the maximum image height of the photographing optical lens assembly is ImgH, the following condition is satisfied: $0.20<ΣAT/ImgH<0.60$. Therefore, it is favorable for properly arranging the lens elements so as to keep a compact size.

When an axial distance between the object-side surface of the first lens element and an image surface is TL, the focal length of the photographing optical lens assembly is f, the following condition is satisfied: $0.80<TL/f<1.80$. Therefore, it is favorable for adjusting the total track length of the photographing optical lens assembly so as to be equipped in the compact electronic device.

When a maximum refractive index among the first lens element, the second lens element, the third lens element, the fourth lens element, the fifth lens element, the sixth lens element and the seventh lens element is Nmax, the following condition is satisfied: $1.640 \leq Nmax<1.750$. Therefore, it is favorable for adjusting the refractive index of each lens element so that the material of each lens element can be properly chosen.

When an Abbe number of the second lens element is V2, the following condition is satisfied: $V2<26.0$. Therefore, it is favorable for correcting the chromatic aberration of the photographing optical lens assembly.

When a vertical distance between a non-axial critical point on the image-side surface of the sixth lens element and an optical axis is Yc62, the vertical distance between the non-axial critical point on the image-side surface of the seventh lens element and the optical axis is Yc72, the following condition is satisfied: $0.5<Yc62/Yc72<1.5$. Therefore, it is favorable for correcting the aberration of the off-axis so as to improve the image quality.

When the focal length of the photographing optical lens assembly is f, the following condition is satisfied: $3.0 [mm]<f<6.5 [mm]$. Therefore, it is favorable for adjusting the focal length of the photographing optical lens assembly so as to keep a compact size.

The photographing optical lens assembly further includes a stop. When an axial distance between the stop and the image-side surface of the seventh lens element is SD, an axial distance between the object-side surface of the first lens element and the image-side surface of the seventh lens element is TD, the following condition is satisfied: $0.75<SD/TD<1.1$. Therefore, it is favorable for obtaining a balance between the telecentric and wide-angle characteristics.

When a curvature radius of the object-side surface of the first lens element is R1, a curvature radius of an image-side surface of the first lens element is R2, the following condition is satisfied: $-0.2<R1/R2<0.2$. Therefore, it is favorable for correcting the spherical aberration of the photographing optical lens assembly. When the focal length of the photographing optical lens assembly is f, an entrance pupil diameter of the photographing optical lens assembly is EPD, the following condition is satisfied: $1.2<f/EPD<2.6$. Therefore, it is favorable for providing sufficient amount of incident light with large aperture stop so as to emphasize an imaged object with shallow depth of view.

When half of a maximal field of view of the photographing optical lens assembly is HFOV, the following condition is satisfied: 15 [deg.]<HFOV<45 [deg.]. Therefore, it is favorable for providing a sufficient field of view so as to obtain more of the image scene and avoiding the image distortion simultaneously.

When a central thickness of the first lens element is CT1, a central thickness of the second lens element is CT2, the following condition is satisfied: 1.0<CT1/CT2<5.5. Therefore, it is favorable for preventing the lens elements from unfavorable molding problem so that the thicknesses of the lens elements are more homogeneous.

When the axial distance between the second lens element and the third lens element is T23, the axial distance between the third lens element and the fourth lens element is T34, the following condition is satisfied: 0.5<T23/T34<4.5. Therefore, the lens elements can be tightly arranged so that it is favorable for reducing the total track length of the photographing optical lens assembly.

When the focal length of the first lens element is f1, the focal length of the second lens element is f2, a focal length of the third lens element is f3, a focal length of the fourth lens element is f4, a focal length of the fifth lens element is f5, a focal length of the sixth lens element is f6, the focal length of the seventh lens element is f7, the following condition is satisfied: $|f1|<|fi|$, wherein i=2, 3, 4, 5, 6, 7. Therefore, it is favorable for balancing the arrangement of the refractive power of the photographing optical lens assembly so as to correct the aberration of the photographing optical lens assembly.

When a curvature radius of the object-side surface of the sixth lens element is R11, the curvature radius of the image-side surface of the sixth lens element is R12, the following condition is satisfied: −2.0<(R11−R12)/(R11+R12)<0.2. Therefore, it is favorable for effectively correcting the astigmatism and reducing the back focal length of the photographing optical lens assembly.

When the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the following condition is satisfied: $|f/fj|$ max<1.8, wherein j=1, 2, 3, 4, 5, 6, 7 (That is, the refractive power of each lens element is the ratio of the focal length of the photographing optical lens assembly to the focal length of each lens element, and a maximum absolute value among the refractive powers is $|f/fj|$ max). Therefore, it is favorable for evenly distributing the refractive powers of the photographing optical lens assembly so as to reduce the refractive angle of the incident light. It is also favorable for correcting the aberration of the photographing optical lens assembly so as to improve the image quality.

When an Abbe number of the first lens element is V1, the Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, and at least three lens elements among the first lens element to the seventh lens element satisfy the following condition: Vi<26.0, wherein i=1, 2, 3, 4, 5, 6, 7 (For example, in the second embodiment described below,). Therefore, it is favorable for correcting the chromatic aberration of the photographing optical lens assembly so as to improve the image quality.

When the vertical distance between the non-axial critical point on the image-side surface of the sixth lens element and the optical axis is Yc62, a vertical distance between a non-axial critical point on the object-side surface of the sixth lens element and an optical axis is Yc61, the following condition is satisfied: 0.30<Yc62/Yc61<1.80. Therefore, it is favorable for effectively reducing the incident angle of the light projecting onto the image sensor so as to improve the image-sensing efficiency of the image sensor.

When the focal length of the photographing optical lens assembly is f, the focal length of the third lens element is f3, the following condition is satisfied: −0.5<f/f3<0.6. Therefore, it is favorable for effectively reducing the sensitivity of the photographing optical lens assembly so as to increase the yield rate.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the axial distance between the fifth lens element and the sixth lens element is T56, the axial distance between the sixth lens element and the seventh lens element is T67, the following condition is satisfied: 0<(T12/T23)+(T34/T45)+(T56/T67)<3.8. Therefore, it is favorable for adjusting the axial distance between any two adjacent lens elements so as to reduce the total track length of the photographing optical lens assembly, thereby keeping a compact size.

When the axial distance between the second lens element and the third lens element is T23, the central thickness of the second lens element is CT2, the following condition is satisfied: 0.3<T23/CT2<3.0. Therefore, it is favorable for manufacturing and assembling the photographing optical lens assembly so as to increase the yield rate.

When the focal length of the photographing optical lens assembly is f, a curvature radius of an image-side surface of the third lens element is R6, the following condition is satisfied: −1.0<f/R6<2.5. Therefore, it is favorable for effectively correcting the Petzval's sum of the photographing optical lens assembly so as to improve the flatness of the image surface.

According to the optical imaging lens assembly of the present disclosure, an air gap in a paraxial region is arranged between any two of the first lens element, the second lens element, the third lens element, the fourth lens element, the fifth lens element, the sixth lens element, and the seventh lens element that are adjacent to each other, that is, each of the first through seventh lens elements of the photographing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, there is an air gap in a paraxial region between any two of the first lens element, the second lens element, the third lens element, the fourth lens element, the fifth lens element, the sixth lens element, and the seventh lens element that are adjacent to each other in the present disclosure for solving the problem generated by the cemented lens elements.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing optical lens assembly and thereby provides a wider field of view for the same.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a lens element has a refractive power or a focus, it indicates the lens element has the refractive power in the paraxial region thereof or has the focus in the paraxial region thereof. Moreover, when the region of refractive power or focus of a lens element is not defined, it indicates that the region of refractive power or focus of the lens element is in the paraxial region thereof.

According to the photographing optical lens assembly of the present disclosure, an image surface of the photographing optical lens assembly, based on the corresponding image sensor, can be flat or curved, especially a curved surface being concave facing towards the object side of the photographing optical lens assembly.

Figure 27:
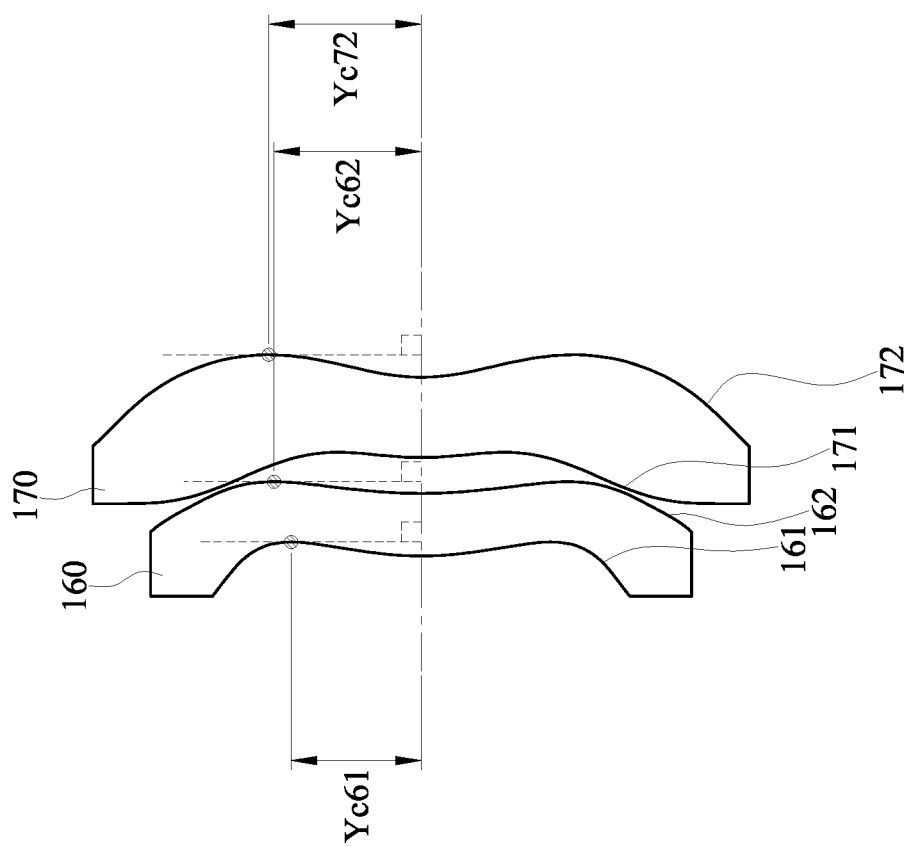
FIG. 27 is a schematic view of Yc61 and Yc62 of a sixth lens element and Yc72 of a seventh lens element in FIG. 1.

According to the photographing optical lens assembly of the present disclosure, a critical point on a lens surface of a lens element is a non-axial point of the lens surface where its tangent is perpendicular to an optical axis. As seen in FIG. 27, FIG. 27 is a schematic view of Yc61 and Yc62 of a sixth lens element and Yc72 of a seventh lens element in FIG. 1. The critical point on the object-side surface of the sixth lens element is a non-axial point on the object-side surface of the sixth lens element where its tangent is perpendicular to the optical axis. The critical point on the image-side surface of the sixth lens element is a non-axial point on the image-side surface of the sixth lens element where its tangent is perpendicular to the optical axis. The critical point on the image-side surface of the seventh lens element is a non-axial point on the image-side surface of the seventh lens element where its tangent is perpendicular to the optical axis. Specifically, the critical points mentioned above are not located on the optical axis.

According to the photographing optical lens assembly of the present disclosure, the photographing optical lens assembly can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. In some embodiments, the image capturing unit can further include a barrel member, a holding member or a combination thereof.

Figure 29:
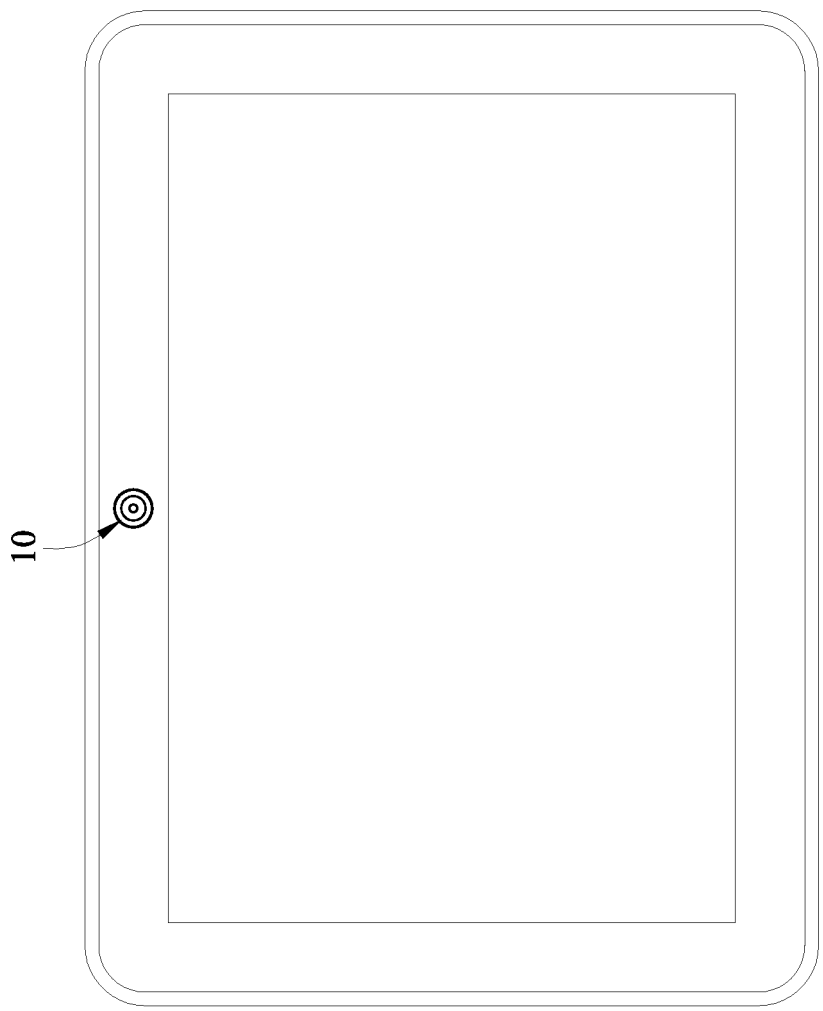
FIG. 29 shows an electronic device according to another embodiment.
Figure 28:
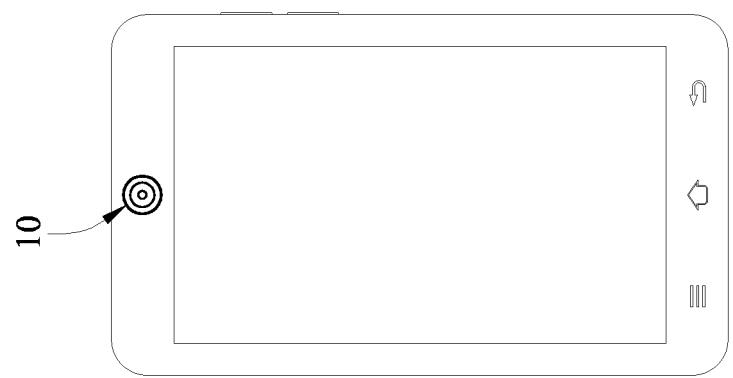
FIG. 28 shows an electronic device according to an embodiment.
Figure 30:
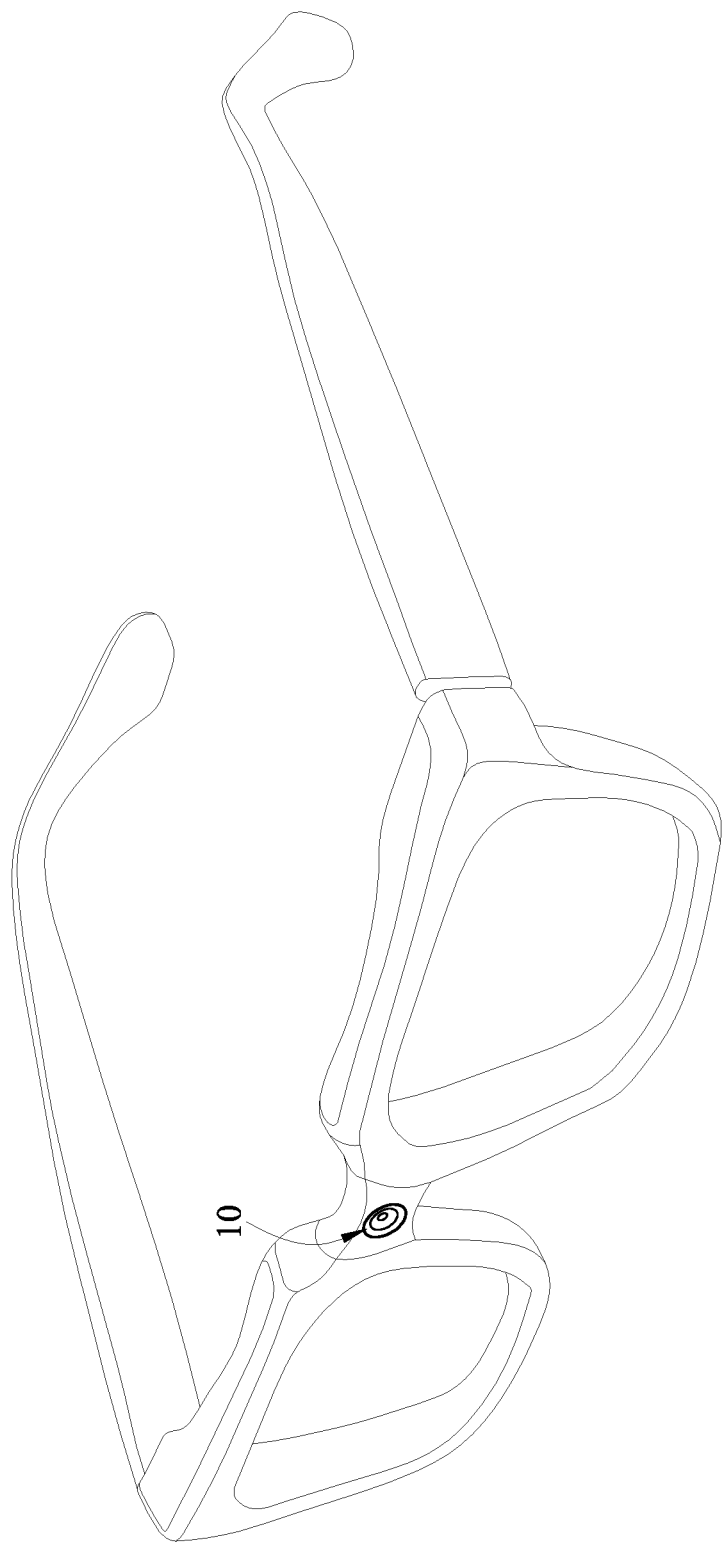
FIG. 30 shows an electronic device according to still another embodiment.

In FIG. 28, FIG. 29 and FIG. 30, an image capturing device 10 may be installed in, but not limited to, an electronic device, including a smart phone (FIG. 28), a tablet personal computer (FIG. 29) or a wearable device (FIG. 30). The three exemplary figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the photographing optical lens assembly of the present disclosure, the photographing optical lens assembly can be optionally applied to moving focus optical systems. Furthermore, the photographing optical lens assembly is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. According to the above description of the present disclosure, the following specific embodiments are provided for further explanation.

1st Embodiment

Figure 2:
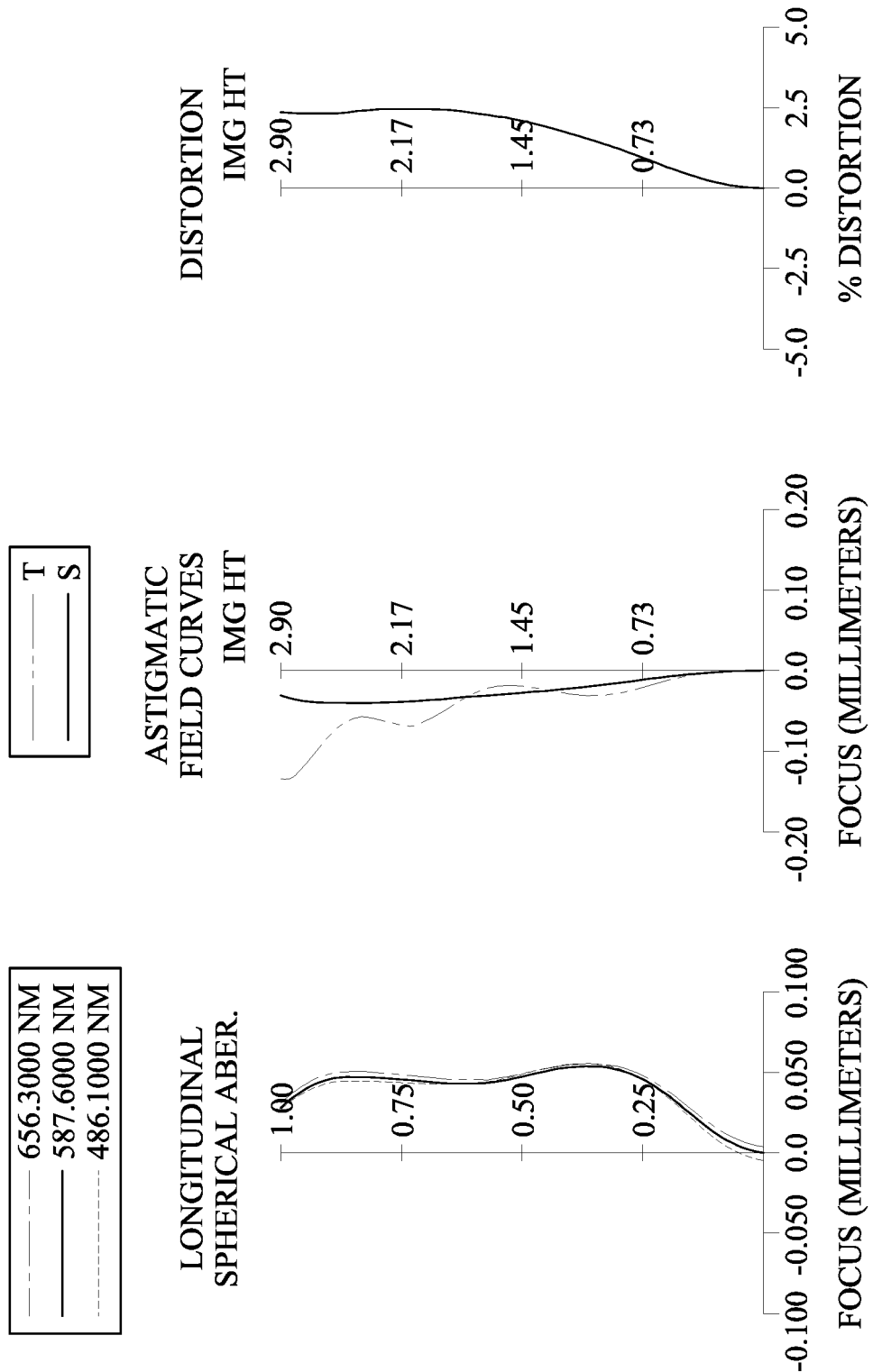
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 195. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190, wherein the photographing optical lens assembly has a total of seven non-cemented lens elements (110-170) with refractive power.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point.

The seventh lens element 170 with negative refractive power has an object-side surface 171 being convex in a paraxial region thereof and an image-side surface 172 being concave in a paraxial region thereof. The sixth lens element 170 is made of plastic material and has the object-side surface 171 and the image-side surface 172 being both aspheric. The image-side surface 172 of the seventh lens element 170 has at least one inflection point.

The IR-cut filter 180 is made of glass and located between the seventh lens element 170 and the image surface 190, and will not affect the focal length of the photographing optical lens assembly. The image sensor 195 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, "i" may be, but is not limited to, 4, 6, 8, 10, 12, 14 and 16.

In the photographing optical lens assembly of the image capturing unit according to the 1st embodiment, when a focal length of the photographing optical lens assembly is f, a f-number of the photographing optical lens assembly is Fno, and half of a maximal field of view of the photographing optical lens assembly is HFOV, these parameters have the following values: f=3.89 mm; Fno=1.60; and HFOV=35.8 degrees.

When a maximum refractive index among the first lens element 110, the second lens element 120, the third lens element 130, the fourth lens element 140, the fifth lens element 150, the sixth lens element 160 and the seventh lens element 170 is Nmax, the following condition is satisfied: Nmax=1.639.

When an Abbe number of the second lens element 120 is V2, the following condition is satisfied: V2=23.5.

When a central thickness of the first lens element 110 is CT1, a central thickness of the second lens element 120 is CT2, the following condition is satisfied: CT1/CT2=3.24.

When an axial distance between the second lens element 120 and the third lens element 130 is T23, the central thickness of the second lens element 120 is CT2, the following condition is satisfied: T23/CT2=1.51.

When the axial distance between the second lens element 120 and the third lens element 130 is T23, an axial distance between the third lens element 130 and the fourth lens element 140 is T34, the following condition is satisfied: T23/T34=3.30.

When an axial distance between the first lens element 110 and the second lens element 120 is T12, the axial distance between the second lens element 120 and the third lens element 130 is T23, the axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, the following condition is satisfied: (T12/T23)+(T34/T45)+(T56/T67)=0.76.

When a curvature radius of the object-side surface 111 of the first lens element 110 is R1, a curvature radius of the image-side surface 112 of the first lens element 110 is R2, the following condition is satisfied: R1/R2=−0.04.

When the focal length of the photographing optical lens assembly is f, a curvature radius of the image-side surface 132 of the third lens element 130 is R6, the following condition is satisfied: f/R6=0.18.

When the focal length of the photographing optical lens assembly is f, a curvature radius of the image-side surface 162 of the sixth lens element 160 is R12, the following condition is satisfied: f/R12=1.06.

When the focal length of the photographing optical lens assembly is f, a curvature radius of the image-side surface 172 of the seventh lens element 170 is R14, the following condition is satisfied: R14/f=0.36.

When a curvature radius of the object-side surface 161 of the sixth lens element 160 is R11, the curvature radius of the image-side surface 162 of the sixth lens element 160 is R12, the following condition is satisfied: (R11−R12)/(R11+R12)=−0.21.

When a curvature radius of the object-side surface 171 of the seventh lens element 170 is R13, the curvature radius of the image-side surface 172 of the seventh lens element 170 is R14, the following condition is satisfied: (R13−R14)/(R13+R14)=0.22.

When a focal length of the first lens element 110 is f1, a focal length of the second lens element 120 is f2, the following condition is satisfied: |f1/f2|=0.61.

When the focal length of the photographing optical lens assembly is f, a focal length of the third lens element 130 is f3, the following condition is satisfied: f/f3=0.30.

When the focal length of the first lens element 110 is f1, a focal length of the seventh lens element 170 is f7, the following condition is satisfied: |f1/f7|=0.35.

When the focal length of the photographing optical lens assembly is f, the focal length of the first lens element 110 is f1, the focal length of the second lens element 120 is f2, the focal length of the third lens element 130 is f3, a focal length of the fourth lens element 140 is f4, a focal length of the fifth lens element is f5, a focal length of the sixth lens element is f6, the focal length of the seventh lens element 170 is f7, the following condition is satisfied: |f/fj|max=1.17, wherein j=1, 2, 3, 4, 5, 6, 7.

When the focal length of the photographing optical lens assembly is f, an entrance pupil diameter of the photographing optical lens assembly is EPD, the following condition is satisfied: f/EPD=1.60.

When a vertical distance between a non-axial critical point on the object-side surface 161 of the sixth lens element 160 and an optical axis is Yc61, a vertical distance between a non-axial critical point on the image-side surface 162 of the sixth lens element 160 and the optical axis is Yc62, the following condition is satisfied: Yc62/Yc61=1.13.

When the vertical distance between the non-axial critical point on the image-side surface 162 of the sixth lens element 160 and the optical axis is Yc62, a vertical distance between a non-axial critical point on the image-side surface 172 of the seventh lens element 170 and the optical axis is Yc72, the following condition is satisfied: Yc62/Yc72=0.97.

When the focal length of the photographing optical lens assembly is f, the vertical distance between the non-axial critical point on the image-side surface 172 of the seventh lens element 170 and the optical axis is Yc72, the following condition is satisfied: Yc72/f=0.29.

When a sum of axial distances between any two lens elements adjacent to each other is ΣAT, a maximum image height of the photographing optical lens assembly is ImgH, the following condition is satisfied: ΣAT/ImgH=0.36.

When an axial distance between the stop 100 and the image-side surface 172 of the seventh lens element 170 is SD, an axial distance between the object-side surface 111 of the first lens element 110 and the image-side surface 172 of the seventh lens element 170 is TD, the following condition is satisfied: SD/TD=0.89.

When the focal length of the photographing optical lens assembly is f, an axial distance between the object-side surface 111 of the first lens element 110 and the image surface 190 is TL, the following condition is satisfied: TL/f=1.29.

When the axial distance between the object-side surface 111 of the first lens element 110 and the image surface 190 is TL, the maximum image height of the photographing optical lens assembly is ImgH, the following condition is satisfied: TL/ImgH=1.73.

The detailed optical data of the 1st embodiment are shown in Table 1 and the aspheric surface data are shown in Table 2 below.

TABLE 1

1st Embodiment
f = 3.89 mm, Fno = 1.60, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.445 | | | | |
| 2 | Lens 1 | 1.861 | (ASP) | 0.713 | Plastic | 1.544 | 55.9 | 3.31 |
| 3 | | −50.000 | (ASP) | 0.070 | | | | |
| 4 | Lens 2 | 2.427 | (ASP) | 0.220 | Plastic | 1.639 | 23.5 | −5.42 |
| 5 | | 1.376 | (ASP) | 0.333 | | | | |
| 6 | Lens 3 | 5.287 | (ASP) | 0.458 | Plastic | 1.544 | 55.9 | 12.81 |
| 7 | | 21.225 | (ASP) | 0.101 | | | | |
| 8 | Lens 4 | 40.356 | (ASP) | 0.369 | Plastic | 1.544 | 55.9 | 17.68 |
| 9 | | −12.590 | (ASP) | 0.241 | | | | |
| 10 | Lens 5 | −1.936 | (ASP) | 0.220 | Plastic | 1.639 | 23.5 | −10.96 |
| 11 | | −2.793 | (ASP) | 0.035 | | | | |
| 12 | Lens 6 | 2.402 | (ASP) | 0.470 | Plastic | 1.544 | 55.9 | 11.37 |
| 13 | | 3.656 | (ASP) | 0.270 | | | | |
| 14 | Lens 7 | 2.231 | (ASP) | 0.603 | Plastic | 1.544 | 55.9 | −9.57 |
| 15 | | 1.413 | (ASP) | 0.500 | | | | |
| 16 | IR-cut filter | Plano | | 0.300 | Glass | 1.517 | 64.2 | — |
| 17 | | Plano | | 0.116 | | | | |
| 18 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | 1.7990E−01 | −5.0000E+01 | −3.7850E+01 | −1.1503E+01 | −2.2211E+01 |
| A4 = | 1.8688E−03 | −1.1834E−01 | −1.6577E−01 | 1.0439E−01 | −8.0820E−03 |
| A6 = | −1.9898E−02 | 3.6425E−01 | 4.0582E−01 | −2.3155E−01 | −5.1877E−03 |
| A8 = | 5.0054E−02 | −5.0161E−01 | −5.1830E−01 | 4.9683E−01 | 2.7782E−02 |
| A10 = | −6.7256E−02 | 3.8340E−01 | 3.8206E−01 | −5.6790E−01 | −5.3704E−02 |
| A12 = | 4.4540E−02 | −1.5437E−01 | −1.5562E−01 | 3.2180E−01 | 2.6543E−02 |
| A14 = | −1.1697E−02 | 2.4066E−02 | 2.6059E−02 | −6.9334E−02 | −2.2918E−03 |

| Surface # | 7 | 8 | 9 | 10 | 11 |
|---|---|---|---|---|---|
| k = | 6.8462E+01 | 9.0000E+01 | 4.6815E+01 | 6.5623E−01 | −3.7929E+00 |
| A4 = | 3.9608E−03 | −2.3105E−02 | −1.1729E−01 | −4.5949E−02 | −1.7335E−01 |
| A6 = | −1.8838E−02 | −2.4258E−02 | 1.2332E−01 | 2.5817E−01 | 2.6799E−01 |
| A8 = | −1.2663E−02 | −8.3396E−03 | −1.0768E−01 | −4.2031E−01 | −2.9972E−01 |
| A10 = | −5.5376E−03 | 2.1290E−03 | −1.1621E−01 | 4.0009E−01 | 2.1850E−01 |
| A12 = | 1.5245E−04 | 9.0359E−07 | 3.0776E−01 | −1.7201E−01 | −8.0671E−02 |
| A14 = | — | — | −2.0573E−01 | 2.4454E−02 | 1.1419E−02 |
| A16 = | — | — | 4.5153E−02 | — | — |

| Surface # | 12 | 13 | 14 | 15 |
|---|---|---|---|---|
| k = | −1.0154E+01 | −2.8867E+01 | −1.2740E+00 | −1.5032E+00 |
| A4 = | −4.7196E−02 | −4.4053E−03 | −3.7988E−01 | −2.8152E−01 |
| A6 = | 4.0538E−02 | 7.2044E−03 | 1.9026E−01 | 1.6649E−01 |
| A8 = | −8.2830E−02 | −2.6623E−02 | −5.8409E−02 | −7.5287E−02 |
| A10 = | 4.9781E−02 | 1.1357E−02 | 1.3532E−02 | 2.2737E−02 |
| A12 = | −1.8431E−02 | −1.7148E−03 | −2.2718E−03 | −4.1787E−03 |
| A14 = | 3.1056E−03 | 7.8603E−05 | 2.3106E−04 | 4.1514E−04 |
| A16 = | — | — | −1.0297E−05 | −1.6939E−05 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
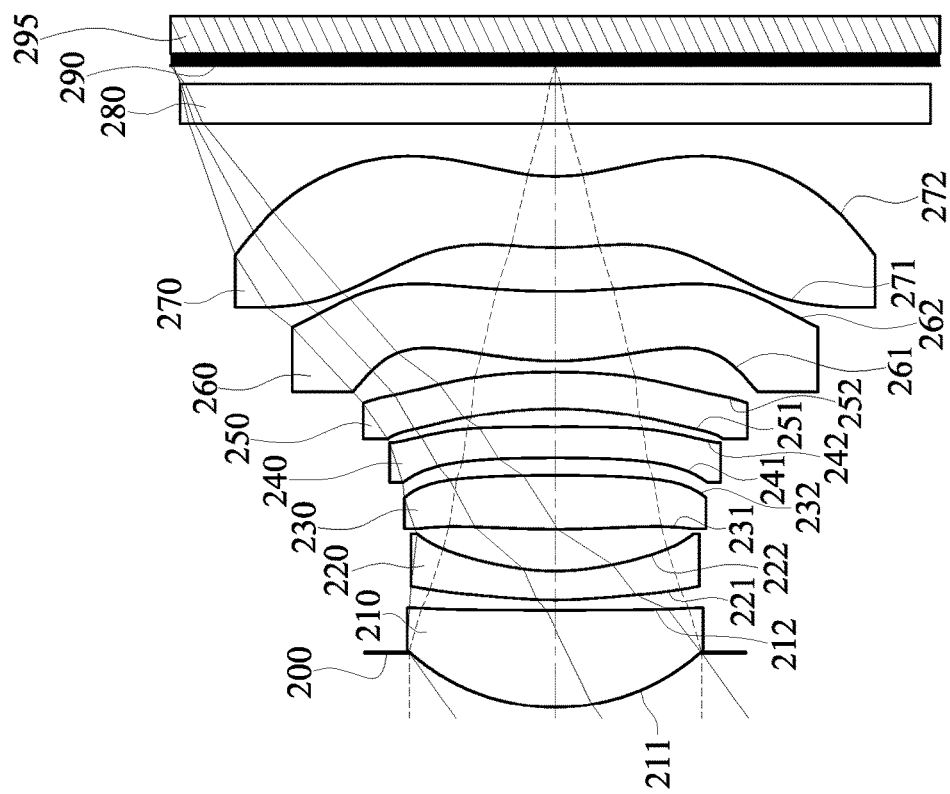
FIG. 3 is a schematic view of an image capturing unit according to the 2nd embodiment of the present disclosure.
Figure 4:
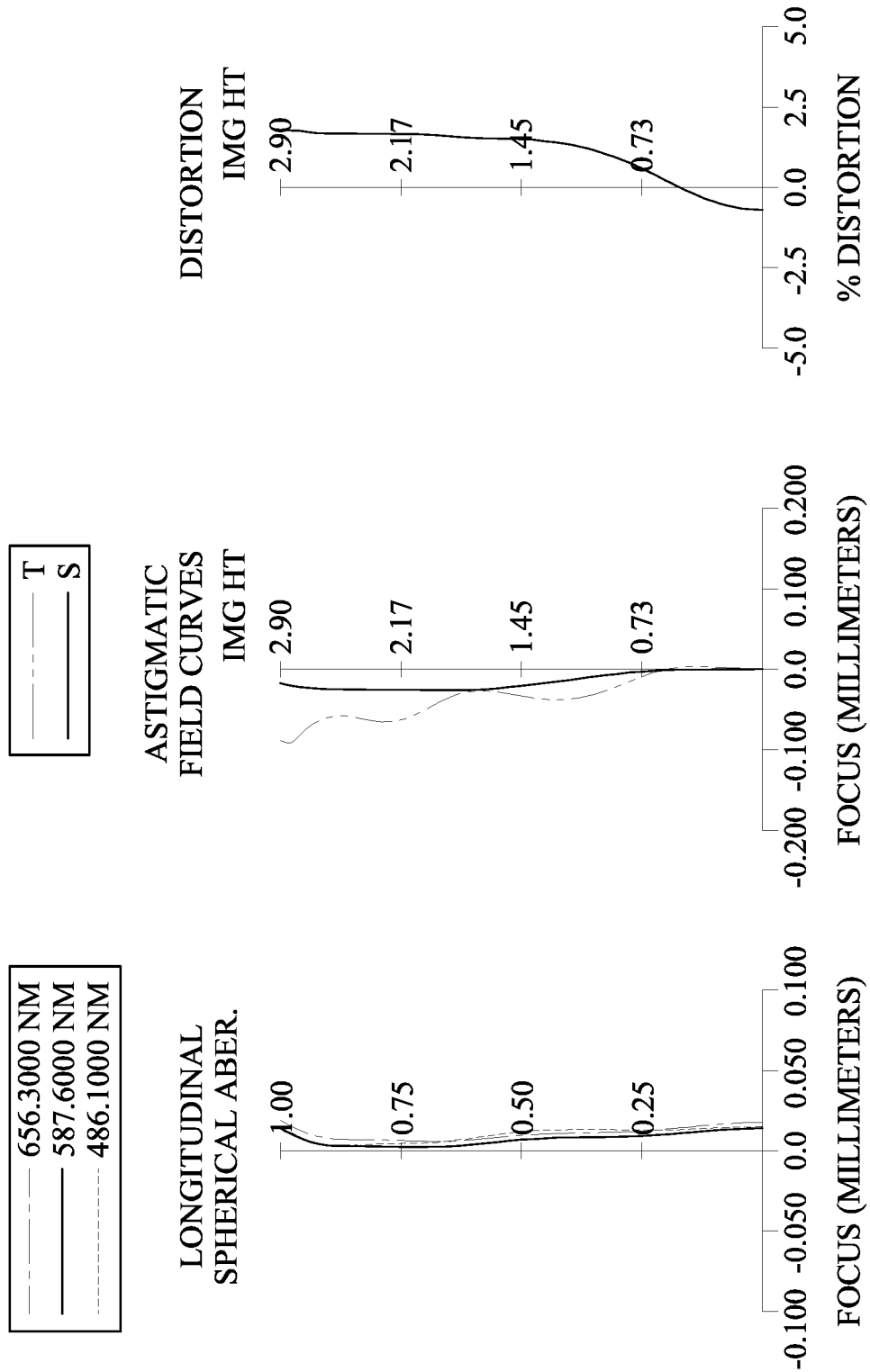
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 295. The photographing optical lens assembly includes, in order from an object side to an image side an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290, wherein the photographing optical lens assembly has a total of seven non-cemented lens elements (210-270) with refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point.

The seventh lens element 270 with negative refractive power has an object-side surface 271 being convex in a paraxial region thereof and an image-side surface 272 being concave in a paraxial region thereof. The sixth lens element 270 is made of plastic material and has the object-side surface 271 and the image-side surface 272 being both aspheric. The image-side surface 272 of the seventh lens element 270 has at least one inflection point.

The IR-cut filter 280 is made of glass and located between the seventh lens element 270 and the image surface 290, and will not affect the focal length of the photographing optical lens assembly. The image sensor 295 is disposed on or near the image surface 290 of the photographing optical lens assembly.

The detailed optical data of the 2nd embodiment are shown in Table 3 and the aspheric surface data are shown in Table 4 below.

TABLE 3

2nd Embodiment
f = 3.98 mm, Fno = 1.80, HFOV = 35.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.415 | | | | |
| 2 | Lens 1 | 1.673 | (ASP) | 0.732 | Plastic | 1.544 | 55.9 | 3.32 |
| 3 | | 18.815 | (ASP) | 0.078 | | | | |
| 4 | Lens 2 | 2.979 | (ASP) | 0.220 | Plastic | 1.650 | 21.4 | −6.65 |
| 5 | | 1.712 | (ASP) | 0.316 | | | | |
| 6 | Lens 3 | 7.614 | (ASP) | 0.406 | Plastic | 1.544 | 55.9 | 8.84 |
| 7 | | −12.829 | (ASP) | 0.131 | | | | |
| 8 | Lens 4 | −13.333 | (ASP) | 0.233 | Plastic | 1.650 | 21.4 | −18.53 |
| 9 | | 125.000 | (ASP) | 0.141 | | | | |
| 10 | Lens 5 | −3.550 | (ASP) | 0.280 | Plastic | 1.639 | 23.5 | −11.85 |
| 11 | | −6.890 | (ASP) | 0.082 | | | | |
| 12 | Lens 6 | 2.189 | (ASP) | 0.524 | Plastic | 1.544 | 55.9 | 7.25 |
| 13 | | 4.500 | (ASP) | 0.331 | | | | |
| 14 | Lens 7 | 2.852 | (ASP) | 0.539 | Plastic | 1.544 | 55.9 | −6.43 |
| 15 | | 1.466 | (ASP) | 0.400 | | | | |
| 16 | IR-cut filter | Plano | | 0.300 | Glass | 1.517 | 64.2 | — |
| 17 | | Plano | | 0.138 | | | | |
| 18 | Image | Plano | | — | | | | |

Note:
Reference wavelength is 587.6 nm (d-line).

TABLE 4

Aspheric Coefficients

| | Surface # | | | | |
|---|---|---|---|---|---|
| | 2 | 3 | 4 | 5 | 6 |
| k = | 1.8100E−01 | −2.5097E+01 | −4.2213E+01 | −1.7319E+01 | −7.0734E+01 |
| A4 = | 1.2161E−03 | −1.2617E−01 | −1.5511E−01 | 1.1895E−01 | −3.1231E−02 |
| A6 = | −2.1059E−02 | 3.5794E−01 | 4.0395E−01 | −2.3236E−01 | −1.8346E−02 |
| A8 = | 4.9825E−02 | −4.9464E−01 | −5.1797E−01 | 4.9764E−01 | 2.9435E−02 |
| A10 = | −6.6592E−02 | 3.8623E−01 | 3.8718E−01 | −5.6017E−01 | −5.0615E−02 |
| A12 = | 4.4266E−02 | −1.5896E−01 | −1.5285E−01 | 3.2592E−01 | 2.7953E−02 |
| A14 = | −1.1917E−02 | 2.5457E−02 | 2.3777E−02 | −6.5309E−02 | −9.7137E−04 |

| | Surface # | | | | |
|---|---|---|---|---|---|
| | 7 | 8 | 9 | 10 | 11 |
| k = | −6.9565E+01 | 9.0000E+01 | −9.0000E+01 | 1.8511E+00 | −5.1790E+00 |
| A4 = | −6.2345E−03 | −2.7054E−02 | −1.1638E−01 | −5.4728E−02 | −1.6881E−01 |
| A6 = | −2.5900E−02 | −1.9293E−02 | 1.2364E−01 | 2.3223E−01 | 2.6813E−01 |
| A8 = | −1.2351E−02 | −1.1986E−02 | −1.1263E−01 | −4.2344E−01 | −3.0123E−01 |
| A10 = | −6.3732E−03 | 2.5025E−03 | −1.1900E−01 | 4.0113E−01 | 2.1806E−01 |
| A12 = | 2.7261E−04 | −5.4314E−04 | 3.0858E−01 | −1.7134E−01 | −8.0785E−02 |
| A14 = | — | — | −2.0355E−01 | 2.4330E−02 | 1.1392E−02 |
| A16 = | — | — | 4.5152E−02 | — | — |

TABLE 4-continued

| Aspheric Coefficients | | | | |
|---|---|---|---|---|
| | Surface # | | | |
| | 12 | 13 | 14 | 15 |
| k = | −1.6684E+01 | −8.6382E+01 | −8.1998E−01 | −1.5219E+00 |
| A4 = | −3.9615E−02 | −2.1431E−03 | −3.7628E−01 | −2.8325E−01 |
| A6 = | 3.8600E−02 | 8.5664E−03 | 1.9019E−01 | 1.6639E−01 |
| A8 = | −8.2939E−02 | −2.6536E−02 | −5.8449E−02 | −7.5248E−02 |
| A10 = | 5.0185E−02 | 1.1174E−02 | 1.3528E−02 | 2.2744E−02 |
| A12 = | −1.8395E−02 | −1.7084E−03 | −2.2724E−03 | −4.1790E−03 |
| A14 = | 3.1339E−03 | 8.4600E−05 | 2.3107E−04 | 4.1489E−04 |
| A16 = | — | — | −1.0270E−05 | −1.6956E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.98 | (R13 − R14)/(R13 + R14) | 0.32 |
| Fno | 1.80 | \|f1/f2\| | 0.50 |
| HFOV [deg.] | 35.4 | f/f3 | 0.45 |
| Nmax | 1.650 | \|f1/f7\| | 0.52 |
| V2 | 21.4 | \|f/fj\| max | 1.20 |
| CT1/CT2 | 3.33 | f/EPD | 1.80 |
| T23/CT2 | 1.44 | Yc62/Yc61 | 1.08 |
| T23/T34 | 2.41 | Yc62/Yc72 | 0.95 |
| (T12/T23) + (T34/T45) + (T56/T67) | 1.42 | Yc72/f | 0.28 |
| R1/R2 | 0.09 | ΣAT/ImgH | 0.37 |
| f/R6 | −0.31 | SD/TD | 0.90 |
| f/R12 | 0.88 | TL/f | 1.22 |
| R14/f | 0.37 | TL/ImgH | 1.67 |
| (R11 − R12)/(R11 + R12) | −0.35 | | |

3rd Embodiment

Figure 5:
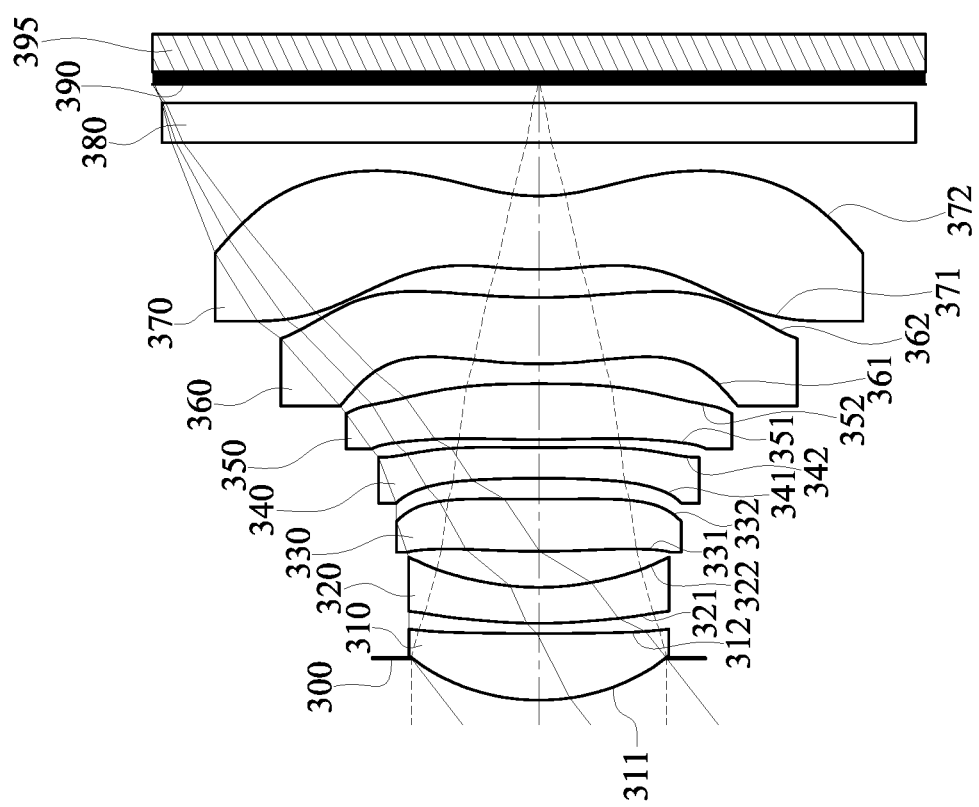
FIG. 5 is a schematic view of an image capturing unit according to the 3rd embodiment of the present disclosure.
Figure 6:
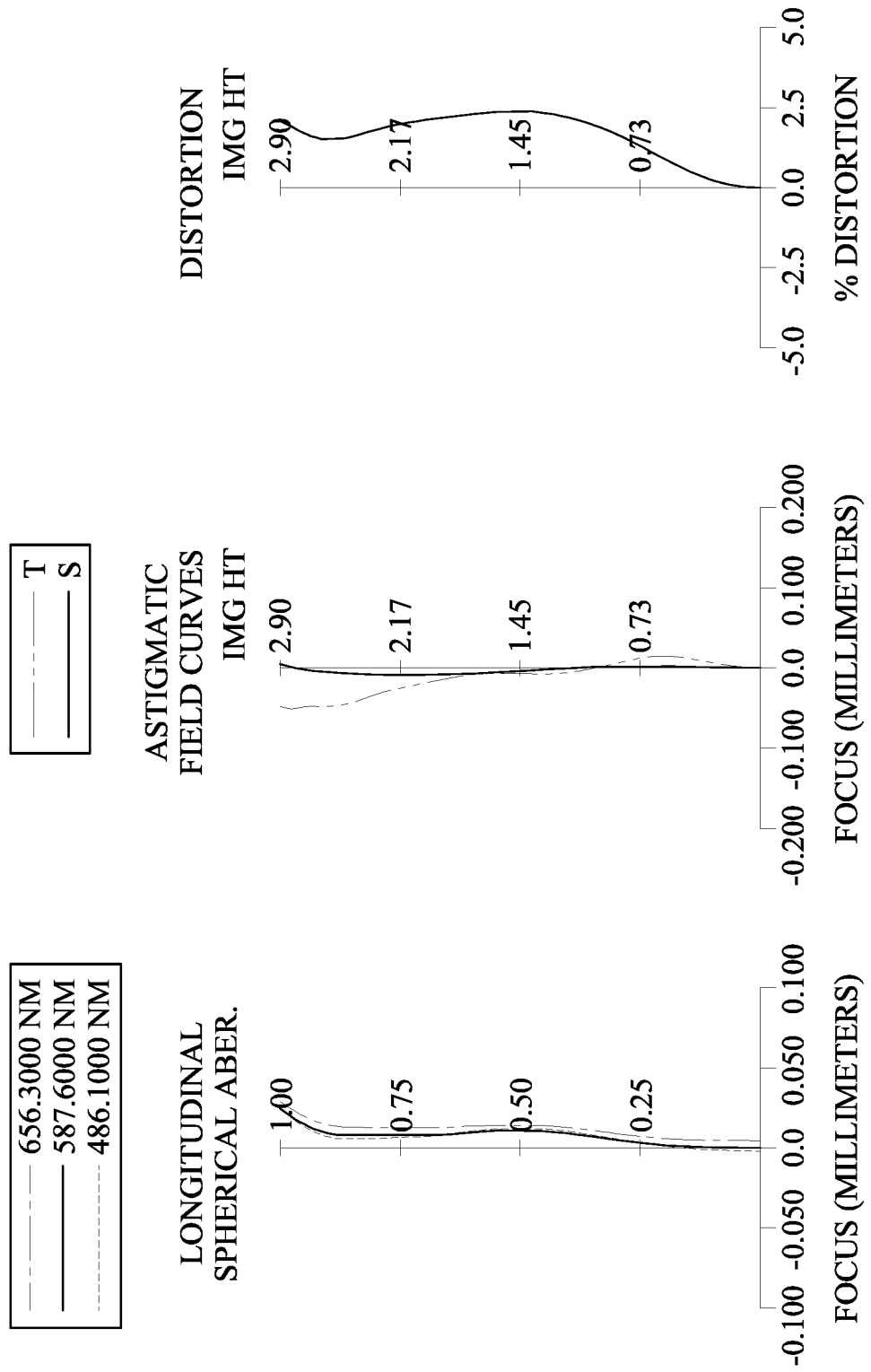
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 395. The photographing optical lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, an IR-cut filter 380 and an image surface 390, wherein the photographing optical lens assembly has a total of seven non-cemented lens elements (310-370) with refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point.

The seventh lens element 370 with negative refractive power has an object-side surface 371 being convex in a paraxial region thereof and an image-side surface 372 being concave in a paraxial region thereof. The sixth lens element 370 is made of plastic material and has the object-side surface 371 and the image-side surface 372 being both aspheric. The image-side surface 372 of the seventh lens element 370 has at least one inflection point.

The IR-cut filter 380 is made of glass and located between the seventh lens element 370 and the image surface 390, and will not affect the focal length of the photographing optical lens assembly. The image sensor 395 is disposed on or near the image surface 390 of the photographing optical lens assembly.

The detailed optical data of the 3rd embodiment are shown in Table 5 and the aspheric surface data are shown in Table 6 below.

TABLE 5

3rd Embodiment
f = 3.65 mm, Fno = 1.90, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.315 | | | | |
| 2 | Lens 1 | 1.629 | (ASP) | 0.500 | Plastic | 1.544 | 55.9 | 3.36 |
| 3 | | 13.484 | (ASP) | 0.077 | | | | |
| 4 | Lens 2 | 3.326 | (ASP) | 0.271 | Plastic | 1.650 | 21.4 | −7.51 |
| 5 | | 1.914 | (ASP) | 0.270 | | | | |
| 6 | Lens 3 | 6.139 | (ASP) | 0.393 | Plastic | 1.544 | 55.9 | 14.00 |
| 7 | | 30.926 | (ASP) | 0.157 | | | | |
| 8 | Lens 4 | −9.731 | (ASP) | 0.230 | Plastic | 1.650 | 21.4 | −9.17 |
| 9 | | 15.504 | (ASP) | 0.060 | | | | |
| 10 | Lens 5 | 8.375 | (ASP) | 0.420 | Plastic | 1.544 | 55.9 | 10.15 |
| 11 | | −15.944 | (ASP) | 0.149 | | | | |
| 12 | Lens 6 | 2.897 | (ASP) | 0.499 | Plastic | 1.544 | 55.9 | 15.39 |
| 13 | | 4.161 | (ASP) | 0.211 | | | | |
| 14 | Lens 7 | 2.529 | (ASP) | 0.552 | Plastic | 1.544 | 55.9 | −6.49 |
| 15 | | 1.360 | (ASP) | 0.400 | | | | |
| 16 | IR-cut filter | Plano | | 0.300 | Glass | 1.517 | 64.2 | — |
| 17 | | Plano | | 0.139 | | | | |
| 18 | Image | Plano | | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | 2.0179E−01 | 4.0042E+01 | −3.6055E+01 | −1.9011E+01 | −5.0000E+01 |
| A4 = | −1.6154E−03 | −1.2601E−01 | −1.3594E−01 | 1.2763E−01 | −7.1145E−02 |
| A6 = | −1.2454E−02 | 3.5287E−01 | 4.1483E−01 | −2.0795E−01 | −5.6667E−03 |
| A8 = | 4.1966E−02 | −4.7518E−01 | −5.2444E−01 | 4.9453E−01 | 2.2018E−02 |
| A10 = | −6.3923E−02 | 3.9330E−01 | 3.8071E−01 | −5.7480E−01 | −2.9138E−02 |
| A12 = | 5.5731E−02 | −1.7583E−01 | −1.5383E−01 | 3.2571E−01 | 5.7097E−02 |
| A14 = | −1.4862E−02 | 3.0628E−02 | 1.2377E−02 | −7.7776E−02 | −4.6188E−02 |

| | Surface # | | | | |
|---|---|---|---|---|---|
| | 7 | 8 | 9 | 10 | 11 |
| k = | −2.8582E+01 | 7.8411E+01 | −3.3333E+01 | −9.0000E+01 | 7.3877E+01 |
| A4 = | −4.0830E−02 | −1.3039E−02 | −1.3719E−01 | −1.3756E−01 | −1.8656E−01 |
| A6 = | −6.9467E−02 | −1.2086E−02 | 1.3287E−01 | 2.4907E−01 | 2.6422E−01 |
| A8 = | 9.0966E−03 | −4.7147E−02 | −1.0724E−01 | −4.2735E−01 | −2.9683E−01 |
| A10 = | −2.4870E−02 | 6.0740E−03 | −1.2058E−01 | 3.9917E−01 | 2.1950E−01 |
| A12 = | 2.4340E−03 | 7.6223E−03 | 3.0729E−01 | −1.7010E−01 | −8.0920E−02 |
| A14 = | −5.8876E−12 | 1.1523E−11 | −2.0217E−01 | 2.4518E−02 | 1.0993E−02 |
| A16 = | — | — | 4.5152E−02 | — | — |

| | Surface # | | | |
|---|---|---|---|---|
| | 12 | 13 | 14 | 15 |
| k = | −2.7405E+01 | −6.8048E+01 | −8.7458E−01 | −1.4766E+00 |
| A4 = | −6.7523E−02 | −2.5490E−02 | −3.8149E−01 | −2.7976E−01 |
| A6 = | 3.6482E−02 | 1.2104E−02 | 1.9095E−01 | 1.6707E−01 |
| A8 = | −8.0399E−02 | −2.5924E−02 | −5.8415E−02 | −7.5493E−02 |
| A10 = | 5.0870E−02 | 1.1109E−02 | 1.3524E−02 | 2.2766E−02 |
| A12 = | −1.8186E−02 | −1.7220E−03 | −2.2742E−03 | −4.1806E−03 |
| A14 = | 3.0474E−03 | 8.6956E−05 | 2.3093E−04 | 4.1462E−04 |
| A16 = | — | — | −1.0240E−05 | −1.6890E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.65 | (R13 − R14)/(R13 + R14) | 0.30 |
| Fno | 1.90 | \|f1/f2\| | 0.45 |
| HFOV [deg.] | 37.9 | f/f3 | 0.26 |
| Nmax | 1.650 | \|f1/f7\| | 0.52 |
| V2 | 21.4 | \|f/fj\| max | 1.09 |
| CT1/CT2 | 1.85 | f/EPD | 1.90 |
| T23/CT2 | 1.00 | Yc62/Yc61 | 1.13 |
| T23/T34 | 1.72 | Yc62/Yc72 | 0.76 |
| (T12/T23) + (T34/T45) + (T56/T67) | 3.61 | Yc72/f | 0.33 |
| R1/R2 | 0.12 | ΣAT/ImgH | 0.32 |
| f/R6 | 0.12 | SD/TD | 0.92 |
| f/R12 | 0.88 | TL/f | 1.27 |
| R14/f | 0.37 | TL/ImgH | 1.60 |
| (R11 − R12)/(R11 + R12) | −0.18 | | |

4th Embodiment

Figure 7:
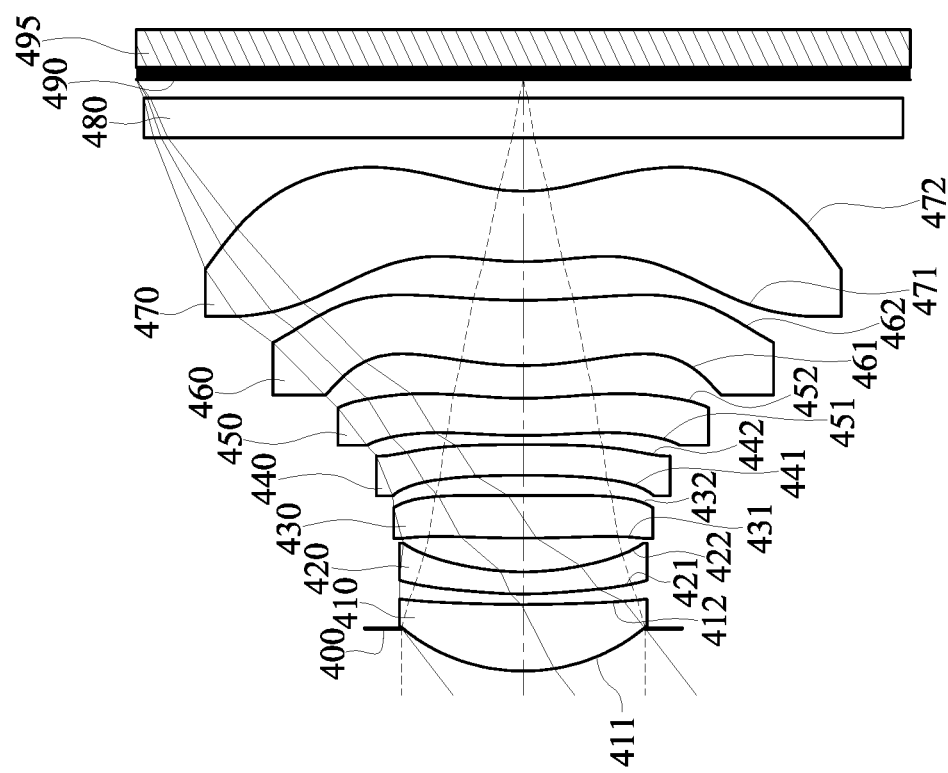
FIG. 7 is a schematic view of an image capturing unit according to the 4th embodiment of the present disclosure.
Figure 8:
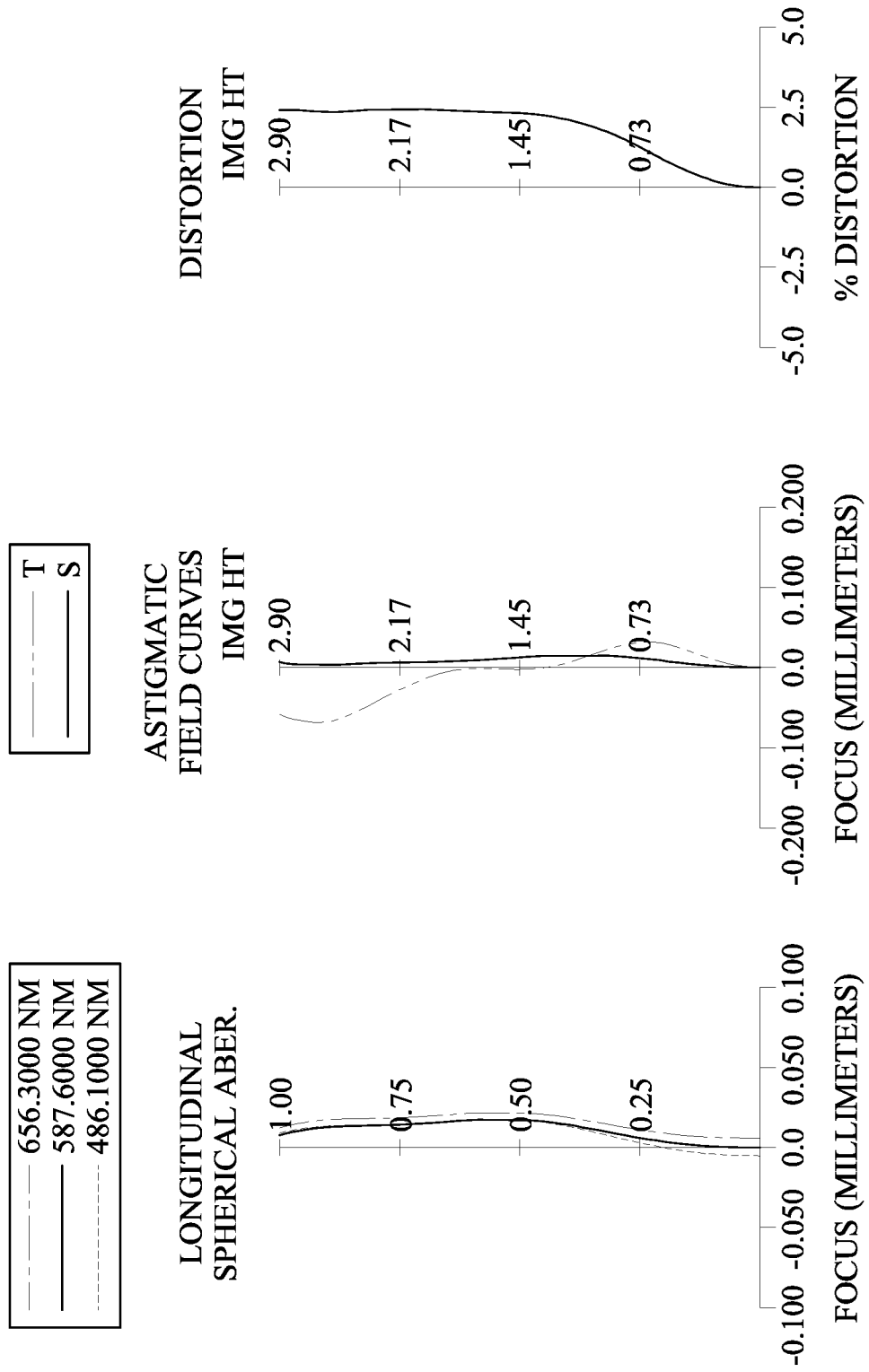
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 495. The photographing optical lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, an IR-cut filter 480 and an image surface 490, wherein the photographing optical lens assembly has a total of seven non-cemented lens elements (410-470) with refractive power.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point.

The seventh lens element 470 with negative refractive power has an object-side surface 471 being convex in a paraxial region thereof and an image-side surface 472 being concave in a paraxial region thereof. The sixth lens element 470 is made of plastic material and has the object-side surface 471 and the image-side surface 472 being both aspheric. The image-side surface 472 of the seventh lens element 470 has at least one inflection point.

The IR-cut filter 480 is made of glass and located between the seventh lens element 470 and the image surface 490, and will not affect the focal length of the photographing optical lens assembly. The image sensor 495 is disposed on or near the image surface 490 of the photographing optical lens assembly.

The detailed optical data of the 4th embodiment are shown in Table 7 and the aspheric surface data are shown in Table 8 below.

TABLE 7

4th Embodiment
f = 3.66 mm, Fno = 2.00, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.321 | | | | |
| 2 | Lens 1 | 1.454 | (ASP) | 0.500 | Plastic | 1.544 | 55.9 | 3.15 |
| 3 | | 8.355 | (ASP) | 0.079 | | | | |
| 4 | Lens 2 | 2.920 | (ASP) | 0.166 | Plastic | 1.650 | 21.4 | −7.83 |
| 5 | | 1.814 | (ASP) | 0.254 | | | | |
| 6 | Lens 3 | 8.485 | (ASP) | 0.320 | Plastic | 1.544 | 55.9 | 19.57 |
| 7 | | 41.177 | (ASP) | 0.152 | | | | |

TABLE 7-continued

4th Embodiment
f = 3.66 mm, Fno = 2.00, HFOV = 37.6 deg.

| Surface # | | Curvature Radius | | Thickness | Material | Index | Abbe # | Focal Length |
|---|---|---|---|---|---|---|---|---|
| 8 | Lens 4 | −8.900 | (ASP) | 0.230 | Plastic | 1.650 | 21.4 | −17.96 |
| 9 | | −37.880 | (ASP) | 0.069 | | | | |
| 10 | Lens 5 | 3.720 | (ASP) | 0.280 | Plastic | 1.650 | 21.4 | −24.38 |
| 11 | | 2.923 | (ASP) | 0.246 | | | | |
| 12 | Lens 6 | 2.284 | (ASP) | 0.490 | Plastic | 1.544 | 55.9 | 8.12 |
| 13 | | 4.372 | (ASP) | 0.291 | | | | |
| 14 | Lens 7 | 2.176 | (ASP) | 0.530 | Plastic | 1.535 | 55.7 | −8.08 |
| 15 | | 1.324 | (ASP) | 0.400 | | | | |
| 16 | IR-cut filter | Plano | | 0.300 | Glass | 1.517 | 64.2 | — |
| 17 | | Plano | | 0.138 | | | | |
| 18 | Image | Plano | | — | | | | |

Note:
Reference wavelength is 587.6 nm (d-line).

TABLE 8

Aspheric Coefficients

| | | | Surface # | | |
|---|---|---|---|---|---|
| | 2 | 3 | 4 | 5 | 6 |
| k = | 1.9505E−01 | 2.0741E+01 | −4.6124E+01 | −2.1269E+01 | 5.2858E+00 |
| A4 = | −2.2156E−03 | −1.2598E−01 | −1.3019E−01 | 1.3082E−01 | −6.8701E−02 |
| A6 = | −1.2443E−02 | 3.4058E−01 | 4.2228E−01 | −1.8193E−01 | −1.5778E−02 |
| A8 = | 3.6453E−02 | −4.8528E−01 | −5.2414E−01 | 5.0362E−01 | 1.4729E−02 |
| A10 = | −6.6713E−02 | 3.9206E−01 | 3.7918E−01 | −5.8488E−01 | −2.1419E−02 |
| A12 = | 5.3092E−02 | −1.7039E−01 | −1.4705E−01 | 3.2088E−01 | 6.4515E−02 |
| A14 = | −1.6996E−02 | 3.4459E−02 | 3.3003E−02 | −3.0998E−02 | −5.9778E−02 |

| | | | Surface # | | |
|---|---|---|---|---|---|
| | 7 | 8 | 9 | 10 | 11 |
| k = | 8.5464E+01 | 7.8986E+01 | 9.0000E+01 | −7.4189E+01 | −3.4802E+01 |
| A4 = | −4.4126E−02 | −3.3229E−02 | −1.2754E−01 | −1.5997E−01 | −1.8448E−01 |
| A6 = | −4.8248E−02 | 1.1723E−02 | 1.2914E−01 | 2.5331E−01 | 2.4939E−01 |
| A8 = | 9.5743E−03 | −6.1279E−02 | −1.0206E−01 | −4.3556E−01 | −3.0052E−01 |
| A10 = | −5.0046E−02 | 5.0433E−03 | −1.1796E−01 | 3.9694E−01 | 2.1924E−01 |
| A12 = | 1.0606E−02 | 1.0062E−02 | 3.0849E−01 | −1.6929E−01 | −8.0748E−02 |
| A14 = | 1.0691E−11 | 6.6539E−12 | −2.0052E−01 | 2.4321E−02 | 1.1196E−02 |
| A16 = | — | — | 4.5152E−02 | −2.9257E−10 | 6.2381E−05 |

| | | Surface # | | |
|---|---|---|---|---|
| | 12 | 13 | 14 | 15 |
| k = | −1.3809E+01 | −9.0000E+01 | −1.7163E+00 | −2.0663E+00 |
| A4 = | −6.0019E−02 | −2.2468E−02 | −3.8547E−01 | −2.6819E−01 |
| A6 = | 3.6832E−02 | 9.7575E−03 | 1.9159E−01 | 1.6462E−01 |
| A8 = | −8.2611E−02 | −2.5500E−02 | −5.8391E−02 | −7.5541E−02 |
| A10 = | 5.0950E−02 | 1.1145E−02 | 1.3522E−02 | 2.2794E−02 |
| A12 = | −1.8032E−02 | −1.7265E−03 | −2.2749E−03 | −4.1793E−03 |
| A14 = | 3.0605E−03 | 8.3296E−05 | 2.3095E−04 | 4.1443E−04 |
| A16 = | — | — | −1.0190E−05 | −1.6902E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.66 | (R13 − R14)/(R13 + R14) | 0.24 |
| Fno | 2.00 | |f1/f2| | 0.40 |
| HFOV [deg.] | 37.6 | f/f3 | 0.19 |
| Nmax | 1.650 | |f1/f7| | 0.39 |
| V2 | 21.4 | |f/fj| max | 1.16 |
| CT1/CT2 | 3.01 | f/EPD | 2.00 |
| T23/CT2 | 1.53 | Yc62/Yc61 | 1.00 |
| T23/T34 | 1.67 | Yc62/Yc72 | 0.79 |

-continued

4th Embodiment

| | | | |
|---|---|---|---|
| (T12/T23) + (T34/T45) + (T56/T67) | 3.36 | Yc72/f | 0.31 |
| R1/R2 | 0.17 | ΣAT/ImgH | 0.38 |
| f/R6 | 0.09 | SD/TD | 0.91 |
| f/R12 | 0.84 | TL/f | 1.22 |
| R14/f | 0.36 | TL/ImgH | 1.53 |
| (R11 − R12)/(R11 + R12) | −0.31 | | |

5th Embodiment

Figure 9:
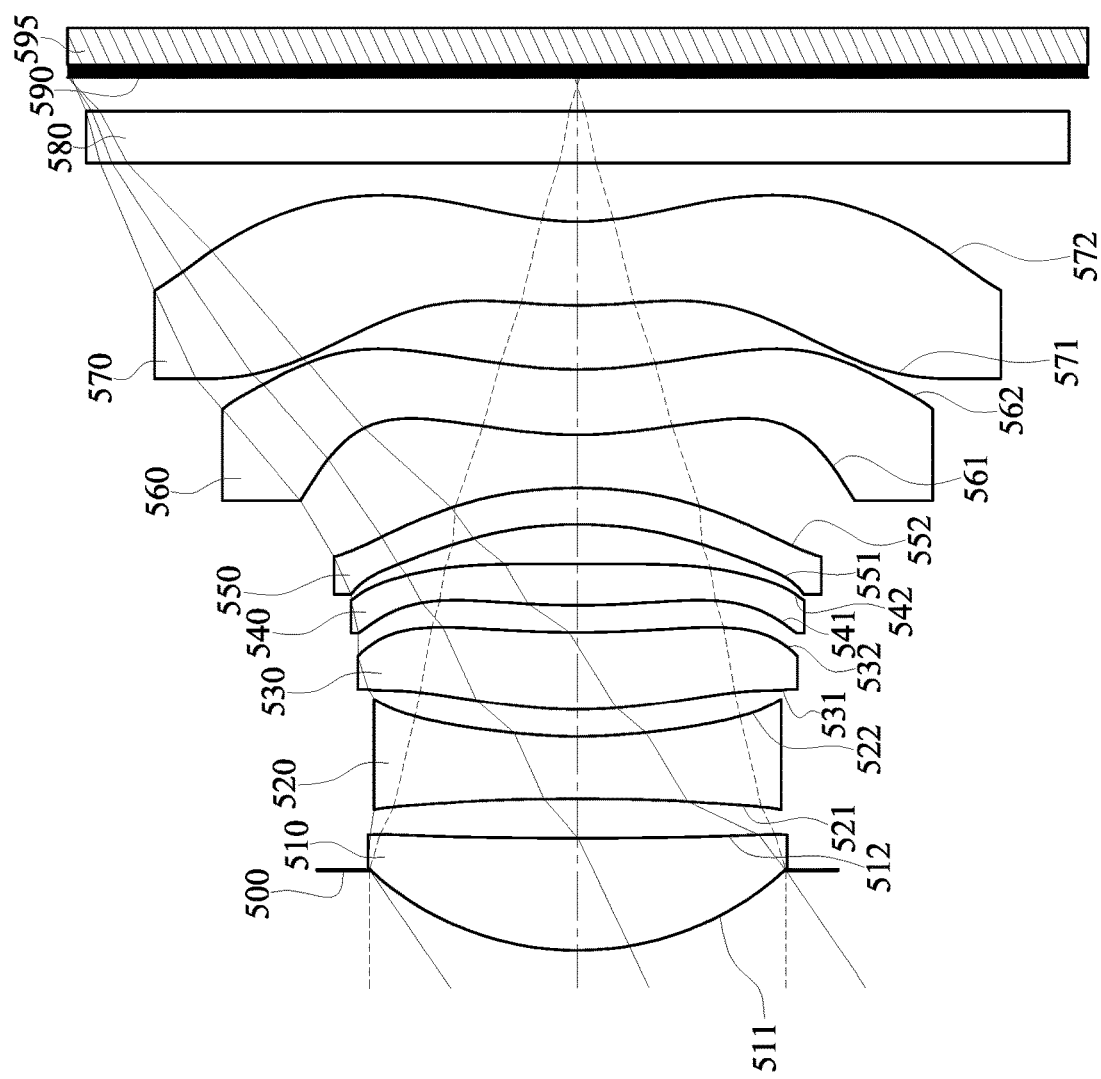
FIG. 9 is a schematic view of an image capturing unit according to the 5th embodiment of the present disclosure.
Figure 10:
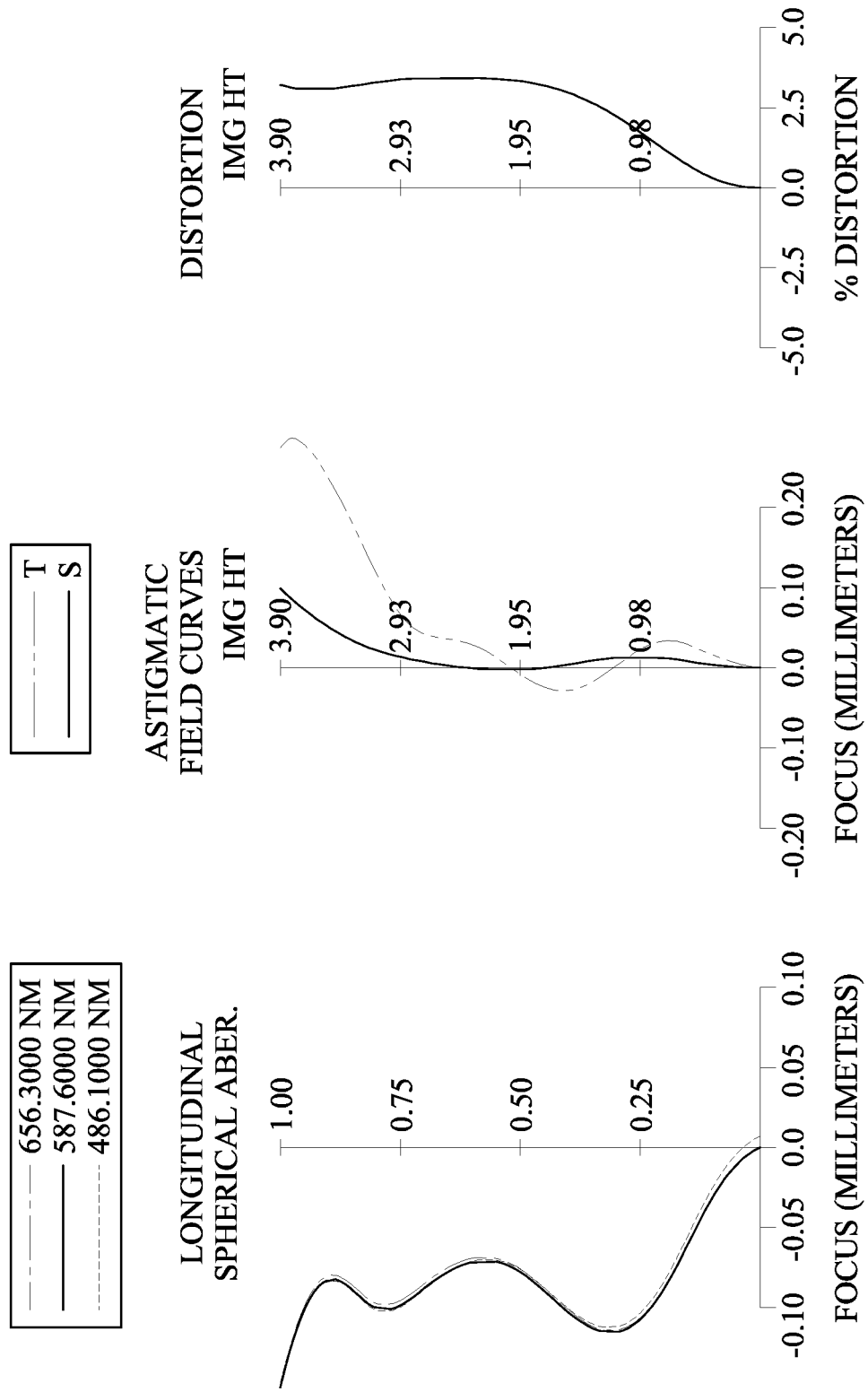
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 595. The photographing optical lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590, wherein the photographing optical lens assembly has a total of seven non-cemented lens elements (510-570) with refractive power.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 o the sixth lens element 560 has at least one inflection point.

The seventh lens element 570 with negative refractive power has an object-side surface 571 being convex in a paraxial region thereof and an image-side surface 572 being concave in a paraxial region thereof. The sixth lens element 570 is made of plastic material and has the object-side surface 571 and the image-side surface 572 being both aspheric. The image-side surface 572 of the seventh lens element 570 has at least one inflection point.

The IR-cut filter 580 is made of glass and located between the seventh lens element 570 and the image surface 590, and will not affect the focal length of the photographing optical lens assembly. The image sensor 595 is disposed on or near the image surface 590 of the photographing optical lens assembly.

The detailed optical data of the 5th embodiment are shown in Table 9 and the aspheric surface data are shown in Table 10 below.

TABLE 9

5th Embodiment
f = 5.59 mm, Fno = 1.75, HFOV = 34.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.614 | | | | |
| 2 | Lens 1 | 2.383 | (ASP) | 0.857 | Plastic | 1.544 | 55.9 | 4.89 |
| 3 | | 19.860 | (ASP) | 0.303 | | | | |
| 4 | Lens 2 | −100.000 | (ASP) | 0.480 | Plastic | 1.640 | 23.3 | −5.29 |
| 5 | | 3.513 | (ASP) | 0.209 | | | | |
| 6 | Lens 3 | 3.401 | (ASP) | 0.594 | Plastic | 1.544 | 55.9 | 10.83 |
| 7 | | 7.549 | (ASP) | 0.209 | | | | |
| 8 | Lens 4 | 5.743 | (ASP) | 0.315 | Plastic | 1.544 | 55.9 | 11.89 |
| 9 | | 50.057 | (ASP) | 0.304 | | | | |
| 10 | Lens 5 | −3.201 | (ASP) | 0.280 | Plastic | 1.640 | 23.3 | −60.85 |
| 11 | | −3.607 | (ASP) | 0.407 | | | | |
| 12 | Lens 6 | 2.967 | (ASP) | 0.506 | Plastic | 1.544 | 55.9 | 89.92 |
| 13 | | 2.969 | (ASP) | 0.492 | | | | |
| 14 | Lens 7 | 3.615 | (ASP) | 0.642 | Plastic | 1.544 | 55.9 | −9.78 |
| 15 | | 2.018 | (ASP) | 0.450 | | | | |
| 16 | IR-cut filter | Plano | | 0.405 | Glass | 1.517 | 64.2 | — |

TABLE 9-continued

5th Embodiment
f = 5.59 mm, Fno = 1.75, HFOV = 34.5 deg.

| Surface # | | Curvature Radius | Thickness | Material | Index | Abbe # | Focal Length |
|---|---|---|---|---|---|---|---|
| 17 | | Plano | 0.260 | | | | |
| 18 | Image | Plano | — | | | | |

Note:
Reference wavelength is 587.6 nm (d-line).

TABLE 10

Aspheric Coefficients

| | Surface # | | | | |
|---|---|---|---|---|---|
| | 2 | 3 | 4 | 5 | 6 |
| k = | 1.0811E−01 | 9.0000E+01 | −9.0000E+01 | −6.1500E+01 | −2.5137E+01 |
| A4 = | −2.6060E−03 | −4.6221E−02 | −7.1270E−02 | 3.4637E−02 | 1.9711E−03 |
| A6 = | −2.0373E−03 | 7.0826E−02 | 8.9664E−02 | −4.9408E−02 | −5.2045E−03 |
| A8 = | 5.7872E−03 | −5.8840E−02 | −6.4034E−02 | 6.0255E−02 | 3.2705E−03 |
| A10 = | −4.6207E−03 | 2.6393E−02 | 2.6293E−02 | −3.8080E−02 | −3.3926E−03 |
| A12 = | 1.6981E−03 | −5.8208E−03 | −5.5105E−03 | 1.2117E−02 | 8.8285E−04 |
| A14 = | −2.3915E−04 | 4.5226E−04 | 4.0694E−04 | −1.4506E−03 | −1.6356E−06 |

| | Surface # | | | | |
|---|---|---|---|---|---|
| | 7 | 8 | 9 | 10 | 11 |
| k = | −9.0000E+01 | −7.7232E+01 | −9.0000E+01 | 8.5901E−01 | −9.6217E+00 |
| A4 = | −6.2548E−03 | −1.2959E−02 | −4.9457E−02 | −2.7576E−02 | −7.2823E−02 |
| A6 = | −3.7399E−03 | −9.0488E−03 | 2.5771E−02 | 5.6050E−02 | 5.7698E−02 |
| A8 = | −2.0208E−03 | −2.8225E−03 | −1.3183E−02 | −5.1619E−02 | −3.7112E−02 |
| A10 = | −5.2849E−04 | 1.4955E−04 | −7.8580E−03 | 2.6848E−02 | 1.4648E−02 |
| A12 = | 1.3417E−04 | 2.2501E−04 | 1.1335E−02 | −6.3375E−03 | −2.9591E−03 |
| A14 = | — | — | −4.1569E−03 | 4.7641E−04 | 2.4060E−04 |
| A16 = | — | — | 4.9563E−04 | | |

| | Surface # | | | |
|---|---|---|---|---|
| | 12 | 13 | 14 | 15 |
| k = | −2.2824E+01 | −2.6785E+01 | −7.6801E−01 | −1.5490E+00 |
| A4 = | −9.6573E−03 | −3.9287E−03 | −1.5339E−01 | −1.1290E−01 |
| A6 = | 5.5718E−03 | 2.2761E−03 | 4.2266E−02 | 3.6935E−02 |
| A8 = | −9.7778E−03 | −3.2864E−03 | −7.1460E−03 | −9.2042E−03 |
| A10 = | 3.4291E−03 | 7.5579E−04 | 9.0915E−04 | 1.5279E−03 |
| A12 = | −6.7980E−04 | −6.3018E−05 | −8.3652E−05 | −1.5392E−04 |
| A14 = | 5.8337E−05 | 1.6418E−06 | 4.6720E−06 | 8.3904E−06 |
| A16 = | — | — | −1.1473E−07 | −1.8806E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.59 | (R13 − R14)/(R13 + R14) | 0.28 |
| Fno | 1.75 | |f1/f2| | 0.92 |
| HFOV [deg.] | 34.5 | f/f3 | 0.52 |
| Nmax | 1.640 | |f1/f7| | 0.50 |

-continued

| 5th Embodiment | | | |
|---|---|---|---|
| V2 | 23.3 | |f/fj| max | 1.14 |
| CT1/CT2 | 1.79 | f/EPD | 1.75 |
| T23/CT2 | 0.44 | Yc62/Yc61 | 1.20 |
| T23/T34 | 1.00 | Yc62/Yc72 | 1.01 |
| (T12/T23) + (T34/T45) + (T56/T67) | 2.96 | Yc72/f | 0.27 |
| R1/R2 | 0.12 | ΣAT/ImgH | 0.49 |
| f/R6 | 0.74 | SD/TD | 0.89 |
| f/R12 | 1.88 | TL/f | 1.20 |
| R14/f | 0.36 | TL/ImgH | 1.72 |
| (R11 − R12)/(R11 + R12) | −0.0003 | | |

6th Embodiment

Figure 11:
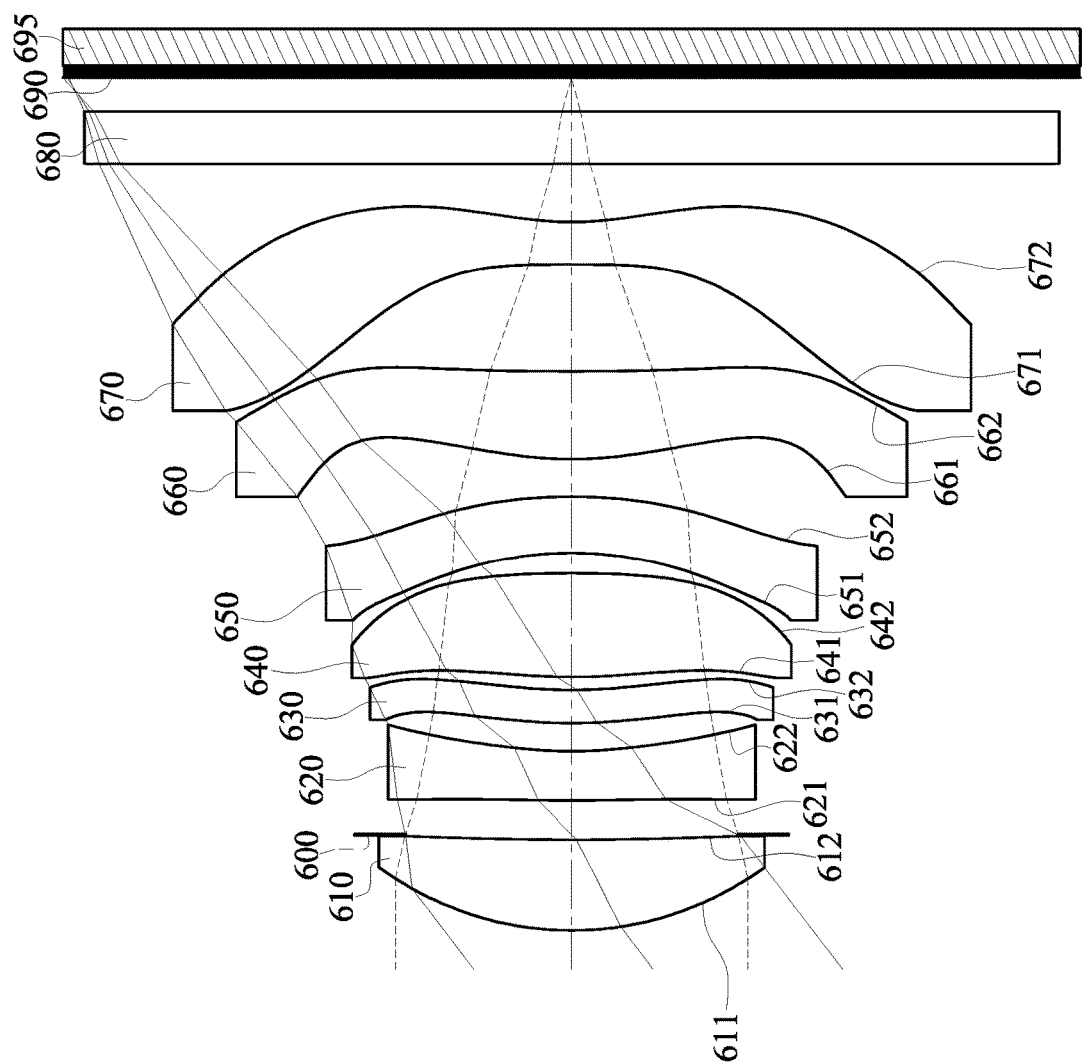
FIG. 11 is a schematic view of an image capturing unit according to the 6th embodiment of the present disclosure.
Figure 12:
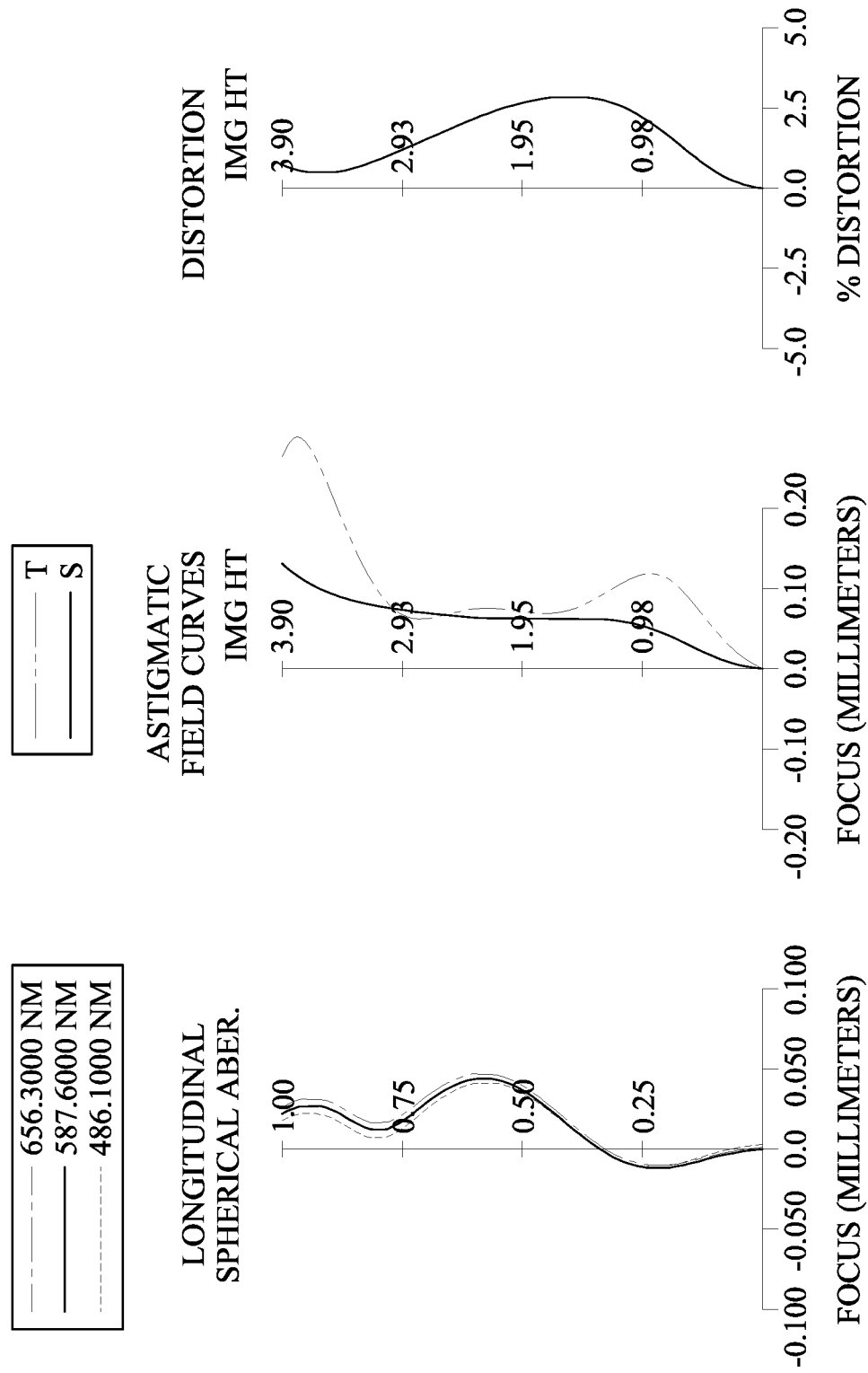
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 695. The photographing optical lens assembly includes, in order from an object side to an image side, a first lens element 610, an aperture stop 600, a second lens element 620, a third lens element 630, a fourth lens element 640, a fifth lens element 650, a sixth lens element 660, a seventh lens element 670, an IR-cut filter 680 and an image surface 690, wherein the photographing optical lens assembly has a total of seven non-cemented lens elements (610-670) with refractive power.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point.

The seventh lens element 670 with negative refractive power has an object-side surface 671 being concave in a paraxial region thereof and an image-side surface 672 being concave in a paraxial region thereof. The sixth lens element 670 is made of plastic material and has the object-side surface 671 and the image-side surface 672 being both aspheric. The image-side surface 672 of the seventh lens element 670 has at least one inflection point.

The IR-cut filter 680 is made of glass and located between the seventh lens element 670 and the image surface 690, and will not affect the focal length of the photographing optical lens assembly. The image sensor 695 is disposed on or near the image surface 690 of the photographing optical lens assembly.

The detailed optical data of the 6th embodiment are shown in Table 11 and the aspheric surface data are shown in Table 12 below.

TABLE 11

6th Embodiment
f = 5.04 mm, Fno = 1.85, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.496 | (ASP) | 0.704 | Plastic | 1.544 | 55.9 | 5.35 |
| 2 | | 15.830 | (ASP) | 0.040 | | | | |
| 3 | Ape. Stop | Plano | | 0.265 | | | | |
| 4 | Lens 2 | 12.102 | (ASP) | 0.380 | Plastic | 1.640 | 23.3 | −7.09 |
| 5 | | 3.258 | (ASP) | 0.217 | | | | |
| 6 | Lens 3 | 3.681 | (ASP) | 0.257 | Plastic | 1.640 | 23.3 | −144.69 |
| 7 | | 3.444 | (ASP) | 0.100 | | | | |
| 8 | Lens 4 | 4.115 | (ASP) | 0.803 | Plastic | 1.544 | 55.9 | 5.64 |
| 9 | | −11.231 | (ASP) | 0.159 | | | | |
| 10 | Lens 5 | −2.897 | (ASP) | 0.435 | Plastic | 1.640 | 23.3 | −13.16 |
| 11 | | −4.675 | (ASP) | 0.291 | | | | |
| 12 | Lens 6 | 2.869 | (ASP) | 0.678 | Plastic | 1.544 | 55.9 | 5.93 |
| 13 | | 23.810 | (ASP) | 0.828 | | | | |
| 14 | Lens 7 | −81.301 | (ASP) | 0.330 | Plastic | 1.544 | 55.9 | −4.33 |
| 15 | | 2.432 | (ASP) | 0.450 | | | | |
| 16 | IR-cut filter | Plano | | 0.405 | Glass | 1.517 | 64.2 | — |
| 17 | | Plano | | 0.259 | | | | |
| 18 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k = | 6.8595E−02 | 4.0000E+01 | −5.0000E+01 | −4.4437E+01 | −4.1338E+01 |
| A4 = | −2.8321E−03 | −4.0467E−02 | −7.7538E−02 | 3.3929E−02 | 2.3159E−03 |
| A6 = | −1.4731E−03 | 6.1460E−02 | 8.9954E−02 | −4.8589E−02 | −9.2979E−03 |
| A8 = | 5.1463E−03 | −5.6709E−02 | −6.3382E−02 | 5.8078E−02 | 1.3899E−03 |
| A10 = | −4.5969E−03 | 2.7905E−02 | 2.6509E−02 | −3.8458E−02 | −3.6916E−03 |
| A12 = | 1.8550E−03 | −6.1855E−03 | −5.6856E−03 | 1.2547E−02 | 8.8820E−04 |
| A14 = | −2.9802E−04 | 3.2919E−04 | 4.3958E−04 | −1.5466E−03 | −5.8326E−05 |

| Surface # | 7 | 8 | 9 | 10 | 11 |
|---|---|---|---|---|---|
| k = | −5.1797E+01 | −9.0000E+01 | 3.6727E+01 | 8.6207E−01 | −4.5958E+00 |
| A4 = | −3.2142E−03 | −1.0487E−02 | −5.6950E−02 | −2.0581E−02 | −6.5935E−02 |
| A6 = | −4.5231E−03 | −7.4209E−03 | 2.7187E−02 | 5.3934E−02 | 5.9828E−02 |
| A8 = | −2.3837E−03 | −1.1805E−03 | −1.3948E−02 | −5.1620E−02 | −3.6983E−02 |
| A10 = | −5.8788E−04 | 5.1669E−04 | −8.1876E−03 | 2.6968E−02 | 1.4619E−02 |
| A12 = | 3.6482E−04 | 1.6909E−04 | 1.1294E−02 | −6.3214E−03 | −2.9677E−03 |
| A14 = | — | — | −4.1351E−03 | 4.8172E−04 | 2.3684E−04 |
| A16 = | — | — | 5.0449E−04 | — | — |

| Surface # | 12 | 13 | 14 | 15 |
|---|---|---|---|---|
| k = | −1.7235E+01 | 5.1086E+00 | −9.0000E+01 | −3.7825E+00 |
| A4 = | −4.6214E−03 | 1.7428E−03 | −1.4438E−01 | −1.0384E−01 |
| A6 = | 6.7552E−03 | 1.8709E−03 | 4.2329E−02 | 3.6797E−02 |
| A8 = | −9.7961E−03 | −3.3402E−03 | −7.1465E−03 | −9.2589E−03 |
| A10 = | 3.4642E−03 | 7.5757E−04 | 9.1033E−04 | 1.5265E−03 |
| A12 = | −6.8309E−04 | −6.2829E−05 | −8.3643E−05 | −1.5384E−04 |
| A14 = | 5.6245E−05 | 1.6766E−06 | 4.6641E−06 | 8.3954E−06 |
| A16 = | — | — | −1.1633E−07 | −1.8664E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.04 | (R13 − R14)/(R13 + R14) | 1.06 |
| Fno | 1.85 | \|f1/f2\| | 0.75 |
| HFOV [deg.] | 37.4 | f/f3 | −0.03 |
| Nmax | 1.640 | \|f1/f7\| | 1.23 |
| V2 | 23.3 | \|f/fj\| max | 1.16 |
| CT1/CT2 | 1.85 | f/EPD | 1.85 |
| T23/CT2 | 0.57 | Yc62/Yc61 | 0.96 |
| T23/T34 | 2.17 | Yc62/Yc72 | 1.09 |
| (T12/T23) + (T34/T45) + (T56/T67) | 2.39 | Yc72/f | 0.25 |
| R1/R2 | 0.16 | ΣAT/ImgH | 0.49 |
| f/R6 | 1.46 | SD/TD | 0.86 |
| f/R12 | 0.21 | TL/f | 1.31 |
| R14/f | 0.48 | TL/ImgH | 1.69 |
| (R11 − R12)/(R11 + R12) | −0.78 | | |

7th Embodiment

Figure 13:
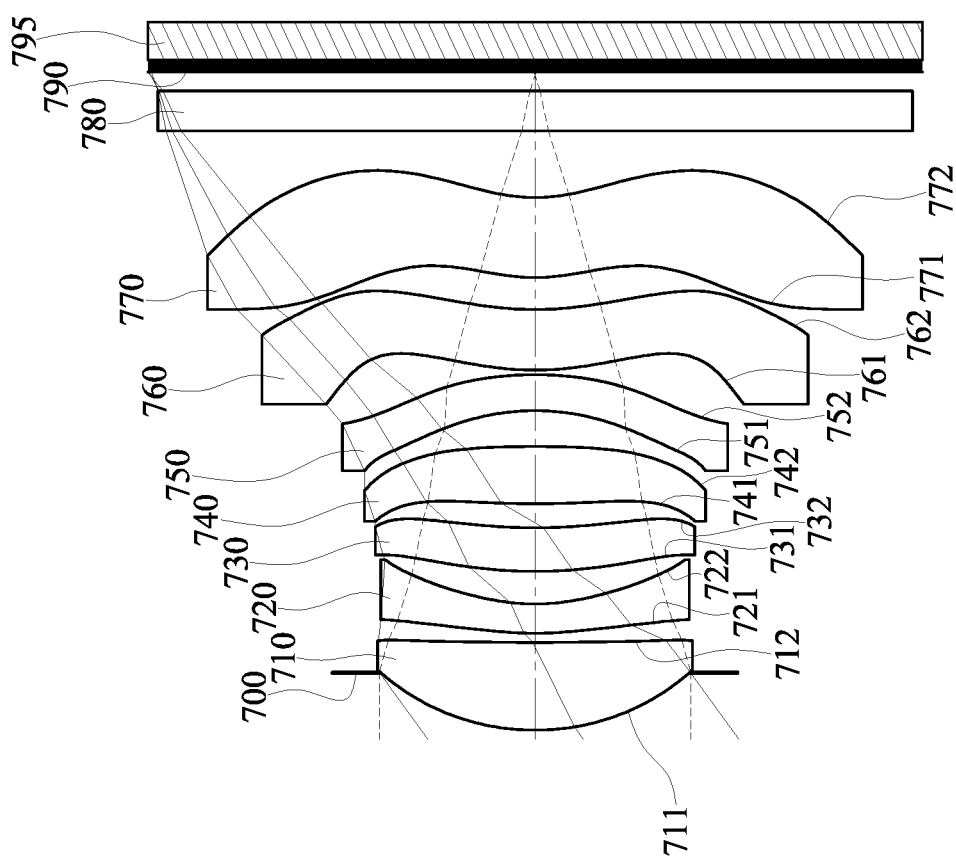
FIG. 13 is a schematic view of an image capturing unit according to the 7th embodiment of the present disclosure.
Figure 14:
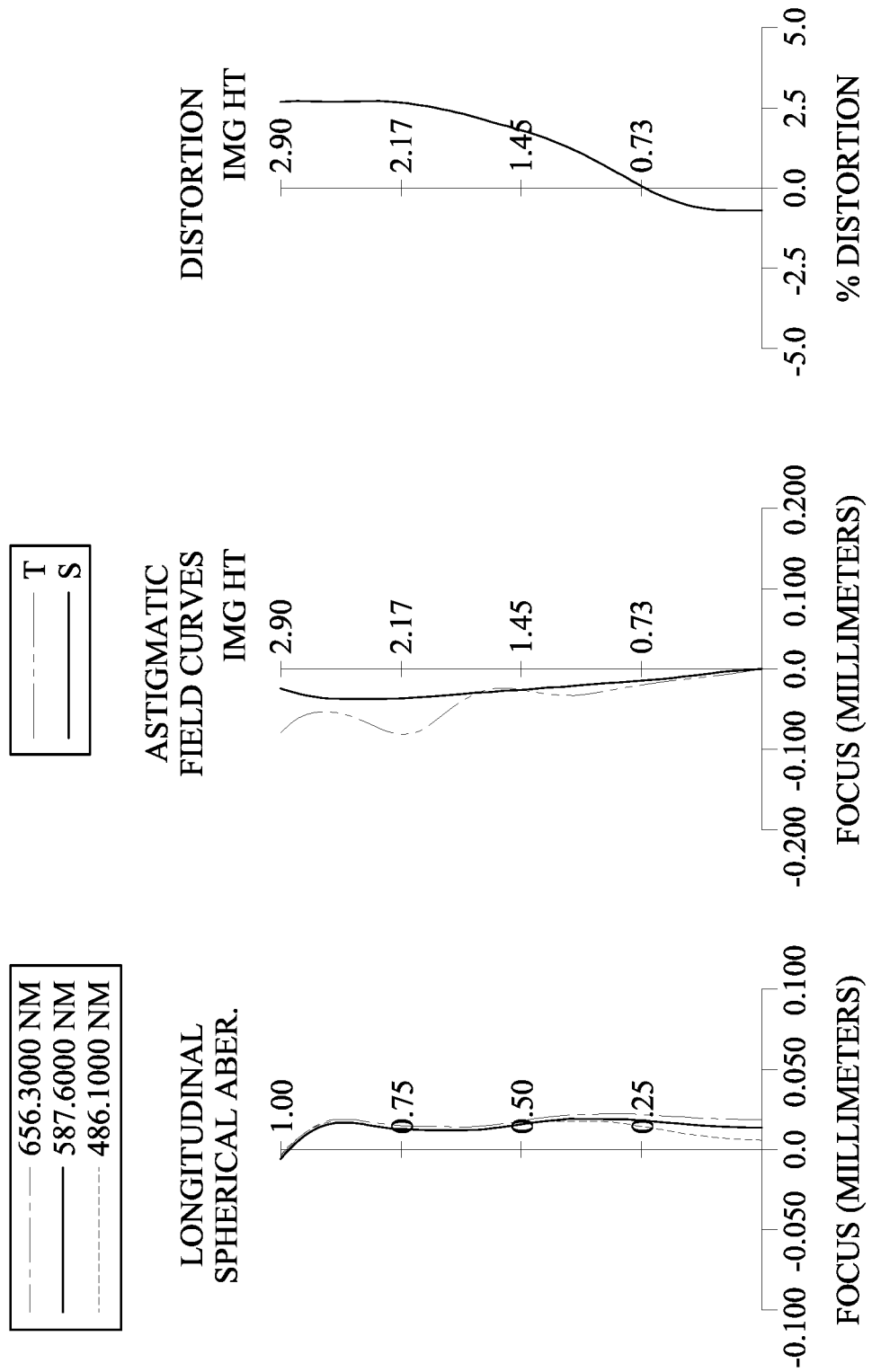
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 795. The photographing optical lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an IR-cut filter 780 and an image surface 790, wherein the photographing optical lens assembly has a total of seven non-cemented lens elements (710-770) with refractive power.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point.

The seventh lens element 770 with positive refractive power has an object-side surface 771 being convex in a paraxial region thereof and an image-side surface 772 being concave in a paraxial region thereof. The sixth lens element 770 is made of plastic material and has the object-side surface 771 and the image-side surface 772 being both aspheric. The image-side surface 772 of the seventh lens element 770 has at least one inflection point.

The IR-cut filter 780 is made of glass and located between the seventh lens element 770 and the image surface 790, and will not affect the focal length of the photographing optical lens assembly. The image sensor 795 is disposed on or near the image surface 790 of the photographing optical lens assembly.

The detailed optical data of the 7th embodiment are shown in Table 13 and the aspheric surface data are shown in Table 14 below.

TABLE 13

7th Embodiment
f = 3.86 mm, Fno = 1.65, HFOV = 36.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.432 |  |  |  |  |
| 2 | Lens 1 | 1.804 | (ASP) | 0.658 | Plastic | 1.544 | 55.9 | 3.82 |
| 3 |  | 11.903 | (ASP) | 0.070 |  |  |  |  |
| 4 | Lens 2 | 2.403 | (ASP) | 0.220 | Plastic | 1.639 | 23.5 | −7.07 |
| 5 |  | 1.512 | (ASP) | 0.245 |  |  |  |  |
| 6 | Lens 3 | 3.430 | (ASP) | 0.328 | Plastic | 1.544 | 55.9 | 33.13 |
| 7 |  | 4.094 | (ASP) | 0.180 |  |  |  |  |
| 8 | Lens 4 | 6.413 | (ASP) | 0.430 | Plastic | 1.544 | 55.9 | 7.93 |
| 9 |  | −12.887 | (ASP) | 0.270 |  |  |  |  |
| 10 | Lens 5 | −1.813 | (ASP) | 0.270 | Plastic | 1.639 | 23.5 | −7.93 |
| 11 |  | −2.986 | (ASP) | 0.035 |  |  |  |  |
| 12 | Lens 6 | 2.152 | (ASP) | 0.455 | Plastic | 1.544 | 55.9 | 31.31 |
| 13 |  | 2.280 | (ASP) | 0.241 |  |  |  |  |
| 14 | Lens 7 | 1.425 | (ASP) | 0.601 | Plastic | 1.544 | 55.9 | 83.35 |
| 15 |  | 1.253 | (ASP) | 0.500 |  |  |  |  |
| 16 | IR-cut filter | Plano |  | 0.300 | Glass | 1.517 | 64.2 | — |
| 17 |  | Plano |  | 0.142 |  |  |  |  |
| 18 | Image | Plano |  | — |  |  |  |  |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | 1.7198E−01 | −6.5821E+01 | −2.2211E+01 | −1.1642E+01 | −6.8144E+00 |
| A4 = | 3.6228E−03 | −1.4631E−01 | −1.8333E−01 | 1.1828E−01 | −6.1205E−03 |
| A6 = | −2.0408E−02 | 3.7140E−01 | 4.0431E−01 | −2.4427E−01 | −8.0501E−03 |
| A8 = | 5.0675E−02 | −4.9646E−01 | −5.1347E−01 | 4.9181E−01 | 3.0308E−02 |
| A10 = | −6.6396E−02 | 3.8237E−01 | 3.8365E−01 | −5.5861E−01 | −5.2573E−02 |
| A12 = | 4.4585E−02 | −1.5624E−01 | −1.5630E−01 | 3.2621E−01 | 2.3947E−02 |
| A14 = | −1.2125E−02 | 2.4322E−02 | 2.5640E−02 | −7.3615E−02 | −3.4618E−03 |

| Surface # | 7 | 8 | 9 | 10 | 11 |
|---|---|---|---|---|---|
| k = | −1.8913E+01 | −9.0000E+01 | 6.6483E+01 | 7.1981E−01 | −2.2342E+00 |
| A4 = | −9.0401E−03 | −2.9942E−02 | −1.2128E−01 | −4.4294E−02 | −1.7692E−01 |
| A6 = | −1.1409E−02 | −3.3768E−02 | 1.1903E−01 | 2.6399E−01 | 2.6741E−01 |
| A8 = | −6.0727E−03 | −1.3263E−02 | −1.1038E−01 | −4.1728E−01 | −2.9964E−01 |
| A10 = | −8.0577E−03 | 2.6773E−03 | −1.1959E−01 | 3.9961E−01 | 2.1867E−01 |

TABLE 14-continued

| Aspheric Coefficients | | | | |
|---|---|---|---|---|
| A12 = | −8.7548E−12 | 8.8115E−12 | 3.0655E−01 | −1.7180E−01 | −8.0591E−02 |
| A14 = | — | — | −2.0549E−01 | 2.4453E−02 | 1.1514E−02 |
| A16 = | — | — | 4.5153E−02 | — | — |

| Surface # | 12 | 13 | 14 | 15 |
|---|---|---|---|---|
| k = | −8.2784E+00 | −1.9081E+01 | −2.5314E+00 | −1.6180E+00 |
| A4 = | −4.5219E−02 | −5.1072E−03 | −3.8116E−01 | −2.8518E−01 |
| A6 = | 3.9095E−02 | 9.3768E−03 | 1.9100E−01 | 1.6705E−01 |
| A8 = | −8.2337E−02 | −2.7040E−02 | −5.8397E−02 | −7.5180E−02 |
| A10 = | 5.0063E−02 | 1.1260E−02 | 1.3532E−02 | 2.2739E−02 |
| A12 = | −1.8359E−02 | −1.7059E−03 | −2.2712E−03 | −4.1799E−03 |
| A14 = | 3.0344E−03 | 8.2168E−05 | 2.3103E−04 | 4.1490E−04 |
| A16 = | — | — | −1.0338E−05 | −1.6938E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.86 | (R13 − R14)/(R13 + R14) | 0.06 |
| Fno | 1.65 | |f1/f2| | 0.54 |
| HFOV [deg.] | 36.0 | f/f3 | 0.12 |
| Nmax | 1.639 | |f1/f7| | 0.05 |
| V2 | 23.5 | |f/fj| max | 1.01 |
| CT1/CT2 | 2.99 | f/EPD | 1.65 |
| T23/CT2 | 1.11 | Yc62/Yc61 | 1.18 |
| T23/T34 | 1.36 | Yc62/Yc72 | 1.00 |
| (T12/T23) + (T34/T45) + (T56/T67) | 1.10 | Yc72/f | 0.31 |
| R1/R2 | 0.15 | ΣAT/ImgH | 0.36 |
| f/R6 | 0.94 | SD/TD | 0.89 |
| f/R12 | 1.69 | TL/f | 1.28 |
| R14/f | 0.32 | TL/ImgH | 1.71 |
| (R11 − R12)/(R11 + R12) | −0.03 | | |

8th Embodiment

Figure 15:
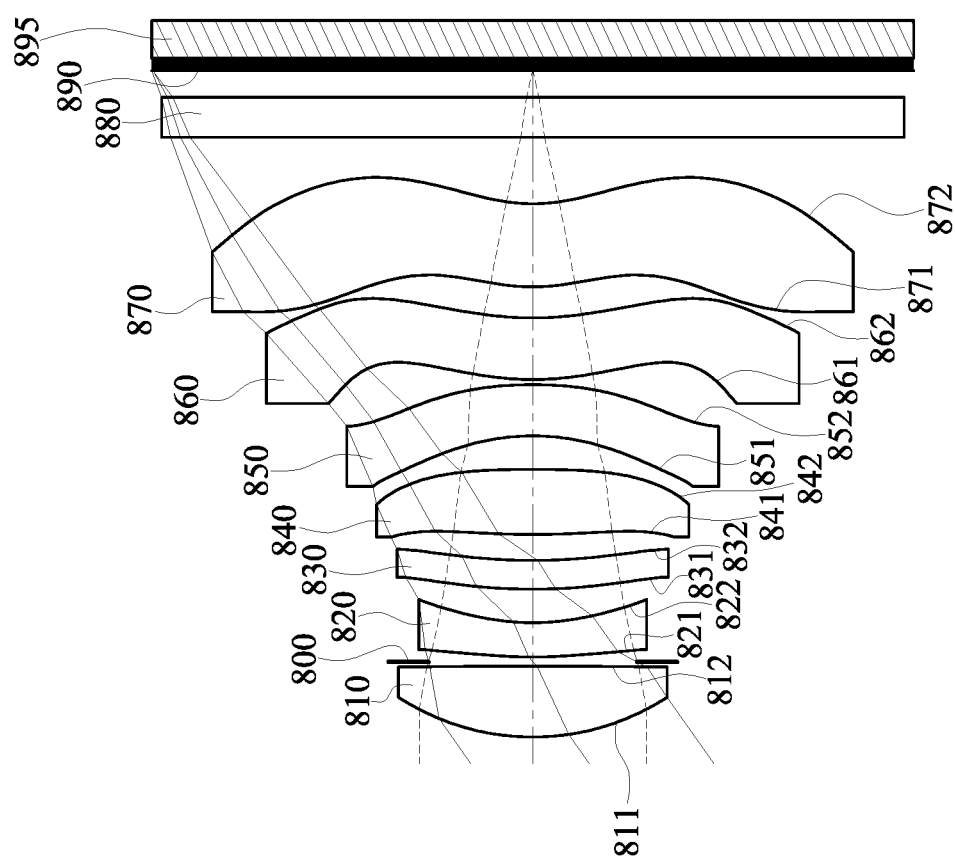
FIG. 15 a schematic view of an image capturing unit according to the 8th embodiment of the present disclosure.
Figure 16:
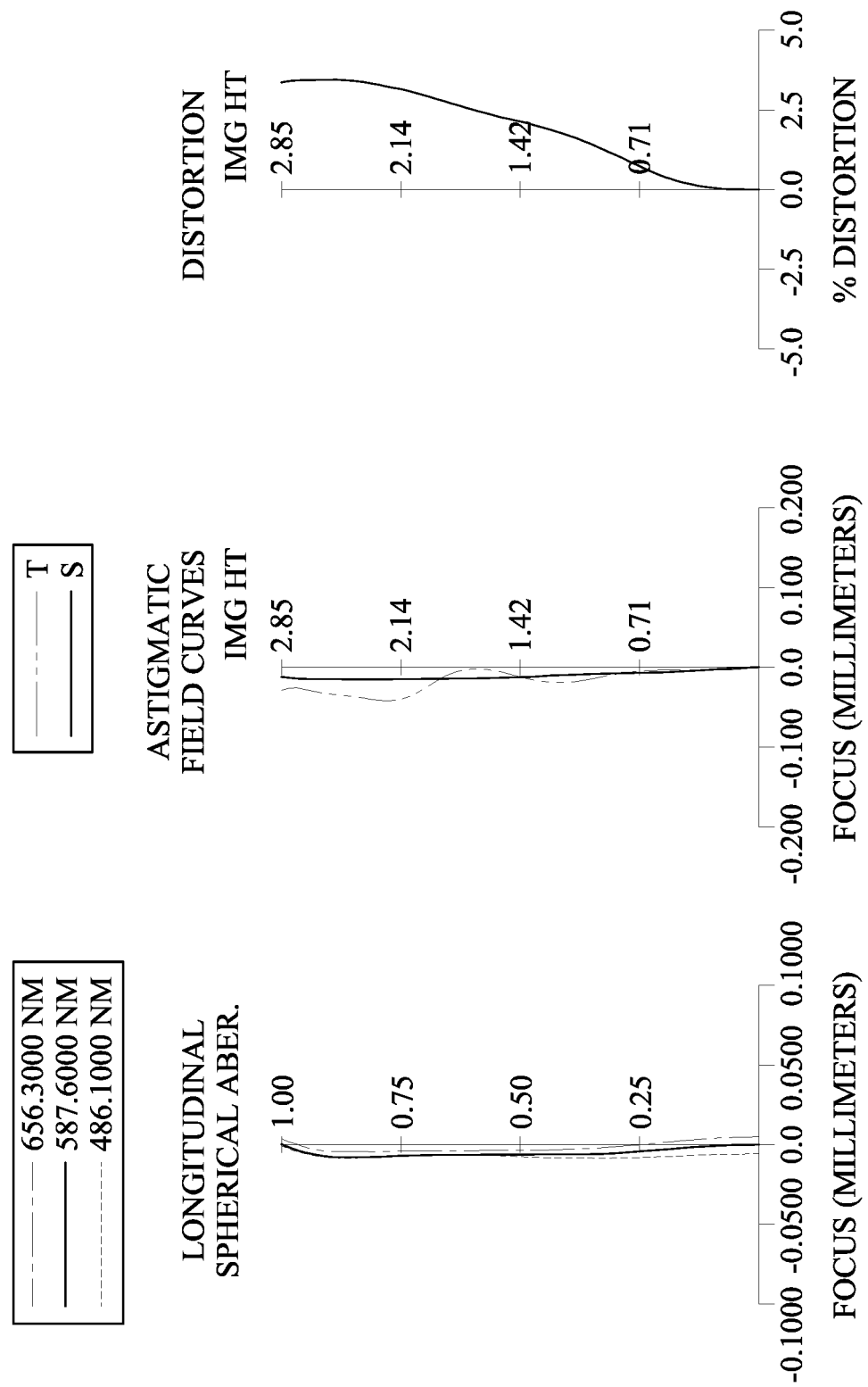
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 895. The photographing optical lens assembly includes, in order from an object side to an image side, a first lens element 810, an aperture stop 800, a second lens element 820, a third lens element 830, a fourth lens element 840, a fifth lens element 850, a sixth lens element 860, a seventh lens element 870, an IR-cut filter 880 and an image surface 890, wherein the photographing optical lens assembly has a total of seven non-cemented lens elements (810-870) with refractive power.

The first lens element 810 with positive refractive power has an object-side surface 811 being convex in a paraxial region thereof and an image-side surface 812 being concave in a paraxial region thereof. The first lens element 810 is made of glass material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one inflection point.

The seventh lens element 870 with positive refractive power has an object-side surface 871 being convex in a paraxial region thereof and an image-side surface 872 being concave in a paraxial region thereof. The sixth lens element 870 is made of plastic material and has the object-side surface 871 and the image-side surface 872 being both aspheric. The image-side surface 872 of the seventh lens element 870 has at least one inflection point.

The IR-cut filter 880 is made of glass and located between the seventh lens element 870 and the image surface 890, and will not affect the focal length of the photographing optical lens assembly. The image sensor 895 is disposed on or near the image surface 890 of the photographing optical lens assembly.

The detailed optical data of the 8th embodiment are shown in Table 15 and the aspheric surface data are shown in Table 16 below.

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

TABLE 15

8th Embodiment
f = 3.93 mm, Fno = 2.30, HFOV = 35.1 deg.

| Surface# |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.857 | (ASP) | 0.531 | Glass | 1.571 | 50.9 | 3.43 |
| 2 |  | 31.734 | (ASP) | 0.035 |  |  |  |  |
| 3 | Ape. Stop | Plano |  | 0.035 |  |  |  |  |
| 4 | Lens 2 | 3.143 | (ASP) | 0.258 | Plastic | 1.639 | 23.5 | −6.37 |
| 5 |  | 1.717 | (ASP) | 0.252 |  |  |  |  |
| 6 | Lens 3 | 4.144 | (ASP) | 0.216 | Plastic | 1.544 | 55.9 | 409.26 |
| 7 |  | 4.145 | (ASP) | 0.195 |  |  |  |  |
| 8 | Lens 4 | 5.722 | (ASP) | 0.489 | Plastic | 1.544 | 55.9 | 7.09 |
| 9 |  | −11.474 | (ASP) | 0.252 |  |  |  |  |
| 10 | Lens 5 | −1.798 | (ASP) | 0.385 | Plastic | 1.639 | 23.5 | −6.92 |
| 11 |  | −3.284 | (ASP) | 0.039 |  |  |  |  |
| 12 | Lens 6 | 2.126 | (ASP) | 0.463 | Plastic | 1.544 | 55.9 | 26.88 |
| 13 |  | 2.296 | (ASP) | 0.233 |  |  |  |  |
| 14 | Lens 7 | 1.425 | (ASP) | 0.625 | Plastic | 1.544 | 55.9 | 61.25 |
| 15 |  | 1.259 | (ASP) | 0.500 |  |  |  |  |
| 16 | IR-cut filter | Plano |  | 0.300 | Glass | 1.517 | 64.2 | — |
| 17 |  | Plano |  | 0.200 |  |  |  |  |
| 18 | Image | Plano |  | — |  |  |  |  |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | 1.7610E−01 | 9.0000E+01 | −3.0017E+01 | −1.3461E+01 | −2.9109E+00 |
| A4 = | 4.0813E−03 | −1.3110E−01 | −1.7470E−01 | 1.1423E−01 | −5.4677E−03 |
| A6 = | −2.2041E−02 | 3.5326E−01 | 4.0095E−01 | −2.3576E−01 | −2.1816E−02 |
| A8 = | 4.9702E−02 | −5.0652E−01 | −5.1539E−01 | 4.9483E−01 | 2.8708E−02 |
| A10 = | −6.5378E−02 | 3.9105E−01 | 3.8355E−01 | −5.7329E−01 | −4.5589E−02 |
| A12 = | 4.5669E−02 | −1.4361E−01 | −1.5354E−01 | 3.2351E−01 | 2.9753E−02 |
| A14 = | −1.7001E−02 | 1.0912E−02 | 2.7689E−02 | −5.4749E−02 | −8.8348E−03 |

| Surface # | 7 | 8 | 9 | 10 | 11 |
|---|---|---|---|---|---|
| k = | −1.1960E+01 | −7.1358E+01 | 7.2694E+01 | 7.9135E−01 | −1.8296E+00 |
| A4 = | −5.3977E−03 | −3.1019E−02 | −1.2591E−01 | −3.7160E−02 | −1.7589E−01 |
| A6 = | −7.6666E−03 | −2.8856E−02 | 1.1963E−01 | 2.6580E−01 | 2.6897E−01 |
| A8 = | −2.2734E−03 | −1.0251E−02 | −1.1064E−01 | −4.1743E−01 | −2.9924E−01 |
| A10 = | −6.0752E−03 | 5.5126E−03 | −1.2138E−01 | 3.9905E−01 | 2.1874E−01 |
| A12 = | −6.6535E−07 | 5.7768E−07 | 3.0594E−01 | −1.7180E−01 | −8.0610E−02 |
| A14 = | — | — | −2.0517E−01 | 2.4453E−02 | 1.1557E−02 |
| A16 = | — | — | 4.5153E−02 | — | — |

| Surface # | 12 | 13 | 14 | 15 |
|---|---|---|---|---|
| k = | −7.8325E+00 | −1.6482E+01 | −2.4885E+00 | −1.6844E+00 |
| A4 = | −4.3177E−02 | −7.1026E−03 | −3.7824E−01 | −2.8445E−01 |
| A6 = | 3.7571E−02 | 1.0375E−02 | 1.9106E−01 | 1.6710E−01 |
| A8 = | −8.2490E−02 | −2.6953E−02 | −5.8441E−02 | −7.5149E−02 |
| A10 = | 5.0484E−02 | 1.1229E−02 | 1.3525E−02 | 2.2737E−02 |
| A12 = | −1.8279E−02 | −1.7063E−03 | −2.2716E−03 | −4.1796E−03 |
| A14 = | 3.0190E−03 | 8.1918E−05 | 2.3113E−04 | 4.1497E−04 |
| A16 = | — | — | −1.0303E−05 | −1.6948E−05 |

Moreover, these parameters can be calculated from Table 15 and Table 16 as the following values and satisfy the following conditions:

| 8th Embodiment | | | |
|---|---|---|---|
| f [mm] | 3.93 | (R13 − R14)/(R13 + R14) | 0.06 |
| Fno | 2.30 | \|f1/f2\| | 0.54 |
| HFOV [deg.] | 35.1 | f/f3 | 0.01 |
| Nmax | 1.639 | \|f1/f7\| | 0.06 |
| V2 | 23.5 | \|f/fj\| max | 1.15 |
| CT1/CT2 | 2.06 | f/EPD | 2.30 |
| T23/CT2 | 0.98 | Yc62/Yc61 | 1.19 |
| T23/T34 | 1.29 | Yc62/Yc72 | 1.03 |
| (T12/T23) + (T34/T45) + (T56/T67) | 1.22 | Yc72/f | 0.30 |
| R1/R2 | 0.06 | ΣAT/ImgH | 0.37 |
| f/R6 | 0.95 | SD/TD | 0.86 |
| f/R12 | 1.71 | TL/f | 1.28 |
| R14/f | 0.32 | TL/ImgH | 1.76 |
| (R11 − R12)/(R11 + R12) | −0.04 | | |

9th Embodiment

Figure 17:
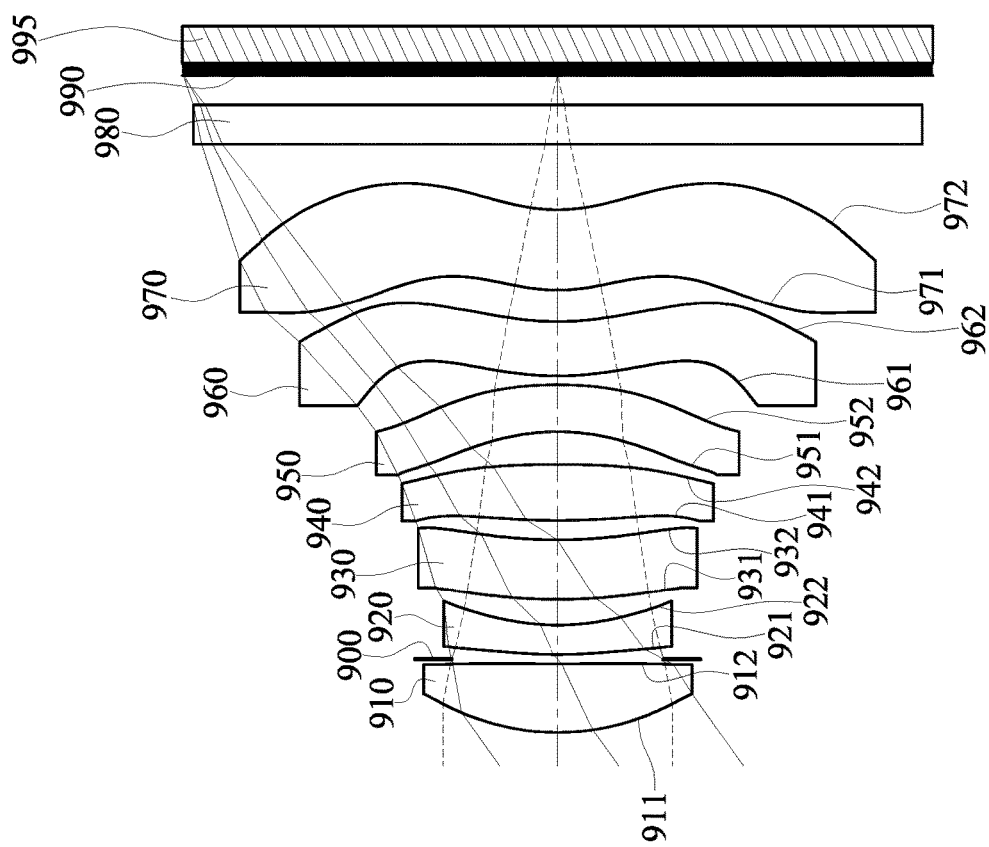
FIG. 17 a schematic view of an image capturing unit according to the 9th embodiment of the present disclosure.
Figure 18:
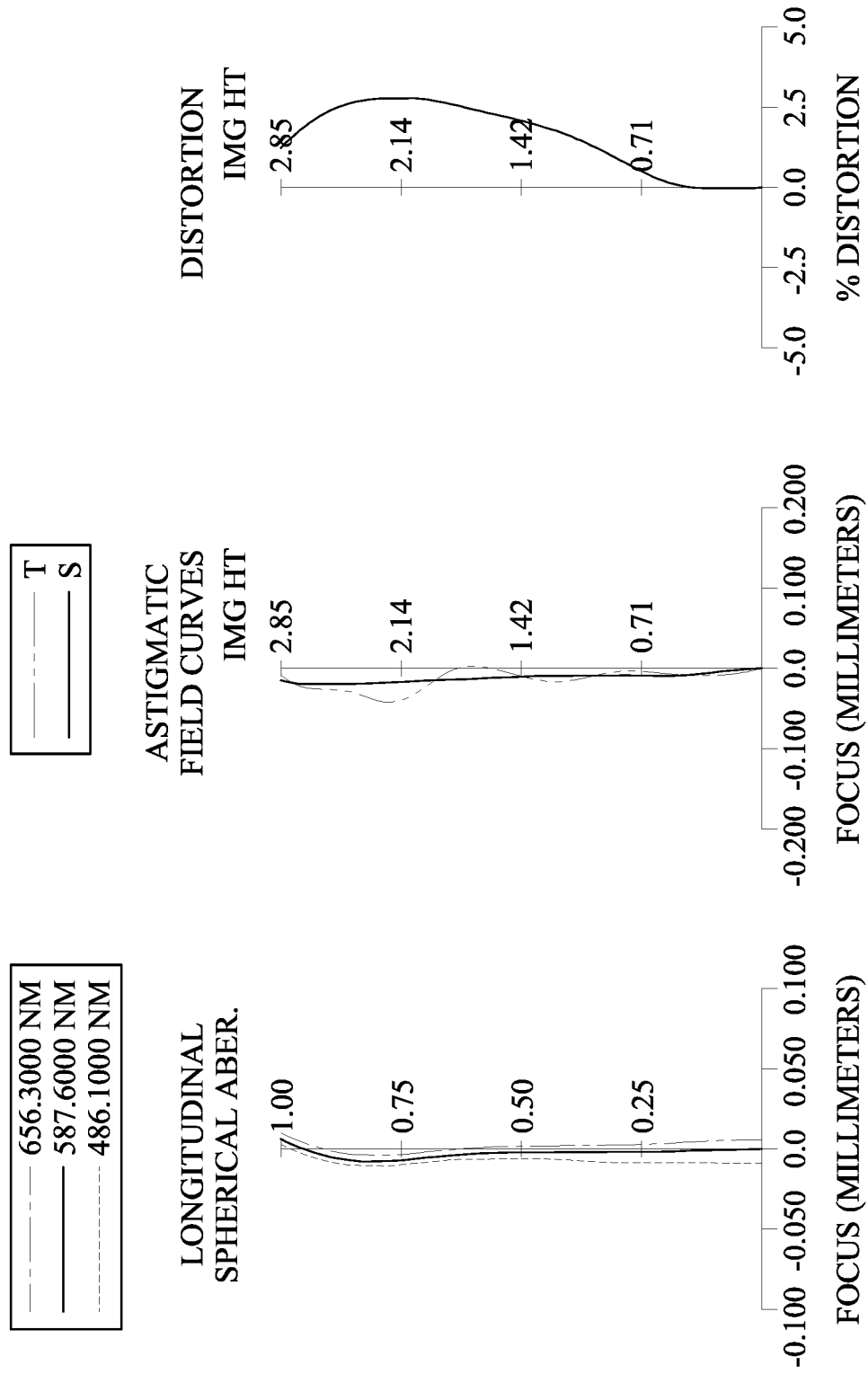
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 995. The photographing optical lens assembly includes, in order from an object side to an image side, a first lens element 910, an aperture stop 900, a second lens element 920, a third lens element 930, a fourth lens element 940, a fifth lens element 950, a sixth lens element 960, a seventh lens element 970, an IR-cut filter 980 and an image surface 990, wherein the photographing optical lens assembly has a total of seven non-cemented lens elements (910-970) with refractive power.

The first lens element 910 with positive refractive power has an object-side surface 911 being convex in a paraxial region thereof and an image-side surface 912 being concave in a paraxial region thereof. The first lens element 910 is made of glass material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The image-side surface 962 of the sixth lens element 960 has at least one inflection point.

The seventh lens element 970 with positive refractive power has an object-side surface 971 being convex in a paraxial region thereof and an image-side surface 972 being concave in a paraxial region thereof. The sixth lens element 970 is made of plastic material and has the object-side surface 971 and the image-side surface 972 being both aspheric. The image-side surface 972 of the seventh lens element 970 has at least one inflection point.

The IR-cut filter 980 is made of glass and located between the seventh lens element 970 and the image surface 990, and will not affect the focal length of the photographing optical lens assembly. The image sensor 995 is disposed on or near the image surface 990 of the photographing optical lens assembly.

The detailed optical data of the 9th embodiment are shown in Table 17 and the aspheric surface data are shown in Table 18 below.

TABLE 17

9th Embodiment
f = 3.94 mm, Fno = 2.25, HFOV = 35.6 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.833 | (ASP) | 0.524 | Glass | .571 | 50.9 | 3.52 |
| 2 | | 18.842 | (ASP) | 0.035 | | | | |
| 3 | Ape. Stop | Plano | | 0.035 | | | | |
| 4 | Lens 2 | 3.177 | (ASP) | 0.226 | Plastic | 1.634 | 23.8 | −6.57 |
| 5 | | 1.752 | (ASP) | 0.196 | | | | |
| 6 | Lens 3 | 4.093 | (ASP) | 0.459 | Plastic | 1.544 | 55.9 | −140.77 |
| 7 | | 3.732 | (ASP) | 0.146 | | | | |
| 8 | Lens 4 | 5.034 | (ASP) | 0.428 | Plastic | 1.544 | 55.9 | 6.27 |
| 9 | | −10.294 | (ASP) | 0.249 | | | | |
| 10 | Lens 5 | −1.831 | (ASP) | 0.359 | Plastic | 1.634 | 23.8 | −7.39 |

TABLE 17-continued

9th Embodiment
f = 3.94 mm, Fno = 2.25, HFOV = 35.6 deg.

| Surface# | | Curvature Radius | | Thickness | Material | Index | Abbe # | Focal Length |
|---|---|---|---|---|---|---|---|---|
| 11 | | −3.232 | (ASP) | 0.069 | | | | |
| 12 | Lens 6 | 2.231 | (ASP) | 0.414 | Plastic | 1.634 | 23.8 | −126.44 |
| 13 | | 2.015 | (ASP) | 0.245 | | | | |
| 14 | Lens 7 | 1.278 | (ASP) | 0.612 | Plastic | 1.544 | 55.9 | 17.83 |
| 15 | | 1.223 | (ASP) | 0.500 | | | | |
| 16 | IR-cut filter | Plano | | 0.300 | Glass | 1.517 | 64.2 | — |
| 17 | | Plano | | 0.225 | | | | |
| 18 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k = | 9.3252E−02 | −8.4787E+01 | −3.1108E+01 | −1.3832E+01 | −1.9985E+00 |
| A4 = | 9.8768E−04 | −1.3431E−01 | −1.7399E−01 | 1.1721E−01 | −4.5050E−03 |
| A6 = | −2.0147E−02 | 3.4294E−01 | 4.0378E−01 | −2.3068E−01 | −2.3872E−02 |
| A8 = | 4.4855E−02 | −5.1264E−01 | −5.1653E−01 | 4.9650E−01 | 2.7032E−02 |
| A10 = | −7.0722E−02 | 3.9681E−01 | 3.8741E−01 | −5.7138E−01 | −4.4869E−02 |
| A12 = | 4.8304E−02 | −1.4209E−01 | −1.5779E−01 | 3.2529E−01 | 3.2373E−02 |
| A14 = | −1.9692E−02 | 6.1719E−03 | 3.6747E−02 | −5.5559E−02 | −5.6086E−03 |

| Surface # | 7 | 8 | 9 | 10 | 11 |
|---|---|---|---|---|---|
| k = | −8.8924E+00 | −4.9073E+01 | −7.4884E+01 | 7.7111E−01 | −1.1979E+00 |
| A4 = | −1.8163E−03 | −1.4460E−02 | −1.0542E−01 | −3.7164E−02 | −1.7856E−01 |
| A6 = | −7.1557E−03 | −2.9994E−02 | 1.2028E−01 | 2.7725E−01 | 2.6623E−01 |
| A8 = | −5.8409E−03 | −1.4724E−02 | −1.0432E−01 | −4.1641E−01 | −2.9951E−01 |
| A10 = | −1.2658E−02 | 4.1849E−03 | −1.1771E−01 | 3.9853E−01 | 2.1875E−01 |
| A12 = | −6.6514E−07 | 5.7789E−07 | 3.0728E−01 | −1.7180E−01 | −8.0616E−02 |
| A14 = | — | — | −2.0461E−01 | 2.4453E−02 | 1.1550E−02 |
| A16 = | — | — | 4.5153E−02 | — | — |

| Surface # | 12 | 13 | 14 | 15 |
|---|---|---|---|---|
| k = | −9.9793E+00 | −1.6998E+01 | −2.7718E+00 | −1.8207E+00 |
| A4 = | −4.3061E−02 | −1.3672E−02 | −3.7780E−01 | −2.8260E−01 |
| A6 = | 3.6984E−02 | 1.0448E−02 | 1.9095E−01 | 1.6721E−01 |
| A8 = | −8.2847E−02 | −2.6832E−02 | −5.8437E−02 | −7.5159E−02 |
| A10 = | 5.0458E−02 | 1.1234E−02 | 1.3526E−02 | 2.2733E−02 |
| A12 = | −1.8292E−02 | −1.7063E−03 | −2.2714E−03 | −4.1799E−03 |
| A14 = | 3.0175E−03 | 8.1733E−05 | 2.3117E−04 | 4.1498E−04 |
| A16 = | — | — | −1.0297E−05 | −1.6947E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

9th Embodiment

| | | | |
|---|---|---|---|
| f [mm] | 3.94 | (R13 − R14)/(R13 + R14) | 0.02 |
| Fno | 2.25 | $|f1/f2|$ | 0.54 |
| HFOV [deg.] | 35.6 | f/f3 | −0.03 |
| Nmax | 1.634 | $|f1/f7|$ | 0.20 |
| V2 | 23.8 | $|f/fj|$ max | 1.12 |
| CT1/CT2 | 2.32 | f/EPD | 2.25 |
| T23/CT2 | 0.87 | Yc62/Yc61 | 1.17 |
| T23/T34 | 1.34 | Yc62/Yc72 | 0.98 |
| (T12/T23) + (T34/T45) + (T56/T67) | 1.23 | Yc72/f | 0.30 |
| R1/R2 | 0.10 | ΣAT/ImgH | 0.34 |
| f/R6 | 1.05 | SD/TD | 0.86 |
| f/R12 | 1.95 | TL/f | 1.28 |
| R14/f | 0.31 | TL/ImgH | 1.76 |
| (R11 − R12)/(R11 + R12) | 0.05 | | |

10th Embodiment

Figure 19:
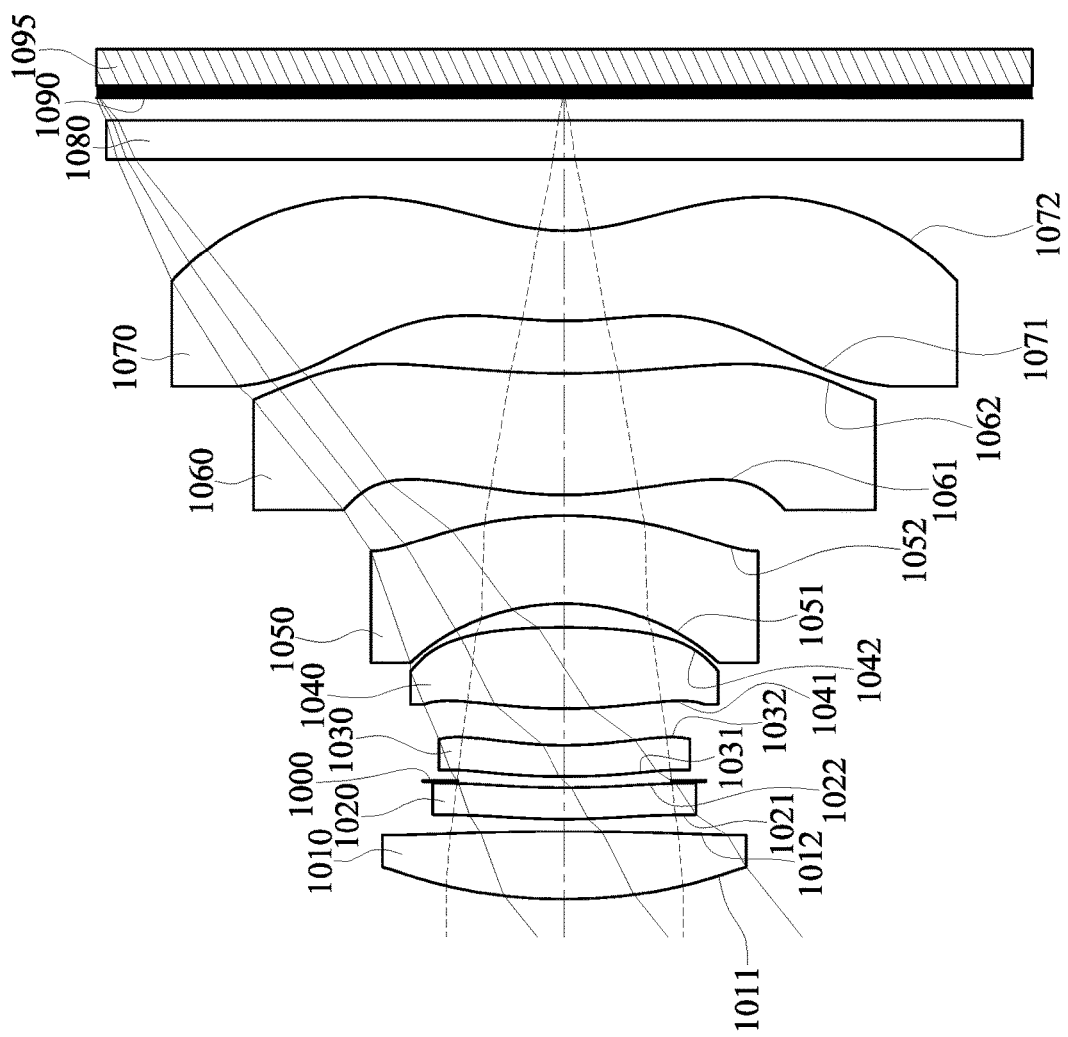
FIG. 19 a schematic view of an image capturing unit according to the 10th embodiment of the present disclosure.
Figure 20:
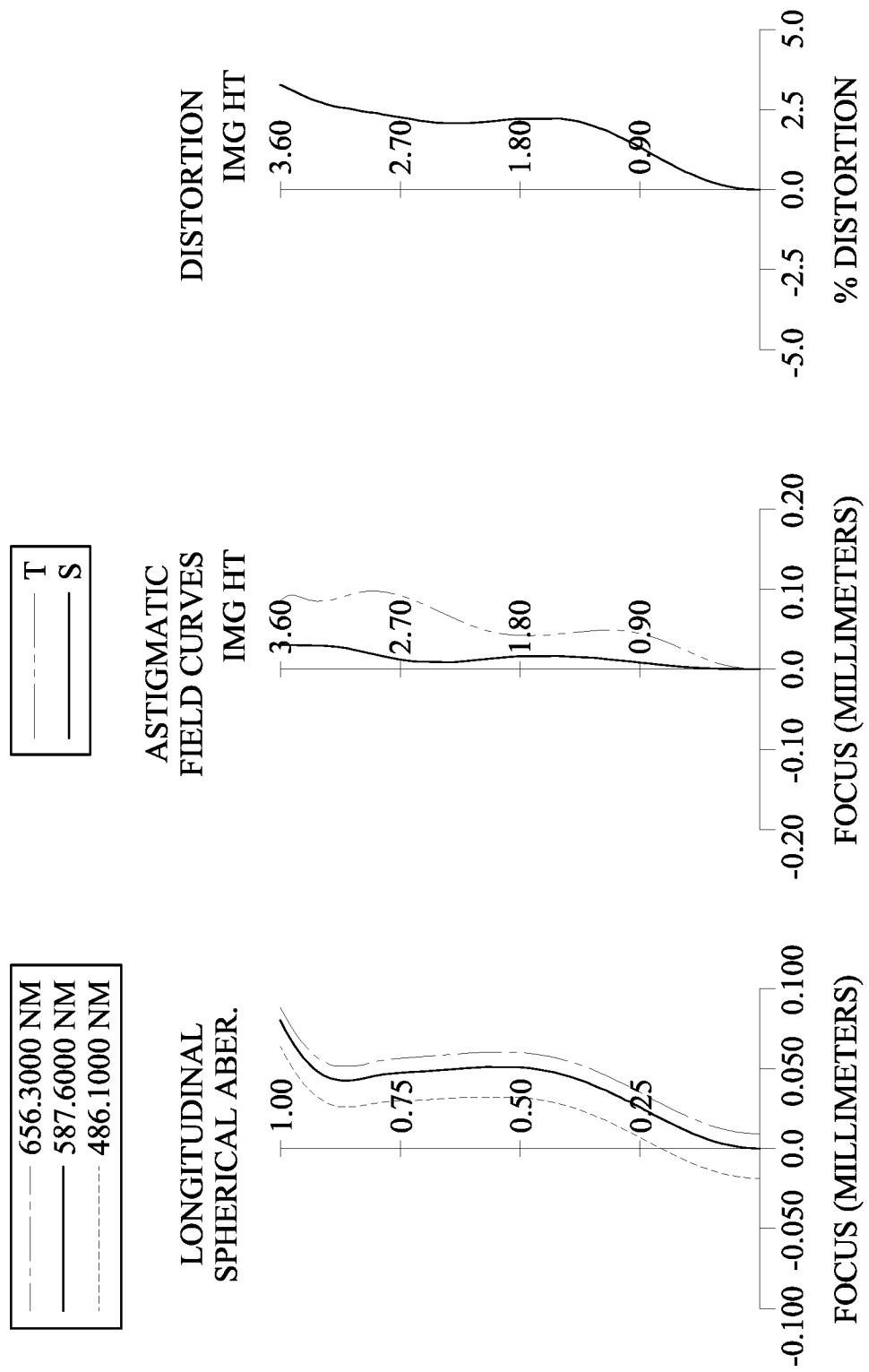
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens assembly (its reference numeral is omitted) of the present disclosure and an image sensor 1095. The photographing optical lens assembly includes, in order from an object side to an image side, a first lens element 1010, a second lens element 1020, an aperture stop 1000, a third lens element 1030, a fourth lens element 1040, a fifth lens element 1050, a sixth lens element 1060, a seventh lens element 1070, an IR-cut filter 1080 and an image surface 1090, wherein the photographing optical lens assembly has a total of seven non-cemented lens elements (1010-1070) with refractive power.

The first lens element 1010 with positive refractive power has an object-side surface 1011 being convex in a paraxial region thereof and an image-side surface 1012 being convex in a paraxial region thereof. The first lens element 1010 is made of glass material and has the object-side surface 1011 and the image-side surface 1012 being both aspheric.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The image-side surface 1062 of the sixth lens element 1060 has at least one inflection point.

The seventh lens element 1070 with negative refractive power has an object-side surface 1071 being convex in a paraxial region thereof and an image-side surface 1072 being concave in a paraxial region thereof. The sixth lens element 1070 is made of plastic material and has the object-side surface 1071 and the image-side surface 1072 being both aspheric. The image-side surface 1072 of the seventh lens element 1070 has at least one inflection point.

The IR-cut filter 1080 is made of glass and located between the seventh lens element 1070 and the image surface 1090, and will not affect the focal length of the photographing optical lens assembly. The image sensor 1095 is disposed on or near the image surface 1090 of the photographing optical lens assembly.

The detailed optical data of the 10th embodiment are shown in Table 19 and the aspheric surface data are shown in Table 20 below.

TABLE 19

10th Embodiment
f = 4.31 mm, Fno = 2.35, HFOV = 38.7 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.017 | (ASP) | 0.524 | Glass | 1.571 | 50.9 | 6.65 |
| 2 | | −65.317 | (ASP) | 0.100 | | | | |
| 3 | Lens 2 | 5.011 | (ASP) | 0.243 | Plastic | 1.535 | 55.7 | 27.49 |
| 4 | | 7.473 | (ASP) | 0.052 | | | | |
| 5 | Ape. Stop | Plano | | 0.035 | | | | |
| 6 | Lens 3 | 5.645 | (ASP) | 0.240 | Plastic | 1.544 | 55.9 | −12.38 |
| 7 | | 3.025 | (ASP) | 0.285 | | | | |
| 8 | Lens 4 | 3.931 | (ASP) | 0.625 | Plastic | 1.535 | 55.7 | 4.84 |
| 9 | | −7.163 | (ASP) | 0.184 | | | | |
| 10 | Lens 5 | −1.886 | (ASP) | 0.685 | Plastic | 1.639 | 23.5 | −6.50 |
| 11 | | −3.944 | (ASP) | 0.160 | | | | |
| 12 | Lens 6 | 2.759 | (ASP) | 0.939 | Plastic | 1.535 | 55.7 | 9.03 |
| 13 | | 5.668 | (ASP) | 0.408 | | | | |
| 14 | Lens 7 | 3.098 | (ASP) | 0.702 | Plastic | 1.535 | 55.7 | −8.02 |
| 15 | | 1.657 | (ASP) | 0.550 | | | | |
| 16 | IR-cut filter | Plano | | 0.300 | Glass | 1.517 | 64.2 | — |
| 17 | | Plano | | 0.174 | | | | |
| 18 | Image | Plano | | — | | | | |

Note:
Reference wavelength is 587.6 nm (d-line).

TABLE 20

Aspheric Coefficients

| Surface # | 1 | 2 | 3 | 4 | 6 |
|---|---|---|---|---|---|
| k = | −4.4121E−01 | −9.0000E+01 | −5.2647E+01 | −9.0000E+01 | 6.7438E+00 |
| A4 = | −2.7925E−03 | −6.0729E−02 | −8.3879E−02 | 2.3453E−02 | 1.2620E−02 |
| A6 = | −1.4523E−03 | 1.0296E−01 | 1.1013E−01 | −7.8608E−02 | −3.4785E−02 |
| A8 = | 8.9957E−03 | −8.7060E−02 | −1.1750E−01 | 7.6809E−02 | −4.5462E−02 |
| A10 = | −7.1935E−03 | 4.2813E−02 | 5.1732E−02 | −1.0782E−01 | −1.1942E−02 |
| A12 = | 2.8100E−03 | −1.1746E−02 | 7.2692E−03 | 6.5612E−02 | 4.4816E−02 |
| A14 = | −5.6176E−04 | 1.3249E−03 | −6.2848E−03 | 9.1499E−03 | −2.5794E−02 |

| Surface # | 7 | 8 | 9 | 10 | 11 |
|---|---|---|---|---|---|
| k = | −1.8282E+01 | −3.4370E+01 | 3.1289E+01 | 8.7442E−01 | −2.2726E+00 |
| A4 = | −2.0792E−02 | −3.0596E−03 | −7.6244E−02 | −1.4822E−02 | −7.7815E−02 |
| A6 = | −2.9096E−02 | −1.7556E−02 | 2.5788E−02 | 6.8034E−02 | 8.1748E−02 |
| A8 = | −2.9052E−02 | −1.0621E−02 | −2.5584E−02 | −7.5044E−02 | −5.3130E−02 |
| A10 = | −5.7286E−03 | −2.9892E−03 | −1.6928E−02 | 4.4752E−02 | 2.3619E−02 |
| A12 = | −3.3949E−07 | −3.9023E−03 | 1.9201E−02 | −1.0306E−02 | −5.3502E−03 |
| A14 = | — | — | −7.2368E−03 | 1.0731E−03 | 5.2246E−04 |
| A16 = | — | — | 1.1131E−03 | — | — |

| Surface # | 12 | 13 | 14 | 15 |
|---|---|---|---|---|
| k = | −1.6732E+01 | −8.6779E+01 | −2.4628E+00 | −1.4309E+00 |
| A4 = | −2.0969E−02 | −2.5725E−03 | −1.7970E−01 | −1.3653E−01 |
| A6 = | 1.0714E−02 | 3.6469E−03 | 5.5732E−02 | 4.8495E−02 |
| A8 = | −1.4568E−02 | −4.7807E−03 | −1.0371E−02 | −1.3336E−02 |
| A10 = | 5.1337E−03 | 1.2153E−03 | 1.4666E−03 | 2.4665E−03 |
| A12 = | −1.2721E−03 | −1.1342E−04 | −1.5039E−04 | −2.7666E−04 |
| A14 = | 1.4426E−04 | 3.2593E−06 | 9.3177E−06 | 1.6751E−05 |
| A16 = | — | — | −2.5810E−07 | −4.1855E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.31 | (R13 − R14)/(R13 + R14) | 0.30 |
| Fno | 2.35 | |f1/f2| | 0.24 |
| HFOV [deg.] | 38.7 | f/f3 | −0.35 |
| Nmax | 1.639 | |f1/f7| | 0.83 |
| V2 | 55.7 | |f/fj| max | 0.89 |
| CT1/CT2 | 2.16 | f/EPD | 2.35 |
| T23/CT2 | 0.36 | Yc62/Yc61 | 1.15 |
| T23/T34 | 0.31 | Yc62/Yc72 | 0.88 |
| (T12/T23) + (T34/T45) + (T56/T67) | 3.09 | Yc72/f | 0.36 |
| R1/R2 | −0.06 | ΣAT/ImgH | 0.34 |
| f/R6 | 1.42 | SD/TD | 0.82 |
| f/R12 | 0.76 | TL/f | 1.44 |
| R14/f | 0.38 | TL/ImgH | 1.72 |
| (R11 − R12)/(R11 + R12) | −0.35 | | |

11th Embodiment

Figure 21:
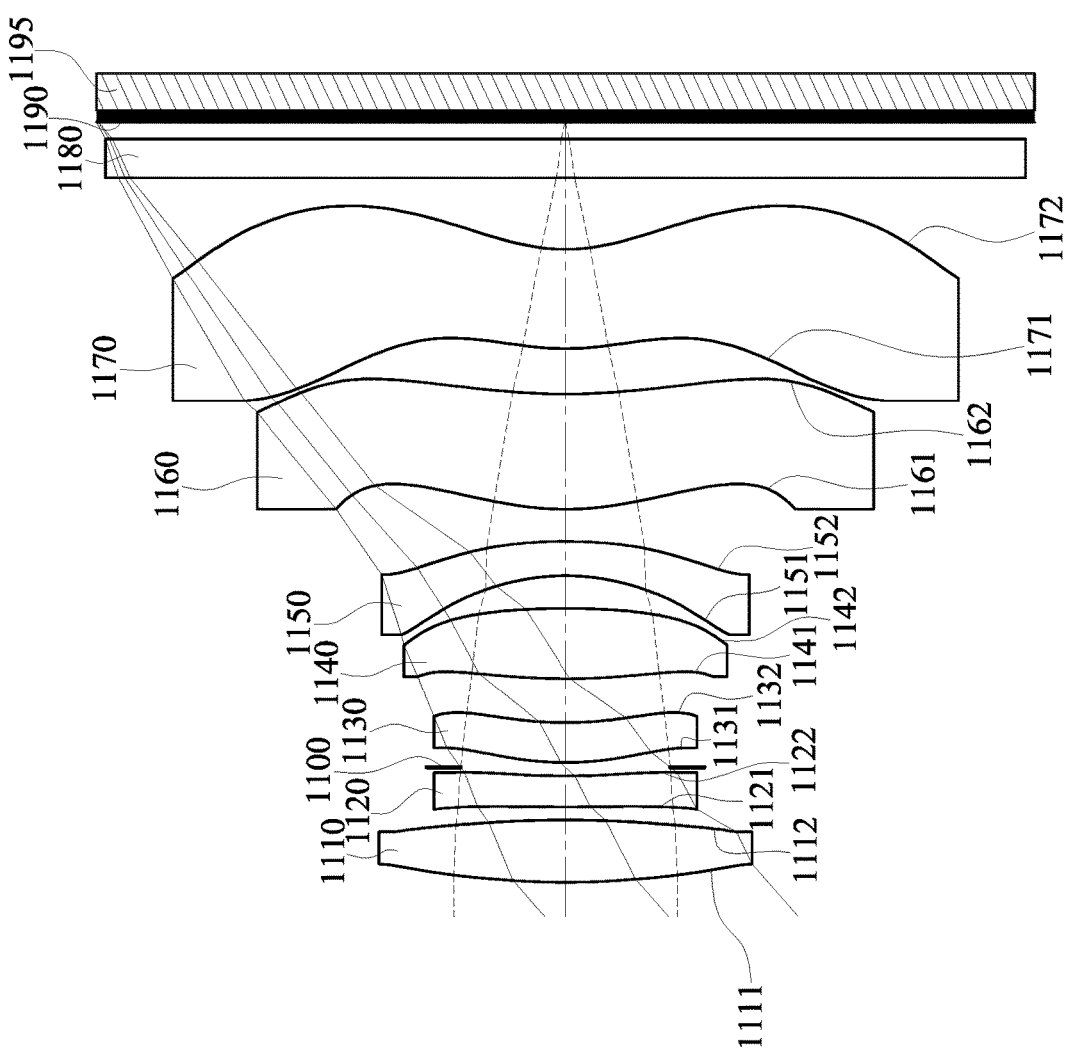
FIG. 21 a schematic view of an image capturing unit according to the 11th embodiment of the present disclosure.
Figure 22:
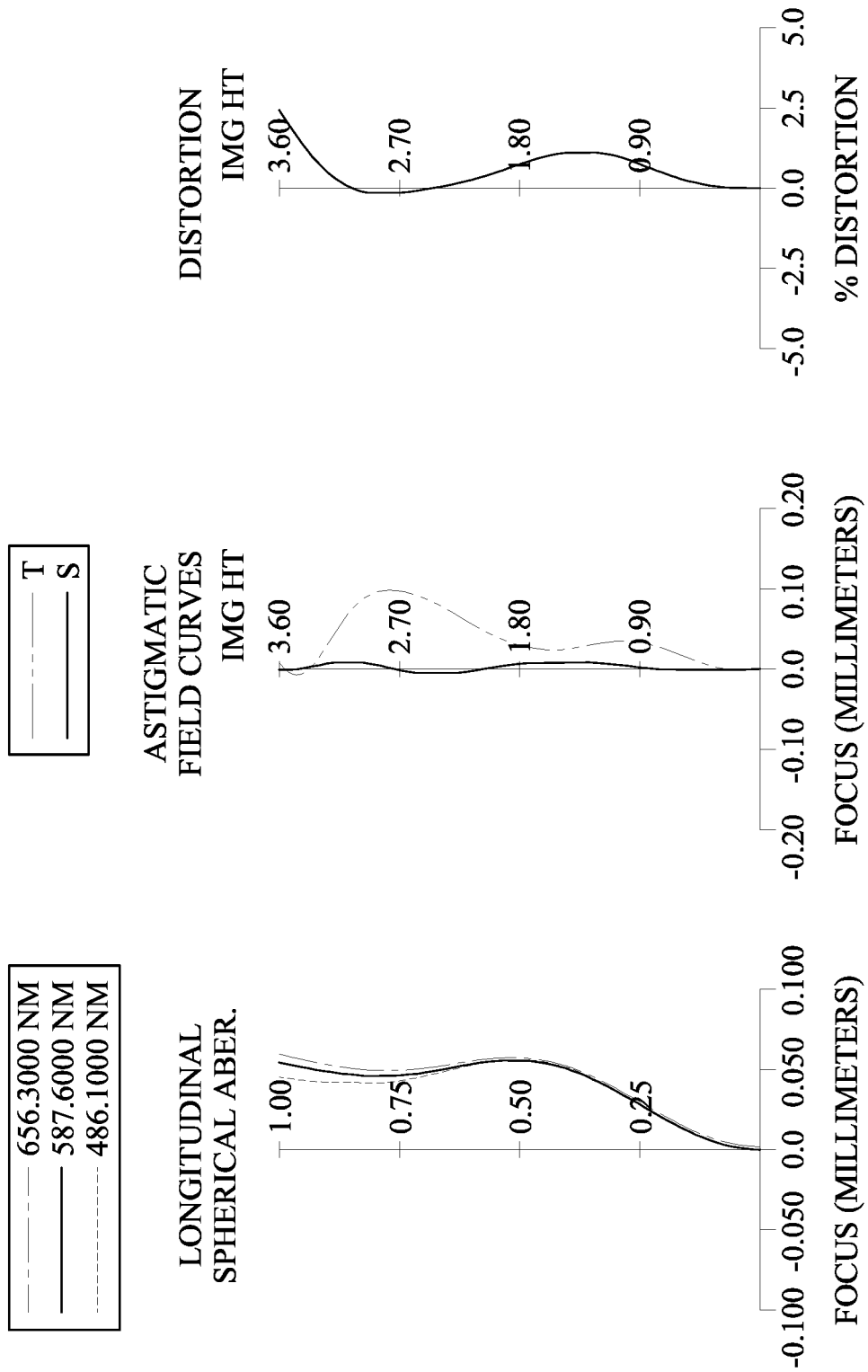
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the photographing optical lens assembly (its reference numeral is omitted) of the present disclosure and an image sensor 1195. The photographing optical lens assembly includes, in order from an object side to an image side, a first lens element 1110, a second lens element 1120, an aperture stop 1100, a third lens element 1130, a fourth lens element 1140, a fifth lens element 1150, a sixth lens element 1160, a seventh lens element 1170, an IR-cut filter 1180 and an image surface 1190, wherein the photographing optical lens assembly has a total of seven non-cemented lens elements (1110-1170) with refractive power.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with positive refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. The image-side surface 1162 of the sixth lens element 1160 has at least one inflection point.

The seventh lens element 1170 with negative refractive power has an object-side surface 1171 being convex in a paraxial region thereof and an image-side surface 1172 being concave in a paraxial region thereof. The sixth lens element 1170 is made of plastic material and has the object-side surface 1171 and the image-side surface 1172 being both aspheric. The image-side surface 1172 of the seventh lens element 1170 has at least one inflection point.

The IR-cut filter 1180 is made of glass and located between the seventh lens element 1170 and the image surface 1190, and will not affect the focal length of the photographing optical lens assembly. The image sensor 1195 is disposed on or near the image surface 1190 of the photographing optical lens assembly.

The detailed optical data of the 11th embodiment are shown in Table 21 and the aspheric surface data are shown in Table 22 below.

TABLE 21

11th Embodiment
f = 3.97 mm, Fno = 2.30, HFOV = 41.3 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.689 | (ASP) | 0.480 | Plastic | 1.572 | 56.0 | 6.67 |
| 2 | | −11.221 | (ASP) | 0.100 | | | | |
| 3 | Lens 2 | 20.389 | (ASP) | 0.240 | Plastic | 1.614 | 25.6 | −13.91 |
| 4 | | 5.993 | (ASP) | 0.067 | | | | |
| 5 | Ape. Stop | Plano | | 0.035 | | | | |
| 6 | Lens 3 | 2.310 | (ASP) | 0.308 | Plastic | 1.535 | 55.7 | 25.32 |
| 7 | | 2.656 | (ASP) | 0.341 | | | | |
| 8 | Lens 4 | 4.637 | (ASP) | 0.543 | Plastic | 1.535 | 55.7 | 5.36 |
| 9 | | −7.207 | (ASP) | 0.251 | | | | |
| 10 | Lens 5 | −1.862 | (ASP) | 0.265 | Plastic | 1.634 | 23.8 | −5.66 |
| 11 | | −4.085 | (ASP) | 0.249 | | | | |
| 12 | Lens 6 | 2.265 | (ASP) | 0.889 | Plastic | 1.535 | 55.7 | 7.85 |
| 13 | | 4.247 | (ASP) | 0.352 | | | | |
| 14 | Lens 7 | 2.131 | (ASP) | 0.763 | Plastic | 1.535 | 55.7 | −12.27 |
| 15 | | 1.408 | (ASP) | 0.550 | | | | |
| 16 | IR-cut filter | Plano | | 0.300 | Glass | 1.517 | 64.2 | — |
| 17 | | Plano | | 0.131 | | | | |
| 18 | Image | Plano | | — | | | | |

Note:
Reference wavelength is 587.6 nm (d-line).

TABLE 22

Aspheric Coefficients

| Surface # | 1 | 2 | 3 | 4 | 6 |
|---|---|---|---|---|---|
| k = | −1.4769E+01 | −4.5979E+01 | 6.2402E+01 | −5.4000E+01 | −7.3837E+00 |
| A4 = | −9.8407E−03 | −5.9328E−02 | −7.3776E−02 | −6.8889E−03 | 2.2836E−03 |
| A6 = | 1.5354E−03 | 1.0257E−01 | 1.0799E−01 | −8.7287E−02 | −4.0189E−02 |
| A8 = | 9.7206E−03 | −8.6269E−02 | −1.2667E−01 | 9.4593E−02 | −4.3427E−02 |
| A10 = | −7.4572E−03 | 4.2217E−02 | 5.0677E−02 | −9.9074E−02 | −2.0134E−04 |
| A12 = | 2.5872E−03 | −1.2253E−02 | 7.1679E−03 | 7.0383E−02 | 5.9565E−02 |
| A14 = | −5.0160E−04 | 1.5058E−03 | −6.4004E−03 | −1.7445E−02 | −4.6875E−02 |

| Surface # | 7 | 8 | 9 | 10 | 11 |
|---|---|---|---|---|---|
| k = | −9.2040E+00 | −4.4510E+01 | 2.8925E+01 | 7.2093E−01 | 6.5032E−01 |
| A4 = | −2.9656E−02 | 2.6417E−03 | −5.5882E−02 | −7.1097E−03 | −8.2312E−02 |
| A6 = | −3.8413E−02 | −1.5849E−02 | 2.9817E−02 | 6.5856E−02 | 8.4288E−02 |
| A8 = | −1.8369E−02 | −6.8958E−03 | −2.1791E−02 | −7.5870E−02 | −5.2882E−02 |
| A10 = | −1.2093E−02 | −1.3932E−03 | −1.5702E−02 | 4.5555E−02 | 2.3573E−02 |
| A12 = | −6.8416E−07 | −5.5272E−03 | 1.9813E−02 | −9.1657E−03 | −5.2664E−03 |
| A14 = | — | — | −6.6508E−03 | 2.1721E−03 | 6.6547E−04 |
| A16 = | — | — | 1.1131E−03 | — | — |

TABLE 22-continued

| Aspheric Coefficients | | | | |
|---|---|---|---|---|
| Surface # | 12 | 13 | 14 | 15 |
| k = | −9.5414E+00 | −5.9601E+01 | −3.2824E+00 | −1.9943E+00 |
| A4 = | −1.5280E−02 | 4.4740E−03 | −1.8301E−01 | −1.2462E−01 |
| A6 = | 1.0160E−02 | 2.4525E−03 | 5.5965E−02 | 4.7412E−02 |
| A8 = | −1.3350E−02 | −4.8344E−03 | −1.0343E−02 | −1.3383E−02 |
| A10 = | 5.0657E−03 | 1.2126E−03 | 1.4678E−03 | 2.4720E−03 |
| A12 = | −1.3056E−03 | −1.1296E−04 | −1.5047E−04 | −2.7621E−04 |
| A14 = | 1.4568E−04 | 3.5073E−06 | 9.3125E−06 | 1.6753E−05 |
| A16 = | — | — | −2.5895E−07 | −4.2022E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.97 | (R13 − R14)/(R13 + R14) | 0.20 |
| Fno | 2.30 | |f1/f2| | 0.48 |
| HFOV [deg.] | 41.3 | f/f3 | 0.16 |
| Nmax | 1.634 | |f1/f7| | 0.54 |
| V2 | 25.6 | |f/fj| max | 0.74 |
| CT1/CT2 | 2.00 | f/EPD | 2.30 |
| T23/CT2 | 0.43 | Yc62/Yc61 | 1.11 |
| T23/T34 | 0.30 | Yc62/Yc72 | 0.90 |
| (T12/T23) + (T34/T45) + (T56/T67) | 3.05 | Yc72/f | 0.42 |
| R1/R2 | −0.51 | ΣAT/ImgH | 0.39 |
| f/R6 | 1.49 | SD/TD | 0.82 |
| f/R12 | 0.93 | TL/f | 1.48 |
| R14/f | 0.36 | TL/ImgH | 1.63 |
| (R11 − R12)/(R11 + R12) | −0.30 | | |

12th Embodiment

Figure 23:
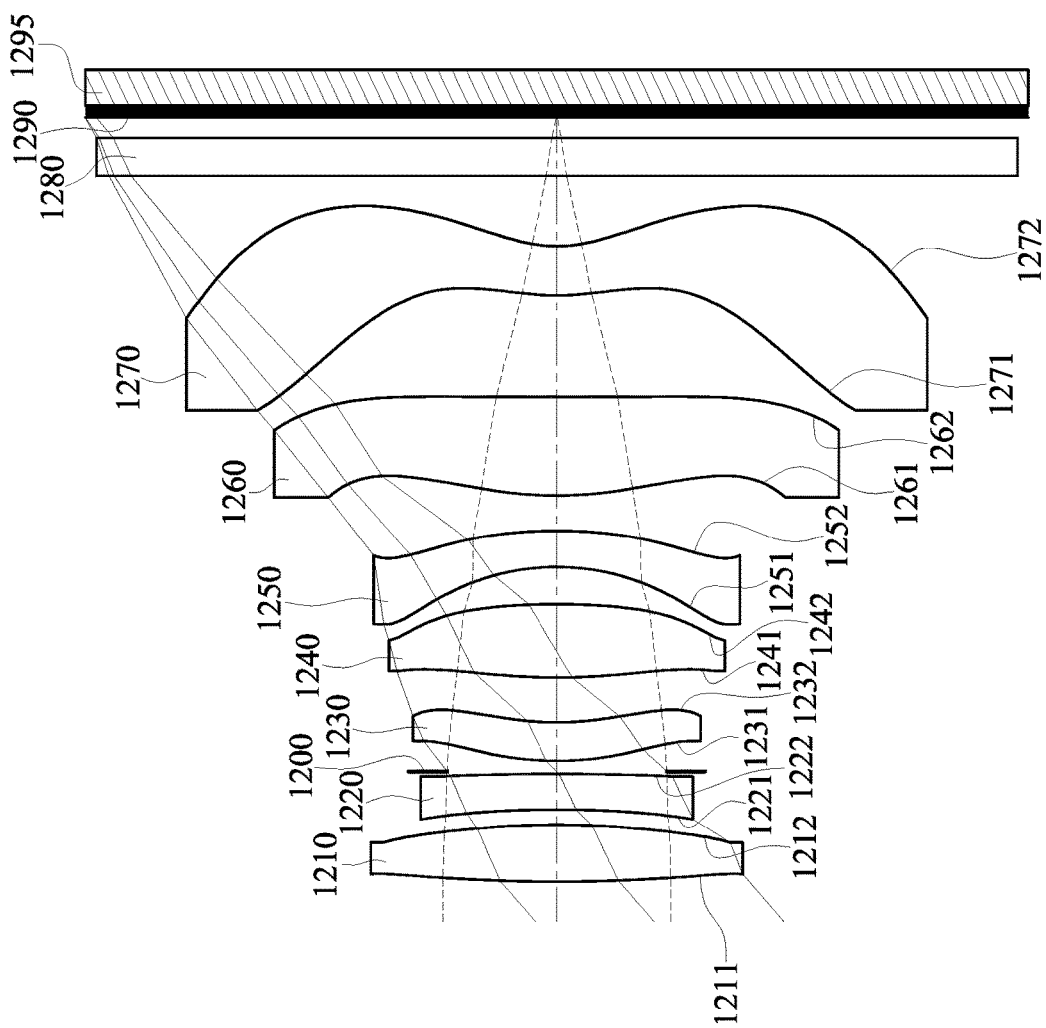
FIG. 23 a schematic view of an image capturing unit according to the 12th embodiment of the present disclosure.
Figure 24:
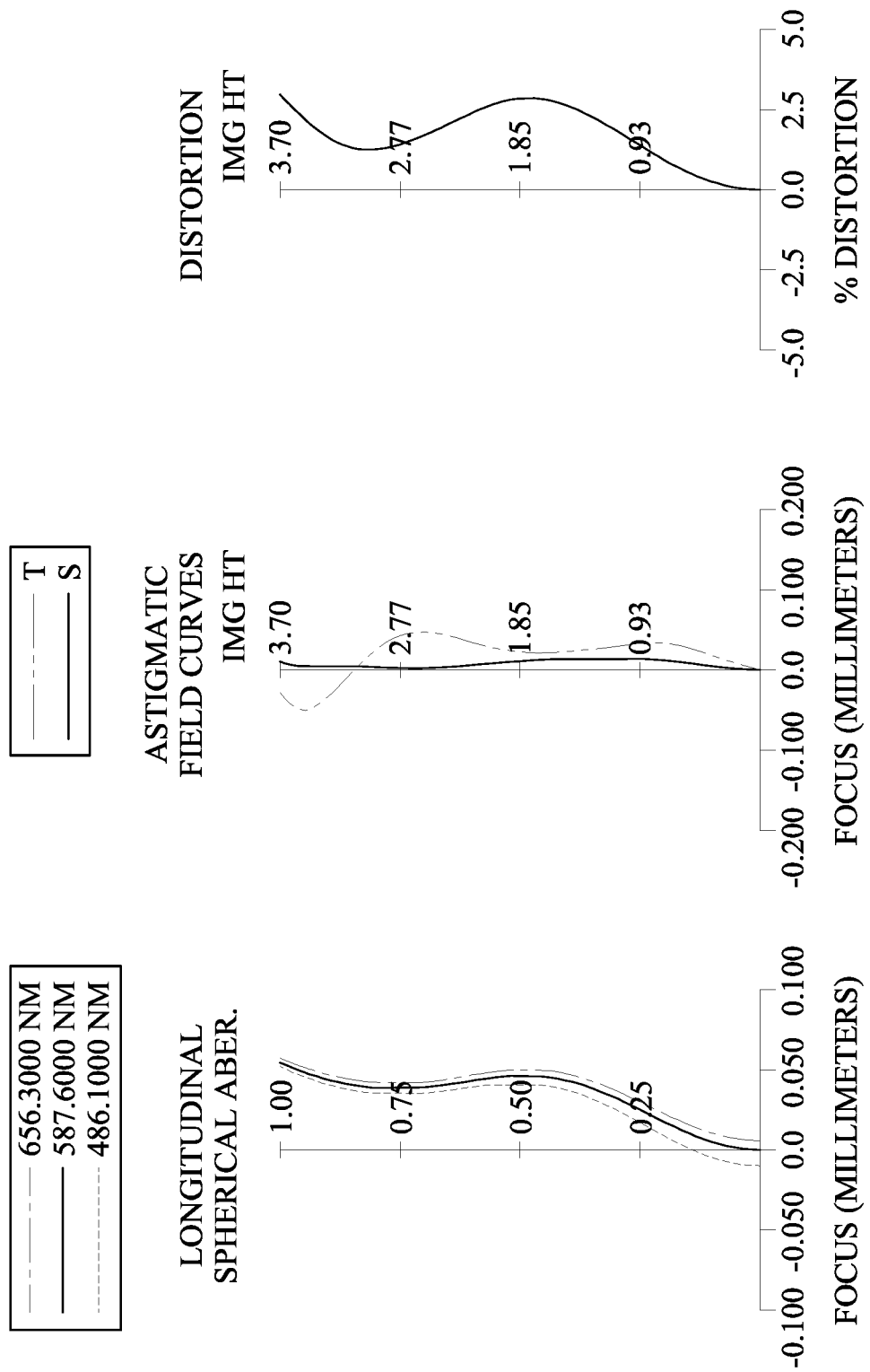
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the photographing optical lens assembly (its reference numeral is omitted) of the present disclosure and an image sensor 1295. The photographing optical lens assembly includes, in order from an object side to an image side, a first lens element 1210, a second lens element 1220, an aperture stop 1200, a third lens element 1230, a fourth lens element 1240, a fifth lens element 1250, a sixth lens element 1260, a seventh lens element 1270, an IR-cut filter 1280 and an image surface 1290, wherein the photographing optical lens assembly has a total of seven non-cemented lens elements (1210-1270) with refractive power.

The first lens element 1210 with positive refractive power has an object-side surface 1211 being convex in a paraxial region thereof and an image-side surface 1212 being convex in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being convex in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with negative refractive power has an object-side surface 1251 being concave in a paraxial region thereof and an image-side surface 1252 being convex in a paraxial region thereof. The fifth lens element 1250 is made of plastic material and has the object-side surface 1251 and the image-side surface 1252 being both aspheric.

The sixth lens element 1260 with positive refractive power has an object-side surface 1261 being convex in a paraxial region thereof and an image-side surface 1262 being concave in a paraxial region thereof. The sixth lens element 1260 is made of plastic material and has the object-side surface 1261 and the image-side surface 1262 being both aspheric. The image-side surface 1262 of the sixth lens element 1260 has at least one inflection point.

The seventh lens element 1270 with negative refractive power has an object-side surface 1271 being convex in a paraxial region thereof and an image-side surface 1272 being concave in a paraxial region thereof. The sixth lens element 1270 is made of plastic material and has the object-side surface 1271 and the image-side surface 1272 being both aspheric. The image-side surface 1272 of the seventh lens element 1270 has at least one inflection point.

The IR-cut filter 1280 is made of glass and located between the seventh lens element 1270 and the image surface 1290, and will not affect the focal length of the photographing optical lens assembly. The image sensor 1295 is disposed on or near the image surface 1290 of the photographing optical lens assembly.

The detailed optical data of the 12th embodiment are shown in Table 23 and the aspheric surface data are shown in Table 24 below.

TABLE 23

12th Embodiment
f = 4.11 mm, Fno = 2.30, HFOV = 40.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.225 | (ASP) | 0.449 | Plastic | 1.572 | 56.0 | 8.63 |
| 2 | | −8.686 | (ASP) | 0.120 | | | | |
| 3 | Lens 2 | −11.334 | (ASP) | 0.280 | Plastic | 1.614 | 25.6 | −41.01 |
| 4 | | −20.802 | (ASP) | 0.021 | | | | |
| 5 | Ape. Stop | Plano | | 0.082 | | | | |
| 6 | Lens 3 | 2.316 | (ASP) | 0.303 | Plastic | 1.544 | 55.9 | 99.54 |
| 7 | | 2.308 | (ASP) | 0.351 | | | | |
| 8 | Lens 4 | 4.401 | (ASP) | 0.576 | Plastic | 1.535 | 55.7 | 5.00 |
| 9 | | −6.516 | (ASP) | 0.293 | | | | |
| 10 | Lens 5 | −1.870 | (ASP) | 0.285 | Plastic | 1.634 | 23.8 | −5.53 |
| 11 | | −4.245 | (ASP) | 0.278 | | | | |
| 12 | Lens 6 | 2.684 | (ASP) | 0.775 | Plastic | 1.535 | 55.7 | 5.05 |
| 13 | | 354.425 | (ASP) | 0.796 | | | | |
| 14 | Lens 7 | 1.960 | (ASP) | 0.391 | Plastic | 1.530 | 55.8 | −4.99 |
| 15 | | 1.048 | (ASP) | 0.550 | | | | |
| 16 | IR-cut filter | Plano | | 0.300 | Glass | 1.517 | 64.2 | — |
| 17 | | Plano | | 0.159 | | | | |
| 18 | Image | Plano | | — | | | | |

Note:
Reference wavelength is 587.6 nm (d-line).

TABLE 24

Aspheric Coefficients

| Surface # | 1 | 2 | 3 | 4 | 6 |
|---|---|---|---|---|---|
| k = | −5.2340E+01 | −1.4070E+01 | −6.5000E+01 | −4.4176E+01 | −5.8692E+00 |
| A4 = | −9.3247E−03 | −6.3047E−02 | −6.8302E−02 | 2.1605E−02 | 1.2530E−02 |
| A6 = | 2.8083E−03 | 1.0233E−01 | 1.1349E−01 | −5.5147E−02 | −1.8222E−02 |
| A8 = | 8.8228E−03 | −8.5855E−02 | −1.2184E−01 | 7.9171E−02 | −1.3389E−02 |
| A10 = | −7.7192E−03 | 4.2245E−02 | 5.1446E−02 | −1.0089E−01 | −1.7729E−02 |
| A12 = | 2.6154E−03 | −1.2341E−02 | 6.9862E−03 | 7.2785E−02 | 2.2049E−02 |
| A14 = | −4.6711E−04 | 1.5302E−03 | −7.8363E−03 | −1.7160E−02 | −1.1286E−02 |

| Surface # | 7 | 8 | 9 | 10 | 11 |
|---|---|---|---|---|---|
| k = | −1.0396E+01 | −4.4804E+01 | 1.3926E+01 | 6.3500E−01 | −6.2043E−01 |
| A4 = | −2.6355E−02 | 5.4948E−03 | −5.1982E−02 | −8.4509E−02 | −7.9694E−02 |
| A6 = | −2.5235E−02 | −1.8601E−02 | 1.9219E−02 | 6.8293E−02 | 8.4533E−02 |
| A8 = | −7.3120E−03 | −7.1373E−03 | −2.0654E−02 | −7.6621E−02 | −5.2667E−02 |
| A10 = | −1.0174E−02 | 3.1339E−03 | −1.4377E−02 | 4.4943E−02 | 2.3686E−02 |
| A12 = | −6.7181E−07 | 6.0750E−04 | 2.0303E−02 | −8.9572E−03 | −5.1959E−03 |
| A14 = | −4.4927E−08 | −1.1776E−06 | −6.2652E−03 | 2.2942E−03 | 7.3800E−04 |
| A16 = | — | — | 1.1131E−03 | −1.2373E−04 | — |

| Surface # | 12 | 13 | 14 | 15 |
|---|---|---|---|---|
| k = | −1.2794E+01 | −9.0000E+01 | −1.1696E+01 | −4.1576E+00 |
| A4 = | −1.9305E−02 | −2.5445E−03 | −1.9325E−01 | −1.0658E−01 |
| A6 = | 1.1579E−02 | 5.5787E−03 | 5.6105E−02 | 4.4921E−02 |
| A8 = | −1.2507E−02 | −4.9614E−03 | −1.0266E−02 | −1.3408E−02 |
| A10 = | 5.0020E−03 | 1.1975E−03 | 1.4753E−03 | 2.4798E−03 |
| A12 = | −1.3328E−03 | −1.1561E−04 | −1.4985E−04 | −2.7587E−04 |
| A14 = | 1.5503E−04 | 3.2093E−06 | 9.2933E−06 | 1.6756E−05 |
| A16 = | — | — | −2.9255E−07 | −4.2257E−07 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 4.11 | (R13 − R14)/(R13 + R14) | 0.30 |
| Fno | 2.30 | |f1/f2| | 0.21 |

-continued

12th Embodiment

| | | | |
|---|---|---|---|
| HFOV [deg.] | 40.9 | f/f3 | 0.04 |
| Nmax | 1.634 | |f1/f7| | 1.73 |
| V2 | 25.6 | |f/fj| max | 0.82 |
| CT1/CT2 | 1.60 | f/EPD | 2.30 |
| T23/CT2 | 0.37 | Yc62/Yc61 | 0.68 |
| T23/T34 | 0.29 | Yc62/Yc72 | 0.60 |
| (T12/T23) + (T34/T45) + (T56/T67) | 2.71 | Yc72/f | 0.37 |
| R1/R2 | −1.29 | ΣAT/ImgH | 0.52 |
| f/R6 | 1.78 | SD/TD | 0.83 |
| f/R12 | 0.01 | TL/f | 1.46 |
| R14/f | 0.25 | TL/ImgH | 1.62 |
| (R11 − R12)/(R11 + R12) | −0.98 | | |

13th Embodiment

Figure 25:
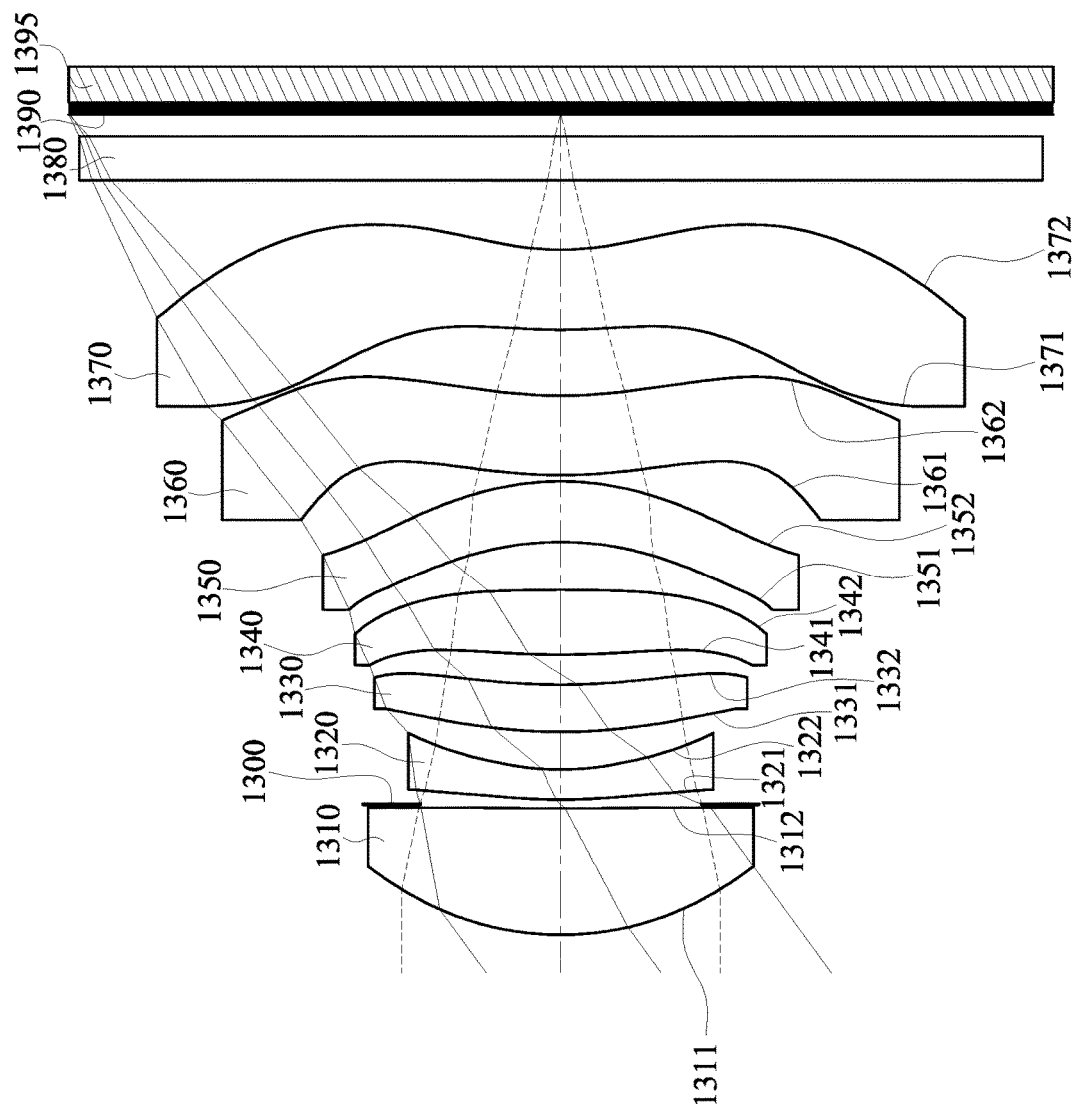
FIG. 25 a schematic view of an image capturing unit according to the 13th embodiment of the present disclosure.
Figure 26:
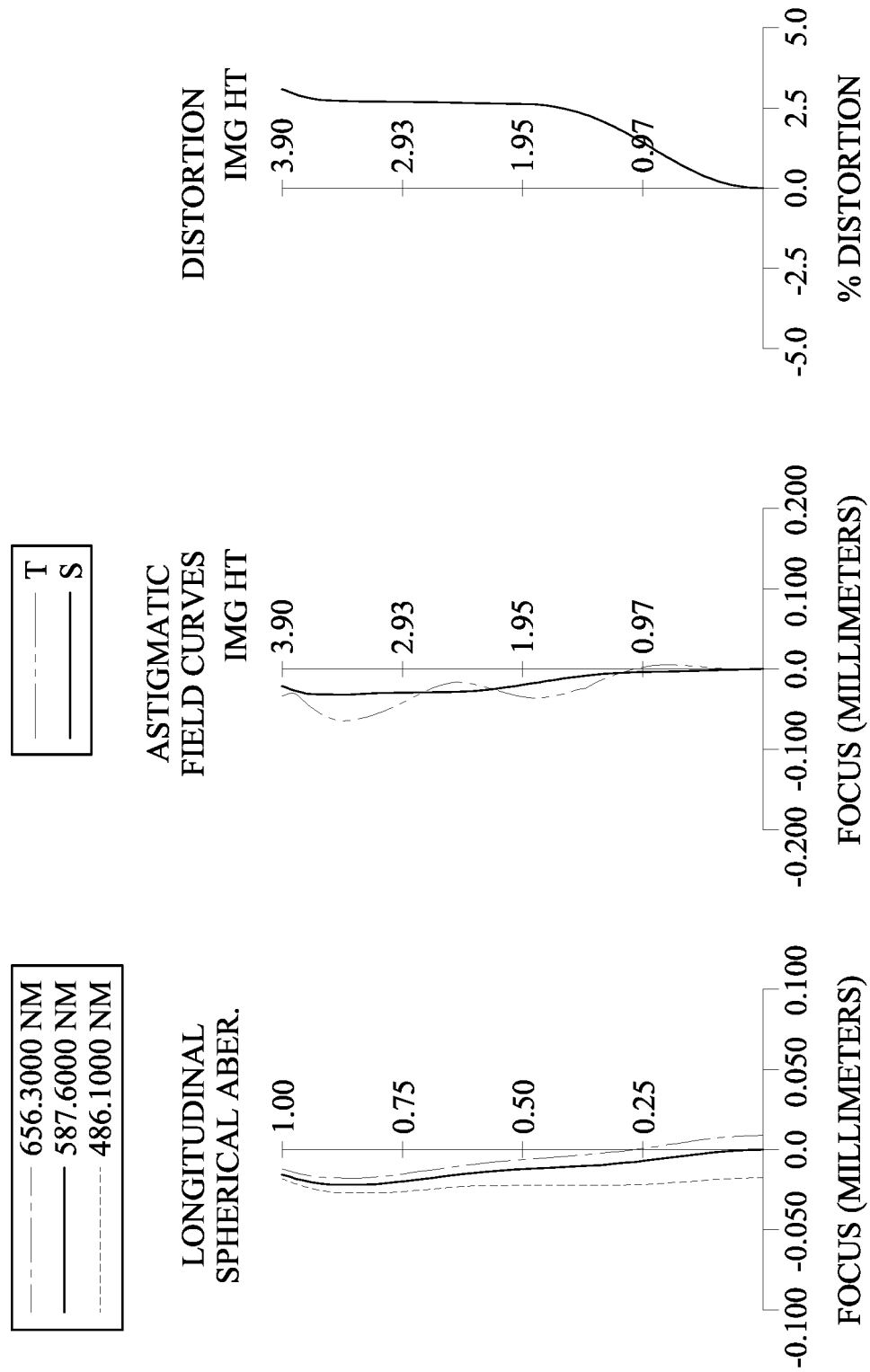
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the photographing optical lens assembly (its reference numeral is omitted) of the present disclosure and an image sensor 1395. The photographing optical lens assembly includes, in order from an object side to an image side, a first lens element 1310, an aperture stop 1300, a second lens element 1320, a third lens element 1330, a fourth lens element 1340, a fifth lens element 1350, a sixth lens element 1360, a seventh lens element 1370, an IR-cut filter 1380 and an image surface 1390, wherein the photographing optical lens assembly has a total of seven non-cemented lens elements (1310-1370) with refractive power.

The first lens element 1310 with positive refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric.

The second lens element 1320 with negative refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with positive refractive power has an object-side surface 1331 being convex in a paraxial region thereof and an image-side surface 1332 being concave in a paraxial region thereof. The third lens element 1330 is made of plastic material and has the object-side surface 1331 and the image-side surface 1332 being both aspheric.

The fourth lens element 1340 with positive refractive power has an object-side surface 1341 being convex in a paraxial region thereof and an image-side surface 1342 being convex in a paraxial region thereof. The fourth lens element 1340 is made of plastic material and has the object-side surface 1341 and the image-side surface 1342 being both aspheric.

The fifth lens element 1350 with positive refractive power has an object-side surface 1351 being concave in a paraxial region thereof and an image-side surface 1352 being convex in a paraxial region thereof. The fifth lens element 1350 is made of plastic material and has the object-side surface 1351 and the image-side surface 1352 being both aspheric.

The sixth lens element 1360 with negative refractive power has an object-side surface 1361 being convex in a paraxial region thereof and an image-side surface 1362 being concave in a paraxial region thereof. The sixth lens element 1360 is made of plastic material and has the object-side surface 1361 and the image-side surface 1362 being both aspheric. The image-side surface 1362 of the sixth lens element 1360 has at least one inflection point.

The seventh lens element 1370 with negative refractive power has an object-side surface 1371 being convex in a paraxial region thereof and an image-side surface 1372 being concave in a paraxial region thereof. The sixth lens element 1370 is made of plastic material and has the object-side surface 1371 and the image-side surface 1372 being both aspheric. The image-side surface 1372 of the seventh lens element 1370 has at least one inflection point.

The IR-cut filter 1380 is made of glass and located between the seventh lens element 1370 and the image surface 1390, and will not affect the focal length of the photographing optical lens assembly. The image sensor 1395 is disposed on or near the image surface 1390 of the photographing optical lens assembly.

The detailed optical data of the 13th embodiment are shown in Table 25 and the aspheric surface data are shown in Table 26 below.

TABLE 25

13th Embodiment
f = 5.18 mm, Fno = 2.05, HFOV = 36.2 deg.

| Surface# | | Curvature Radius | | Thickness | | Material | Index | Abbe # | Focal Length |
|---|---|---|---|---|---|---|---|---|---|
| 0 | Object | Plano | | Infinity | | | | | |
| 1 | Lens 1 | 2.385 | (ASP) | 1.008 | | Plastic | 1.544 | 55.9 | 4.85 |
| 2 | | 21.064 | (ASP) | 0.035 | | | | | |
| 3 | Ape. Stop | Plano | | 0.035 | | | | | |
| 4 | Lens 2 | 3.958 | (ASP) | 0.240 | | Plastic | 1.640 | 23.3 | −7.93 |
| 5 | | 2.171 | (ASP) | 0.298 | | | | | |
| 6 | Lens 3 | 4.300 | (ASP) | 0.375 | | Plastic | 1.535 | 56.3 | 52.19 |
| 7 | | 4.929 | (ASP) | 0.240 | | | | | |
| 8 | Lens 4 | 6.704 | (ASP) | 0.513 | | Plastic | 1.544 | 55.9 | 9.94 |
| 9 | | −27.268 | (ASP) | 0.384 | | | | | |
| 10 | Lens 5 | −2.515 | (ASP) | 0.483 | | Plastic | 1.535 | 56.3 | 29.17 |
| 11 | | −2.311 | (ASP) | 0.050 | | | | | |
| 12 | Lens 6 | 4.013 | (ASP) | 0.630 | | Plastic | 1.535 | 56.3 | −70.88 |
| 13 | | 3.431 | (ASP) | 0.521 | | | | | |

TABLE 25-continued

13th Embodiment
f = 5.18 mm, Fno = 2.05, HFOV = 36.2 deg.

| Surface# | | Curvature Radius | | Thickness | Material | Index | Abbe # | Focal Length |
|---|---|---|---|---|---|---|---|---|
| 14 | Lens 7 | 3.965 | (ASP) | 0.641 | Plastic | 1.544 | 55.9 | −8.63 |
| 15 | | 2.027 | (ASP) | 0.550 | | | | |
| 16 | IR-cut filter | Plano | | 0.350 | Glass | 1.517 | 64.2 | — |
| 17 | | Plano | | 0.176 | | | | |
| 18 | Image | Plano | | — | | | | |

Note:
Reference wavelength is 587.6 nm (d-line).

TABLE 26

Aspheric Coefficients

| Surface # | 1 | 2 | 4 | 5 | 6 |
|---|---|---|---|---|---|
| k = | 1.2342E−01 | −5.4024E+01 | −3.0797E+01 | −1.2300E+01 | −3.4382E+00 |
| A4 = | 6.2894E−04 | −5.1866E−02 | −7.1581E−02 | 4.9076E−02 | −2.9698E−03 |
| A6 = | −3.9444E−03 | 7.0917E−02 | 8.1607E−02 | −4.6676E−02 | −4.3978E−03 |
| A8 = | 4.8939E−03 | −5.6186E−02 | −5.5232E−02 | 5.4443E−02 | 3.1752E−03 |
| A10 = | −3.9053E−03 | 2.3824E−02 | 2.2933E−02 | −3.2824E−02 | −2.4545E−03 |
| A12 = | 1.5291E−03 | −4.1985E−03 | −4.5695E−03 | 1.0694E−02 | 1.0537E−03 |
| A14 = | −2.5994E−04 | −9.7570E−05 | 4.5844E−05 | −1.4476E−03 | −1.7663E−04 |

| Surface # | 7 | 8 | 9 | 10 | 11 |
|---|---|---|---|---|---|
| k = | −1.8245E+01 | −6.5557E+01 | −9.0000E+01 | 8.1992E−01 | −7.2410E+00 |
| A4 = | −6.9906E−03 | −1.3965E−02 | −5.3443E−02 | −1.4757E−02 | −7.0388E−02 |
| A6 = | −3.8719E−03 | −8.5228E−03 | 2.3836E−02 | 5.5912E−02 | 5.5116E−02 |
| A8 = | −8.7173E−04 | −1.7376E−03 | −1.1745E−02 | −4.6287E−02 | −3.3072E−02 |
| A10 = | −4.3155E−04 | 3.7579E−04 | −7.1121E−03 | 2.3409E−02 | 1.2857E−02 |
| A12 = | 2.5571E−05 | 5.6777E−05 | 9.5507E−03 | −5.3994E−03 | −2.5287E−03 |
| A14 = | — | — | −3.4330E−03 | 4.0370E−04 | 1.9293E−04 |
| A16 = | — | — | 4.0471E−04 | — | — |

| Surface # | 12 | 13 | 14 | 15 |
|---|---|---|---|---|
| k = | −1.7387E+01 | −2.6104E+01 | −1.3857E+00 | −1.5538E+00 |
| A4 = | −1.2261E−02 | −5.6535E−03 | −1.4626E−01 | −1.1057E−01 |
| A6 = | 6.1487E−03 | 2.6134E−03 | 3.9603E−02 | 3.4560E−02 |
| A8 = | −9.1594E−03 | −2.9614E−03 | −6.4509E−03 | −8.2963E−03 |
| A10 = | 3.0021E−03 | 6.6053E−04 | 7.9560E−04 | 1.3376E−03 |
| A12 = | −5.6901E−04 | −5.3525E−05 | −7.1210E−05 | −1.3096E−04 |
| A14 = | 5.0007E−05 | 1.3385E−06 | 3.8565E−06 | 6.9293E−06 |
| A16 = | — | — | −9.2763E−08 | −1.5085E−07 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 5.18 | (R13 − R14)/(R13 + R14) | 0.32 |
| Fno | 2.05 | |f1/f2| | 0.61 |
| HFOV [deg.] | 36.2 | f/f3 | 0.10 |
| Nmax | 1.640 | |f1/f7| | 0.56 |
| V2 | 23.3 | |f/fj| max | 1.07 |
| CT1/CT2 | 4.20 | f/EPD | 2.05 |
| T23/CT2 | 1.24 | Yc62/Yc61 | 1.21 |
| T23/T34 | 1.24 | Yc62/Yc72 | 1.04 |
| (T12/T23) + (T34/T45) + (T56/T67) | 0.96 | Yc72/f | 0.29 |
| R1/R2 | 0.11 | ΣAT/ImgH | 0.40 |
| f/R6 | 1.05 | SD/TD | 0.81 |
| f/R12 | 1.51 | TL/f | 1.26 |
| R14/f | 0.39 | TL/ImgH | 1.67 |
| (R11 − R12)/(R11 + R12) | 0.08 | | |

The foregoing image capturing unit is able to be installed in, but not limited to, an electronic device. According to the present disclosure, a photographing optical lens assembly provided in the disclosure includes, in order from an object side to an image side, a first lens element, a second lens element, a third lens element, a fourth lens element, a fifth lens element, a sixth lens element and a seventh lens element. The photographing optical lens assembly has a total of seven non-cemented lens elements with refractive power, wherein the sixth lens element has an image-side surface being concave in a paraxial region thereof, and the seventh lens element has an image-side surface being concave in a paraxial region thereof. When specific conditions are satisfied, it is favorable for effectively reduce a back focal length of the photographing optical lens assembly so as to keep a compact size. Furthermore, it is favorable for properly distributing the refractive power of the photographing optical lens assembly adjacent to the object side so as to correct the aberration. Moreover, it is also favorable for controlling the incident angle of the light projecting onto an image surface so as to keep sufficient incident light in the peripheral region of the image. Meanwhile, it is favorable for further correcting the aberration of the off-axis so as to enhance the resolution of the photographing optical lens assembly.

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
   wherein the first lens element has positive refractive power, the second lens element has an object-side surface being convex in a paraxial region thereof, the third lens element has an image-side surface being concave in a paraxial region thereof, an image-side surface of the sixth lens element has at least one inflection point, and an image-side surface of the seventh lens element has at least one inflection point;
   wherein there is a non-axial critical point on the image-side surface of the sixth lens element at which a tangent to the image-side surface of the sixth lens element is perpendicular to an optical axis, there is a non-axial critical point on the image-side surface of the seventh lens element at which a tangent to the image-side surface of the seventh lens element is perpendicular to the optical axis;
   wherein a maximum refractive index among the first lens element, the second lens element, the third lens element, the fourth lens element, the fifth lens element, the sixth lens element and the seventh lens element is Nmax, a vertical distance between the non-axial critical point on the image-side surface of the sixth lens element and the optical axis is Yc62, a vertical distance between the non-axial critical point on the image-side surface of the seventh lens element and the optical axis is Yc72, and the following conditions are satisfied:

$1.640 \le Nmax < 1.750$; and $0.5 < Yc62/Yc72 < 1.5$.

2. The photographing optical lens assembly of claim 1, wherein the first lens element has an object-side surface being convex in a paraxial region thereof, the seventh lens element has negative refractive power, and each of the seven lens elements is a single and non-cemented lens element.

3. The photographing optical lens assembly of claim 1, wherein each of at least three of the seven lens elements has an Abbe number smaller than 26.0.

4. The photographing optical lens assembly of claim 1, wherein the image-side surface of the seventh lens element is concave in a paraxial region thereof, a focal length of the photographing optical lens assembly is f, an entrance pupil diameter of the photographing optical lens assembly is EPD, and the following condition is satisfied:

$1.2 \le f/EPD \le 1.85$.

5. The photographing optical lens assembly of claim 1, wherein an axial distance between an object-side surface of the first lens element and an image surface is TL, a maximum image height of the photographing optical lens assembly is ImgH, and the following condition is satisfied:

$TL/ImgH \le 1.53$.

6. The photographing optical lens assembly of claim 1, wherein a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the j-th lens element is fj, a maximum absolute value among the ratios of f/f1, f/f2, f/f3, f/f4, f/f5, f/f6 and f/f7 is |f/fj|max, and the following condition is satisfied:

$|f/fj|max \le 1.16$, wherein $j=1,2,3,4,5,6,7$.

7. The photographing optical lens assembly of claim 1, wherein a curvature radius of an object-side surface of the seventh lens element is R13, a curvature radius of the image-side surface of the seventh lens element is R14, and the following condition is satisfied:

$0 < (R13-R14)/(R13+R14) < 1.5$.

8. The photographing optical lens assembly of claim 1, wherein the maximum refractive index among the first lens element, the second lens element, the third lens element, the fourth lens element, the fifth lens element, the sixth lens element and the seventh lens element is Nmax, and the following condition is satisfied:

$1.650 \le Nmax < 1.750$.

9. The photographing optical lens assembly of claim 1, wherein an absolute value of a focal length of the first lens element is smaller than an absolute value of a focal length of the seventh lens element.

10. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
    wherein an image-side surface of the seventh lens element has at least one inflection point, a maximum refractive index among the first lens element, the second lens element, the third lens element, the fourth lens element, the fifth lens element, the sixth lens element and the seventh lens element is Nmax, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, a focal length of the photographing optical lens assembly is f, an entrance pupil diameter of the photographing optical lens assembly is EPD, and the following conditions are satisfied:

1.640≤Nmax<1.750;

1.2<f/EPD<2.6; and

|f1|<|fi|, wherein i=2,3,4,5,6,7.

11. The photographing optical lens assembly of claim 10, wherein the first lens element has positive refractive power, and the image-side surface of the seventh lens element is concave in a paraxial region thereof.

12. The photographing optical lens assembly of claim 10, wherein the seventh lens element has an object-side surface being convex in a paraxial region thereof.

13. The photographing optical lens assembly of claim 10, wherein the maximum refractive index among the first lens element, the second lens element, the third lens element, the fourth lens element, the fifth lens element, the sixth lens element and the seventh lens element is Nmax, and the following condition is satisfied:

1.650≤Nmax<1.750.

14. The photographing optical lens assembly of claim 10, wherein an Abbe number of the second lens element is V2, and the following condition is satisfied:

V2≤23.3.

15. The photographing optical lens assembly of claim 10, wherein the focal length of the photographing optical lens assembly is f, and the following condition is satisfied:

3.0 [mm]<f≤5.59 [mm].

16. The photographing optical lens assembly of claim 10, wherein an axial distance between an object-side surface of the first lens element and an image surface is TL, a maximum image height of the photographing optical lens assembly is ImgH, the focal length of the photographing optical lens assembly is f, the entrance pupil diameter of the photographing optical lens assembly is EPD, and the following conditions are satisfied:

TL/ImgH≤1.60; and 1.2<f/EPD≤1.90.

17. The photographing optical lens assembly of claim 10, wherein there is a non-axial critical point on the image-side surface of the seventh lens element at which a tangent to the image-side surface of the seventh lens element is perpendicular to an optical axis;
wherein the focal length of the photographing optical lens assembly is f, the entrance pupil diameter of the photographing optical lens assembly is EPD, a vertical distance between the non-axial critical point on the image-side surface of the seventh lens element and the optical axis is Yc72, and the following conditions are satisfied:

1.2<f/EPD≤1.75; and 0.1<Yc72/f<0.9.

18. The photographing optical lens assembly of claim 10, further comprising an aperture stop, wherein an image-side surface of the sixth lens element has at least one inflection point, and each of the seven lens elements is a single and non-cemented lens element, an axial distance between the aperture stop and the image-side surface of the seventh lens element is SD, an axial distance between an object-side surface of the first lens element and the image-side surface of the seventh lens element is TD, and the following condition is satisfied:

0.75<SD/TD<1.1.

19. An image capturing unit, comprising:
the photographing optical lens assembly of claim 10; and
an image sensor disposed on an image surface of the photographing optical lens assembly.

20. An electronic device, comprising:
the image capturing unit of claim 19.

21. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the first lens element has positive refractive power, the seventh lens element has an image-side surface being concave in a paraxial region thereof, and the image-side surface of the seventh lens element has at least one inflection point;
wherein there is a non-axial critical point on an image-side surface of the sixth lens element at which a tangent to the image-side surface of the sixth lens element is perpendicular to an optical axis, there is a non-axial critical point on the image-side surface of the seventh lens element at which a tangent to the image-side surface of the seventh lens element is perpendicular to the optical axis;
wherein a maximum refractive index among the first lens element, the second lens element, the third lens element, the fourth lens element, the fifth lens element, the sixth lens element and the seventh lens element is Nmax, a vertical distance between the non-axial critical point on the image-side surface of the sixth lens element and the optical axis is Yc62, a vertical distance between the non-axial critical point on the image-side surface of the seventh lens element and the optical axis is Yc72, an Abbe number of the second lens element is V2, and the following conditions are satisfied:

1.640≤Nmax<1.750;

0.5<Yc62/Yc72<1.5; and

V2≤23.3.

22. The photographing optical lens assembly of claim 21, wherein the second lens element has negative refractive power, and the seventh lens element has an object-side surface being convex in a paraxial region thereof.

23. The photographing optical lens assembly of claim 21, wherein the Abbe number of the second lens element is V2, and the following condition is satisfied:

V2≤21.4.

24. The photographing optical lens assembly of claim 21, wherein a focal length of the photographing optical lens assembly is f, a focal length of the third lens element is f3, and the following condition is satisfied:

−0.5<f/f3<0.6.

25. The photographing optical lens assembly of claim 21, further comprising an aperture stop disposed between an imaged object and the first lens element.

26. The photographing optical lens assembly of claim 21, wherein a curvature radius of an object-side surface of the sixth lens element is R11, a curvature radius of the image-side surface of the sixth lens element is R12, and the following condition is satisfied:

−0.35≤(R11−R12)/(R11+R12)<0.2.

27. The photographing optical lens assembly of claim 21, wherein a central thickness of the fifth lens element is smaller than a central thickness of the sixth lens element.

28. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the third lens element has an image-side surface being concave in a paraxial region thereof, and an image-side surface of the seventh lens element has at least one inflection point; the photographing optical lens assembly further comprises an aperture stop disposed between an imaged object and the second lens element, and an absolute value of a focal length of the first lens element is smaller than an absolute value of a focal length of the seventh lens element;
wherein a maximum refractive index among the first lens element, the second lens element, the third lens element, the fourth lens element, the fifth lens element, the sixth lens element and the seventh lens element is Nmax, and the following condition is satisfied:

1.640≤Nmax<1.750.

29. The photographing optical lens assembly of claim 28, wherein a curvature radius of an object-side surface of the sixth lens element is R11, a curvature radius of an image-side surface of the sixth lens element is R12, and the following condition is satisfied:

−2.0<(R11−R12)/(R11+R12)<0.2.

30. The photographing optical lens assembly of claim 28, wherein a focal length of the photographing optical lens assembly is f, the focal length of the first lens element is f1, a focal length of the second lens element is f2, a focal length of the third lens element is f3, a focal length of the fourth lens element is f4, a focal length of the fifth lens element is f5, a focal length of the sixth lens element is f6, the focal length of the seventh lens element is f7, a focal length of the j-th lens element is fj, a maximum absolute value among the ratios of f/f1, f/f2, f/f3, f/f4, f/f5, f/f6 and f/f7 is |f/fj|max, an axial distance between an object-side surface of the first lens element and an image surface is TL, a maximum image height of the photographing optical lens assembly is ImgH, and the following conditions are satisfied:

|f/fj|max≤1.16, wherein j=1,2,3,4,5,6,7; and

TL/ImgH≤1.53.

31. The photographing optical lens assembly of claim 28, wherein a focal length of the photographing optical lens assembly is f, an entrance pupil diameter of the photographing optical lens assembly is EPD, and the following condition is satisfied:

1.2<f/EPD≤1.75.

32. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the first lens element has positive refractive power, the second lens element has an object-side surface being convex in a paraxial region thereof, the third lens element has an object-side surface being convex in a paraxial region thereof and an image-side surface being concave in a paraxial region thereof, the seventh lens element has an object-side surface being convex in a paraxial region thereof, and an image-side surface of the seventh lens element has at least one inflection point;
wherein there is a non-axial critical point on an object-side surface of the sixth lens element at which a tangent to the object-side surface of the sixth lens element is perpendicular to an optical axis, there is a non-axial critical point on an image-side surface of the sixth lens element at which a tangent to the image-side surface of the sixth lens element is perpendicular to the optical axis;
wherein the photographing optical lens assembly further comprises an aperture stop disposed between an imaged object and the second lens element, a maximum refractive index among the first lens element, the second lens element, the third lens element, the fourth lens element, the fifth lens element, the sixth lens element and the seventh lens element is Nmax, a vertical distance between the non-axial critical point on the object-side surface of the sixth lens element and the optical axis is Yc61, a vertical distance between the non-axial critical point on the image-side surface of the sixth lens element and the optical axis is Yc62, and the following conditions are satisfied:

1.640≤Nmax<1.750; and 0.30<Yc62/Yc61<1.80.

33. The photographing optical lens assembly of claim 32, wherein the seventh lens element has negative refractive power, each of at least three of the seven lens elements has an Abbe number smaller than 26.0.

34. The photographing optical lens assembly of claim 32, wherein a focal length of the photographing optical lens assembly is f, a curvature radius of the image-side surface of the seventh lens element is R14, an axial distance between the aperture stop and the image-side surface of the seventh lens element is SD, an axial distance between an object-side surface of the first lens element and the image-side surface of the seventh lens element is TD, and the following conditions are satisfied:

0<R14/f<0.7; and 0.75<SD/TD<1.1.

* * * * *